(12) United States Patent
Baptist et al.

(10) Patent No.: US 9,274,908 B2
(45) Date of Patent: Mar. 1, 2016

(54) RESOLVING WRITE CONFLICTS IN A DISPERSED STORAGE NETWORK

(71) Applicant: CLEVERSAFE, INC., Chicago, IL (US)

(72) Inventors: Andrew Baptist, Mt. Pleasant, WI (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 14/153,366

(22) Filed: Jan. 13, 2014

(65) Prior Publication Data

US 2014/0245063 A1 Aug. 28, 2014

Related U.S. Application Data

(60) Provisional application No. 61/769,595, filed on Feb. 26, 2013.

(51) Int. Cl.
| | | |
|---|---|---|
| *G06F 7/04* | (2006.01) | |
| *G06F 11/20* | (2006.01) | |
| *G06F 3/06* | (2006.01) | |
| *G06F 11/10* | (2006.01) | |

(52) U.S. Cl.
CPC ............ *G06F 11/2094* (2013.01); *G06F 3/06* (2013.01); *G06F 11/1092* (2013.01); *G06F 2211/1028* (2013.01)

(58) Field of Classification Search
CPC ............ G06F 21/6209; H04L 67/1097; H04L 29/08549; H04L 67/1095
See application file for complete search history.

(56) References Cited

U.S. PATENT DOCUMENTS

| | | | |
|---|---|---|---|
| 4,092,732 | A | 5/1978 | Ouchi |
| 5,454,101 | A | 9/1995 | Mackay et al. |
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Farid Homayounmehr
*Assistant Examiner* — Lizbeth Torres-Diaz
(74) *Attorney, Agent, or Firm* — Garlick & Markison; Timothy W. Markison

(57) ABSTRACT

A method begins by first and second client devices transmitting first and second sets of write requests to storage units. The method continues with a storage unit sending a write response message to the first and second client devices, where the write response message indicates a storage unit score value for one of the client devices. The method continues with the first and second client devices interpreting the storage unit score values from the storage units to determine which client device has write priority. The method continues with the client device that has the write priority sending a set of next-phase write requests to the storage units. The method continues with the other client device that does not have the write priority sending a set of rollback requests to the storage units.

18 Claims, 56 Drawing Sheets

(56) References Cited

U.S. PATENT DOCUMENTS

| | | | |
|---|---|---|---|
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1* | 4/2009 | Gladwin | H04L 67/1097 709/203 |
| 2009/0216962 A1* | 8/2009 | Mutlu | G06F 9/4881 711/151 |
| 2010/0023524 A1 | 1/2010 | Gladwin et al. | |
| 2010/0115332 A1* | 5/2010 | Zheng | G06F 11/1461 714/6.2 |
| 2010/0199025 A1* | 8/2010 | Nanjou | G06F 12/0246 711/103 |
| 2011/0107036 A1* | 5/2011 | Resch | H04L 12/00 711/154 |
| 2011/0161679 A1* | 6/2011 | Grube | G06F 11/1076 713/193 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

International Searching Authority; International Search Report and Written Opinion; International Application No. PCT/US2014/017094; Jul. 9, 2014; 10 pgs.

* cited by examiner

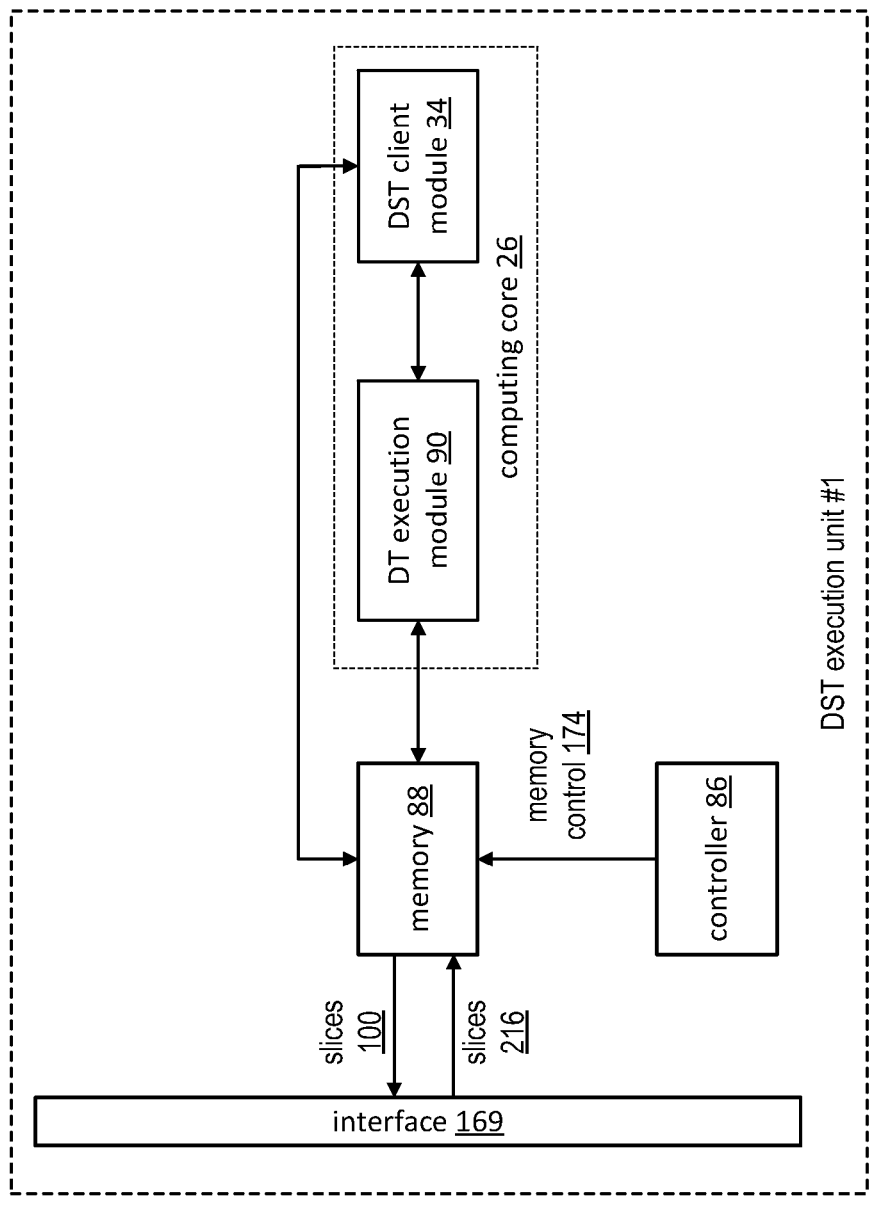
FIG. 24

DST allocation info 242 | data partition info 320: idata ID; No. of partitions; Addr. info for each partition; format conversion indication

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 | task execution info 322 | intermediate result info 324

FIG. 32

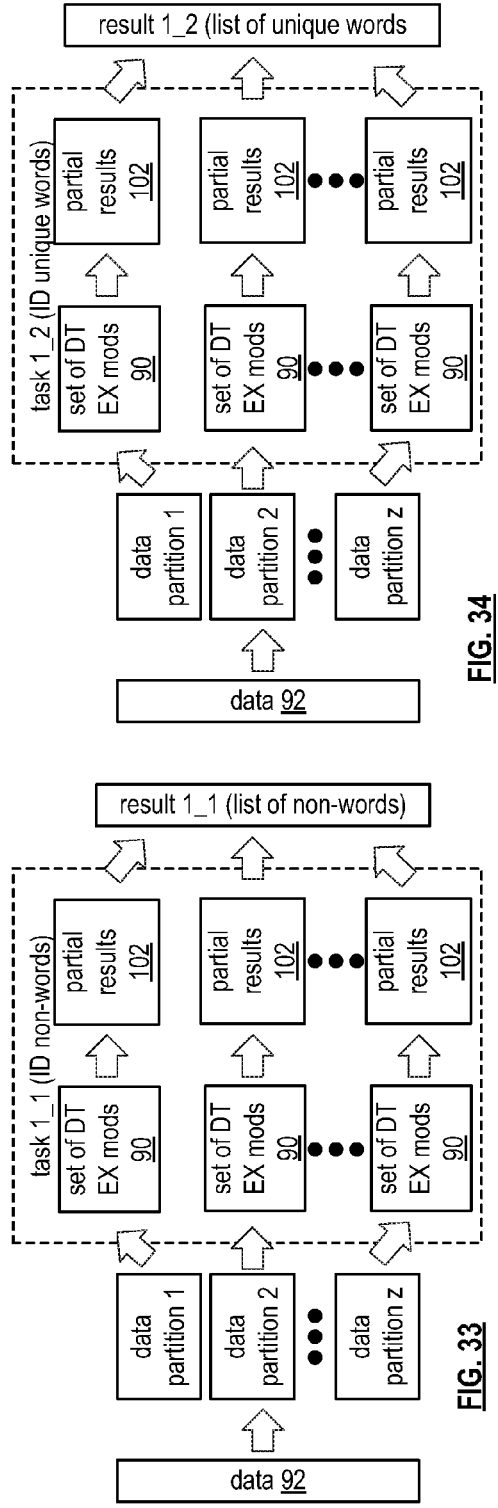
FIG. 33
FIG. 34
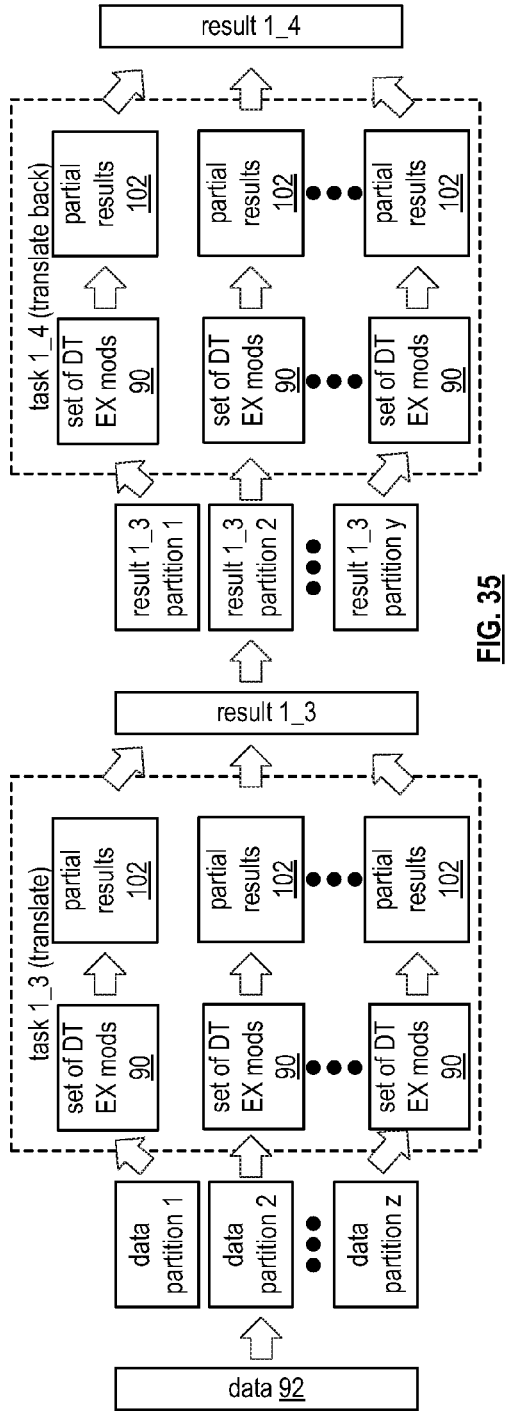
FIG. 35

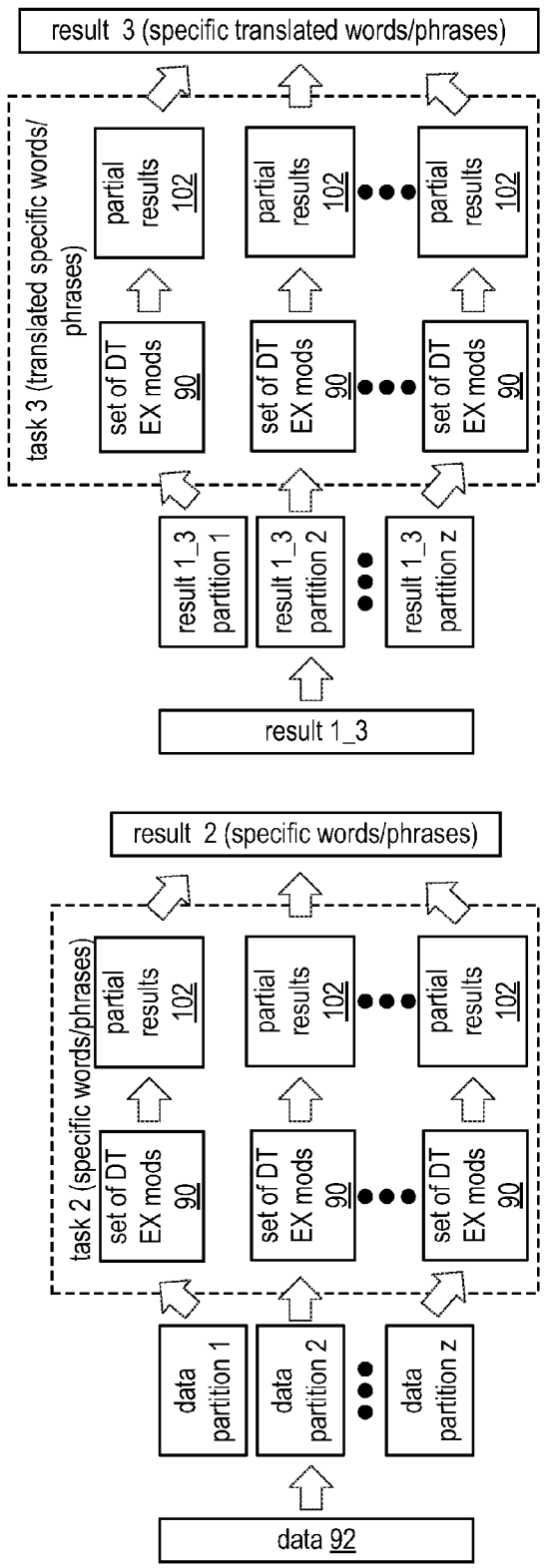
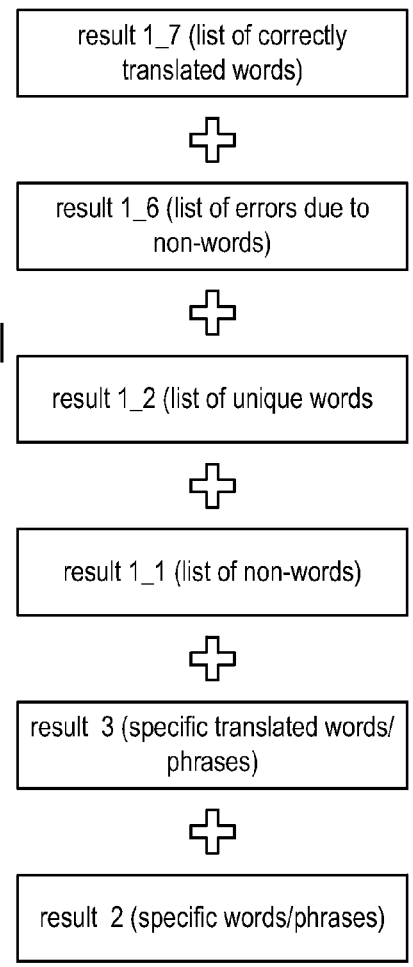

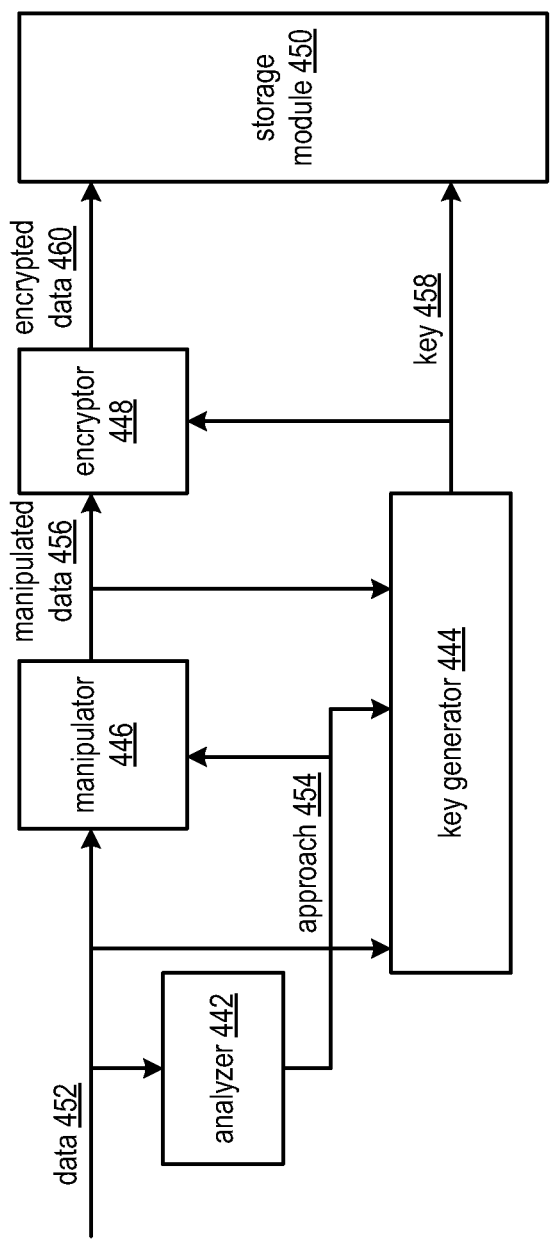

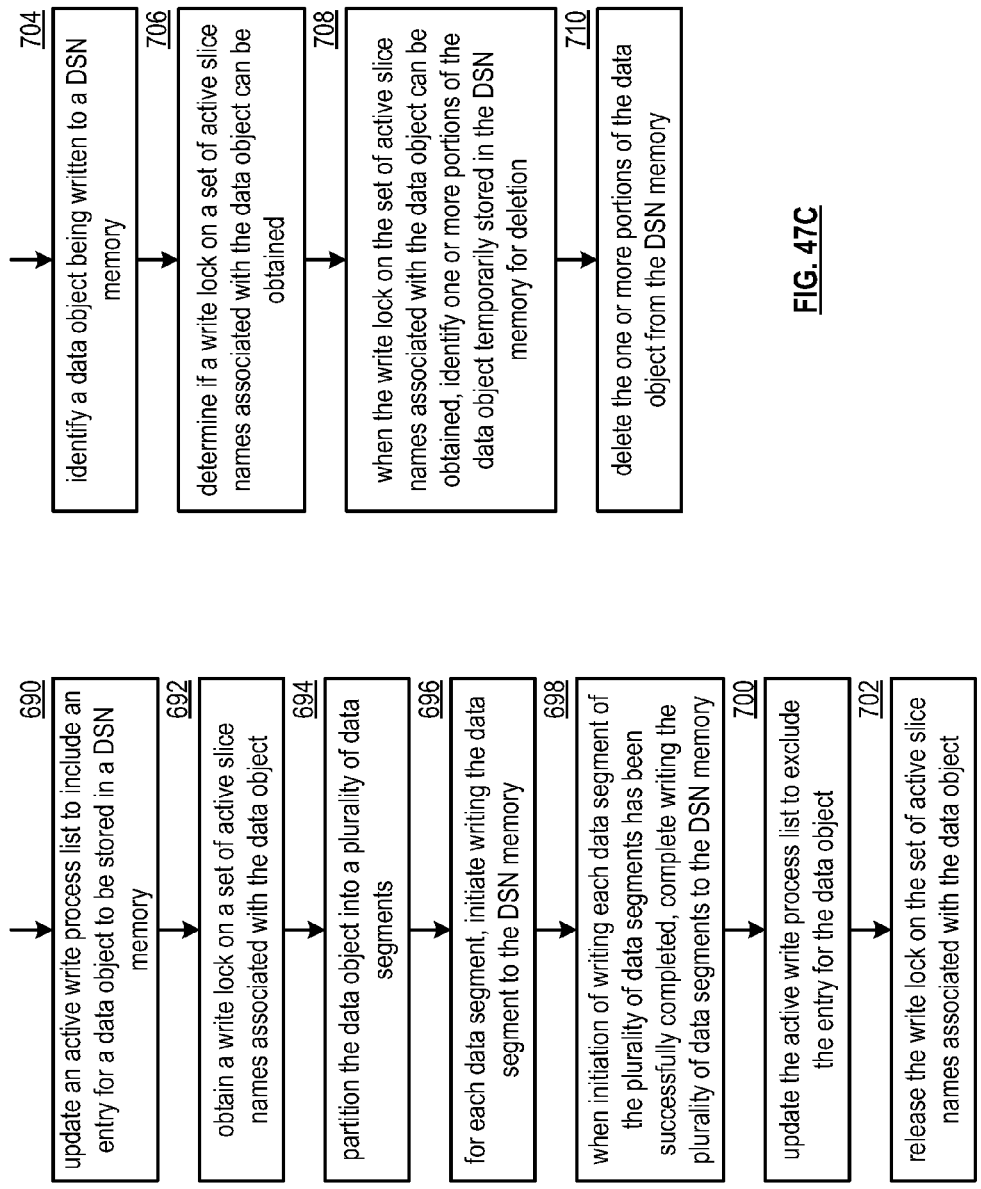

RESOLVING WRITE CONFLICTS IN A DISPERSED STORAGE NETWORK

CROSS REFERENCE TO RELATED PATENTS

The present U.S. Utility Patent Application claims priority pursuant to 35 U.S.C. §119(e) to U.S. Provisional Application No. 61/769,595, entitled "SECURELY STORING DATA WITHOUT DUPLICATION IN A DISPERSED STORAGE NETWORK," filed Feb. 26, 2013, which is hereby incorporated herein by reference in its entirety and made part of the present U.S. Utility Patent Application for all purposes.

STATEMENT REGARDING FEDERALLY SPONSORED RESEARCH OR DEVELOPMENT-NOT APPLICABLE

INCORPORATION-BY-REFERENCE OF MATERIAL SUBMITTED ON A COMPACT DISC-NOT APPLICABLE

BACKGROUND OF THE INVENTION

1. Technical Field of the Invention

This invention relates generally to computer networks and more particularly to dispersed storage of data and distributed task processing of data.

2. Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 41A is a schematic block diagram of a data encryption system in accordance with the present invention;

Figure 46A:
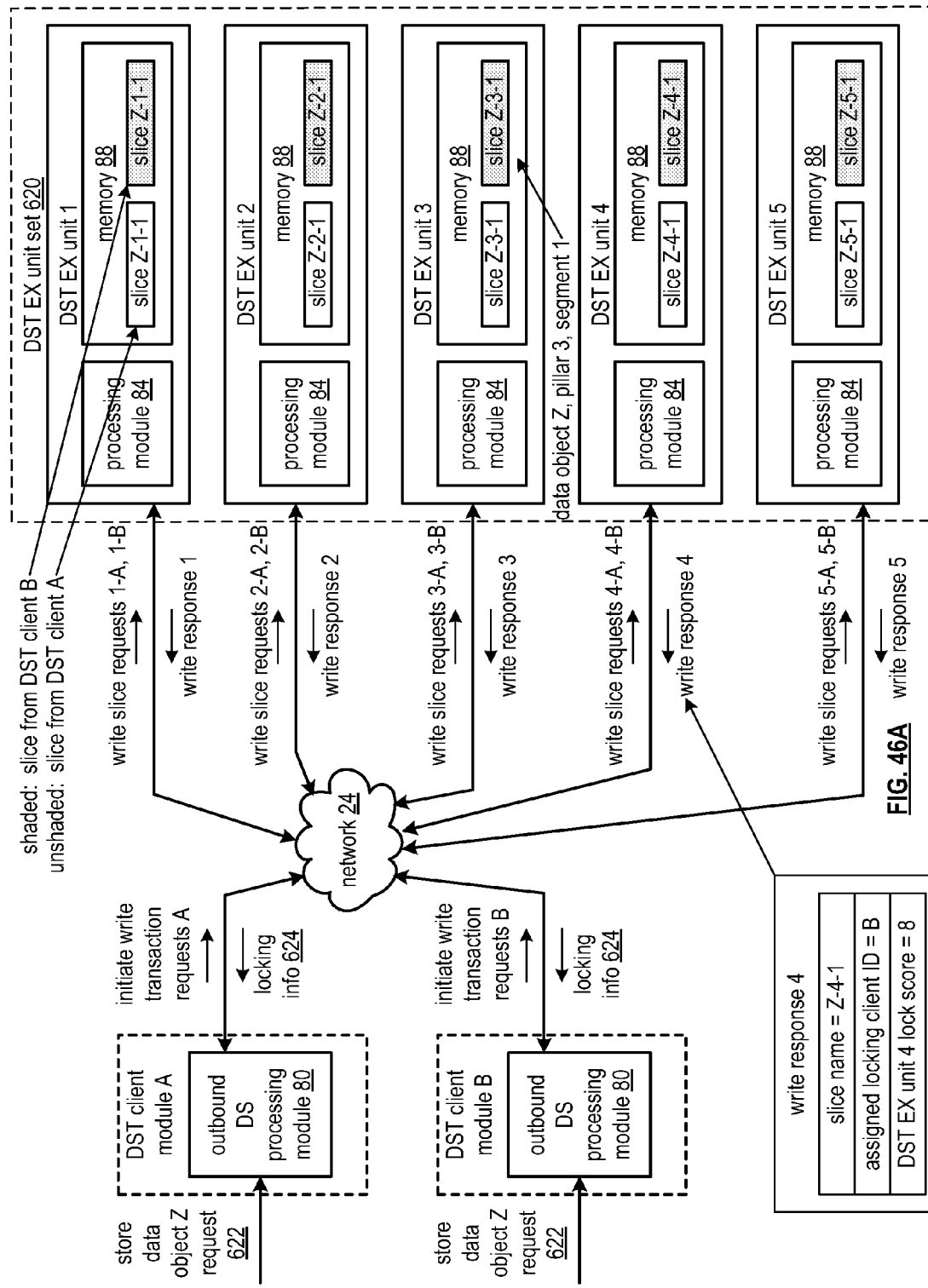
Figure 46B:
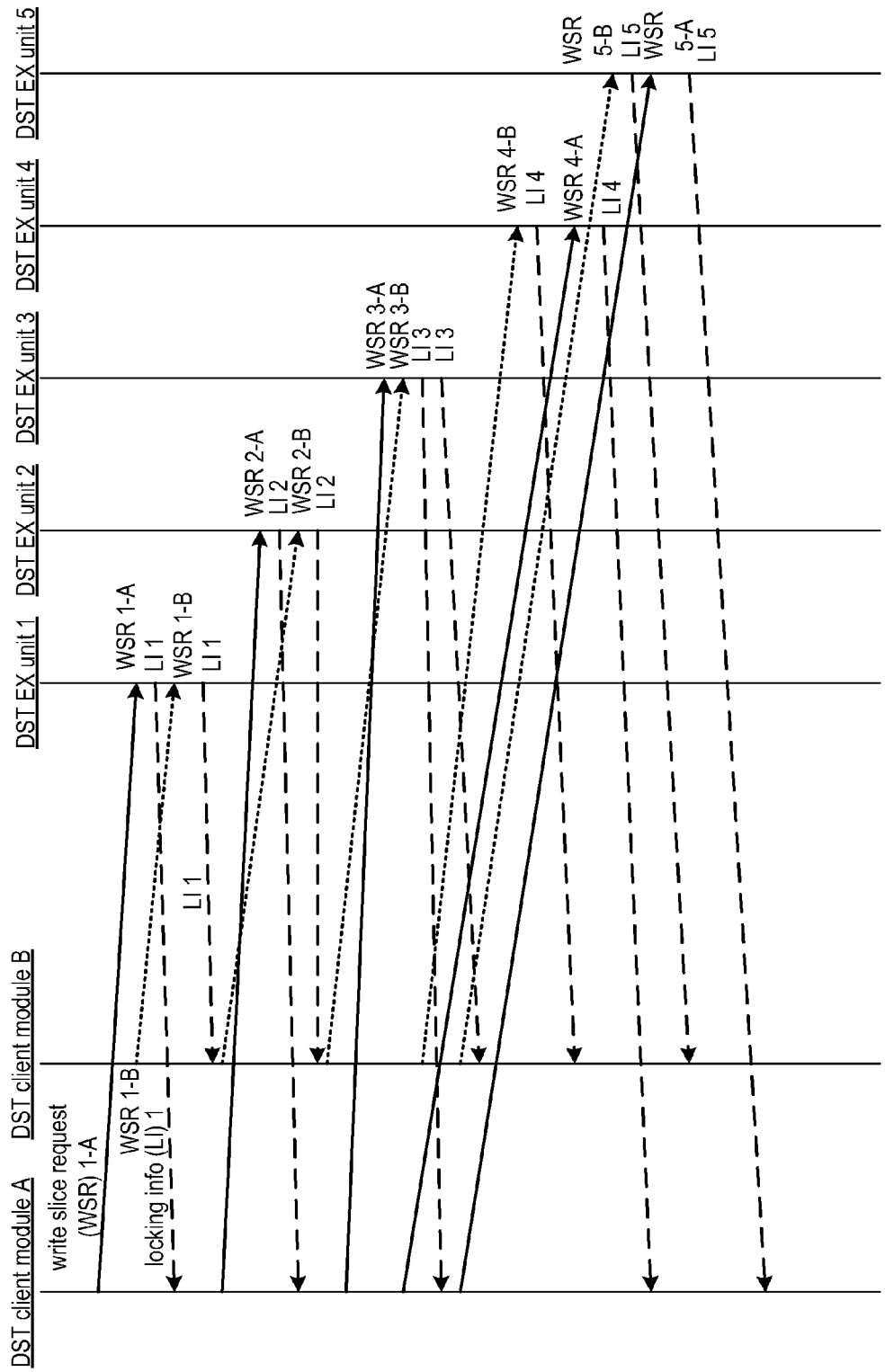
Figure 46C:
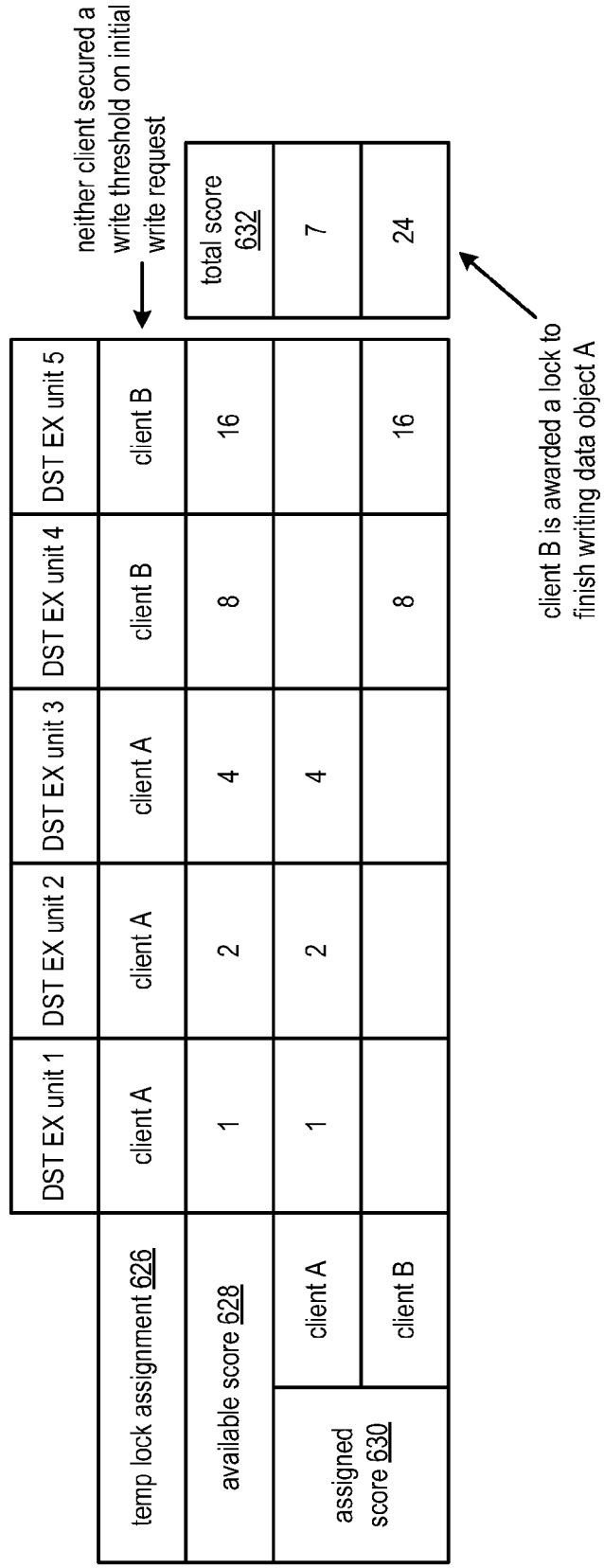
Figure 46D:
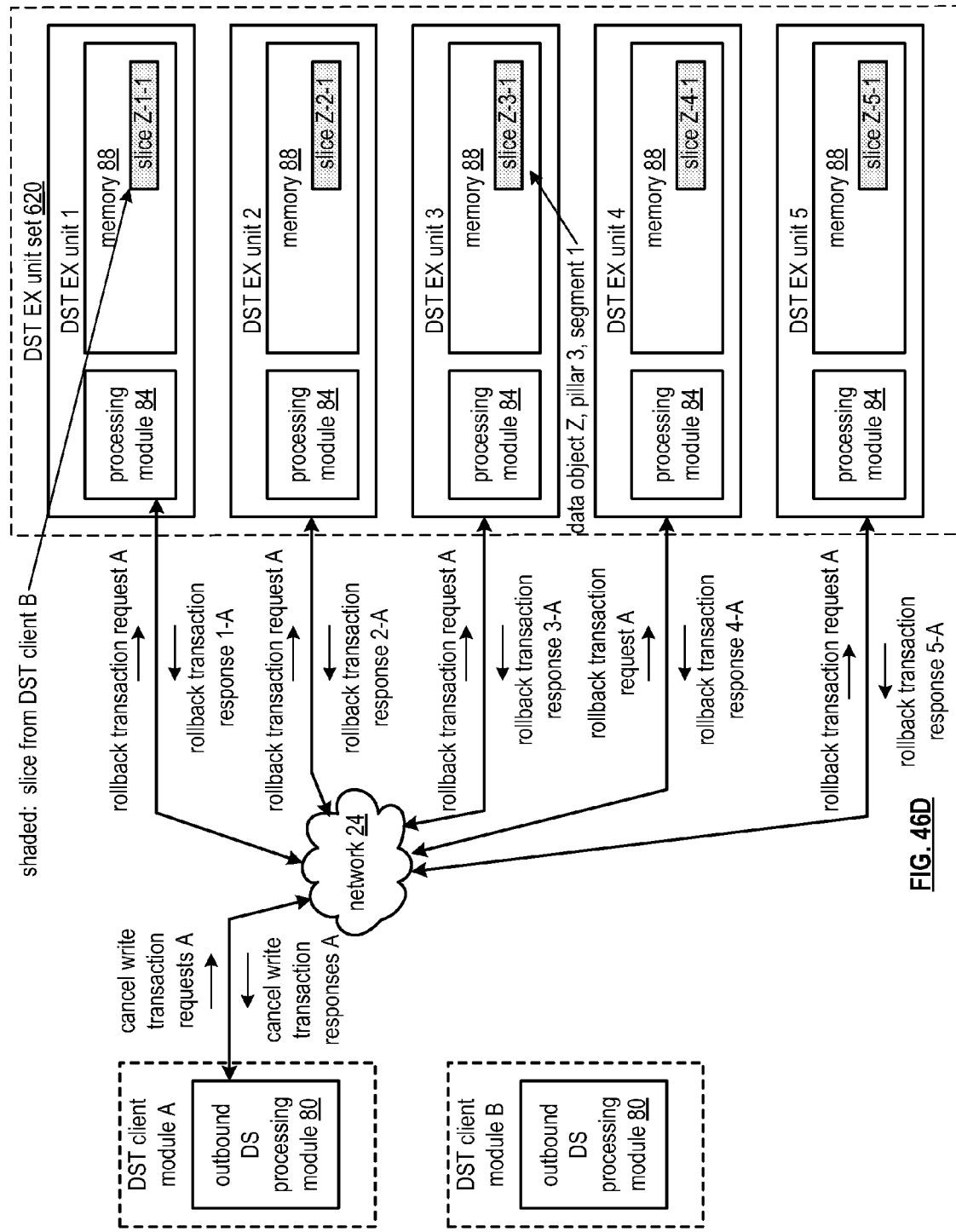
Figure 46E:
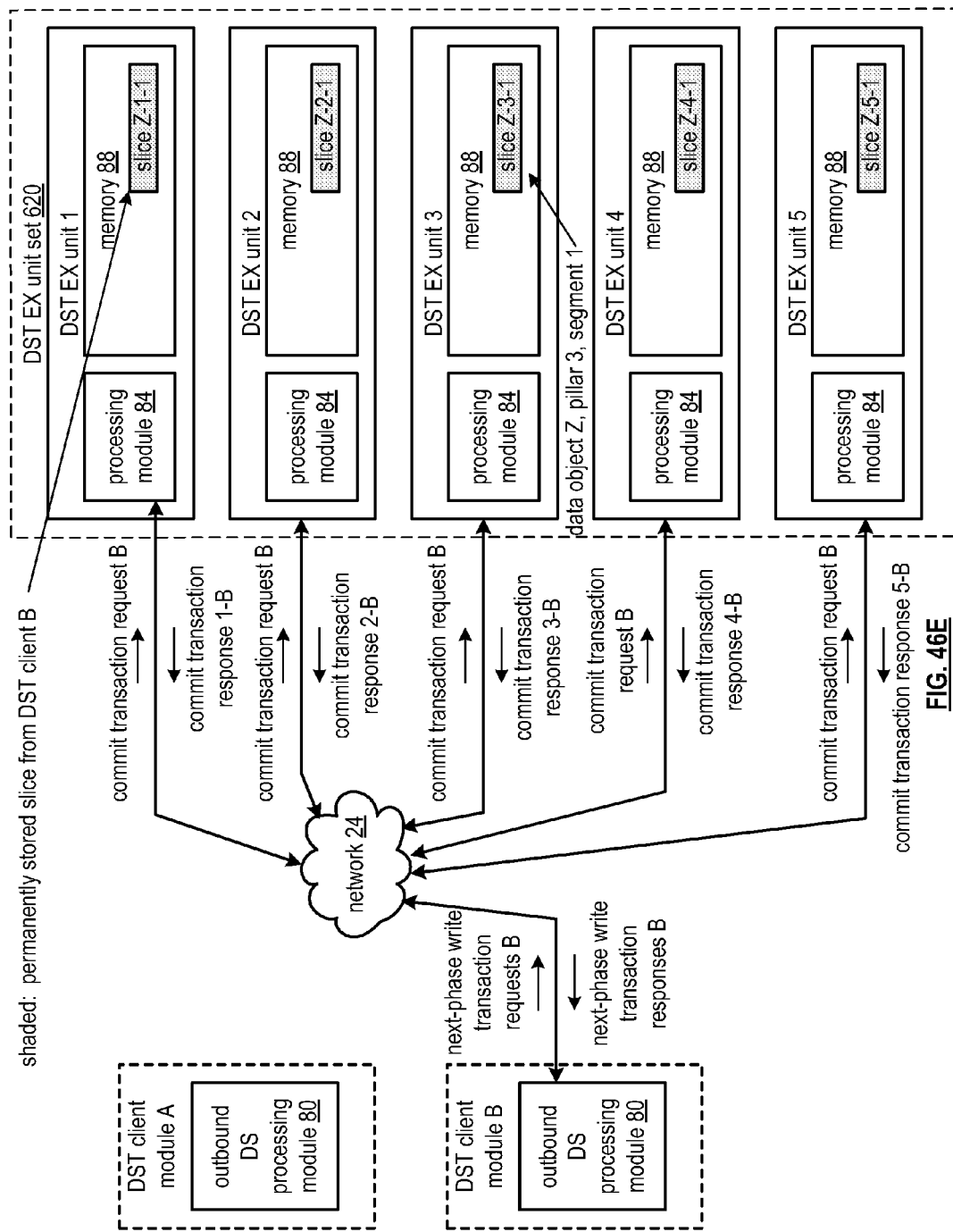
Figure 46F:
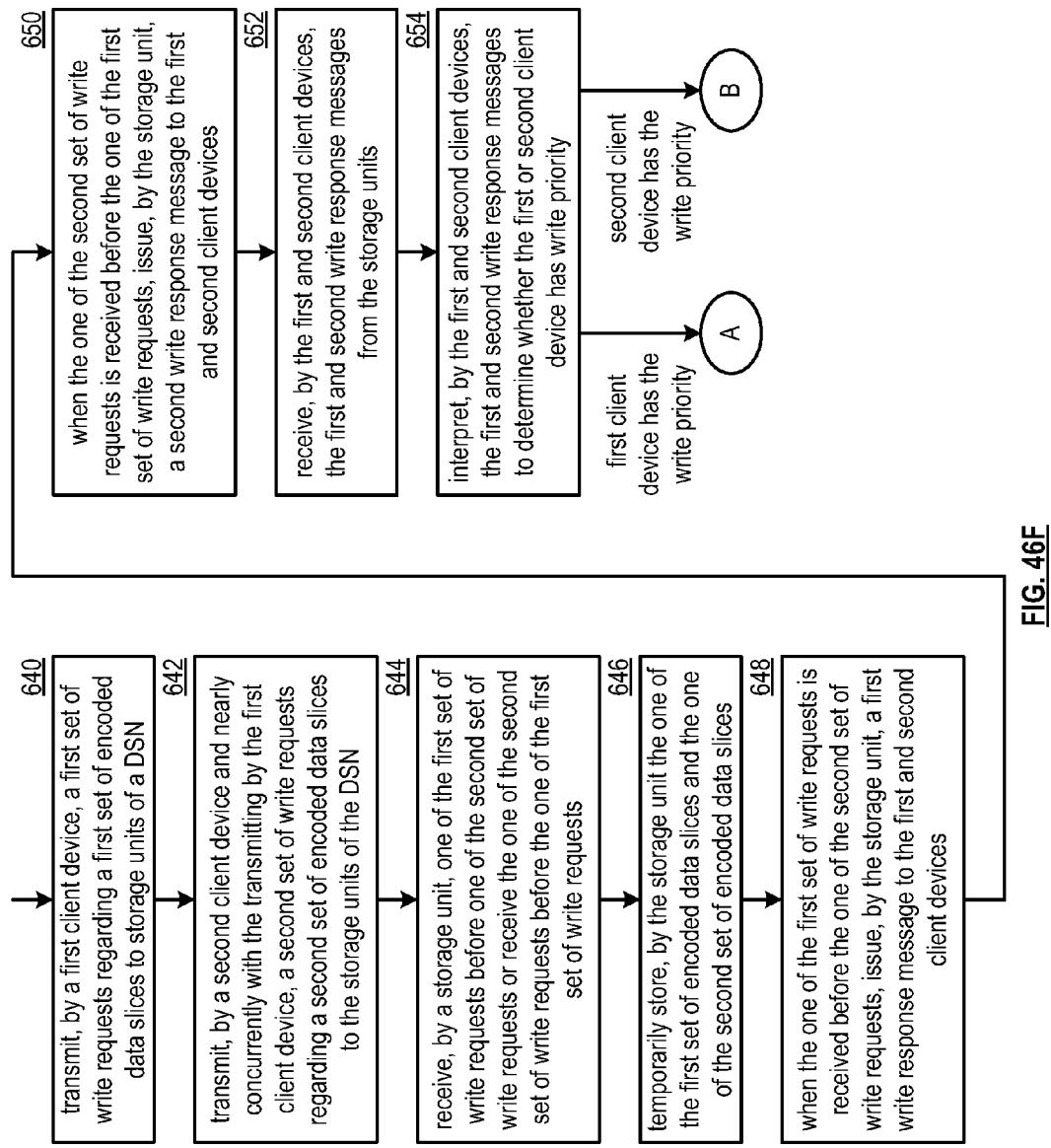
Figure 46G:
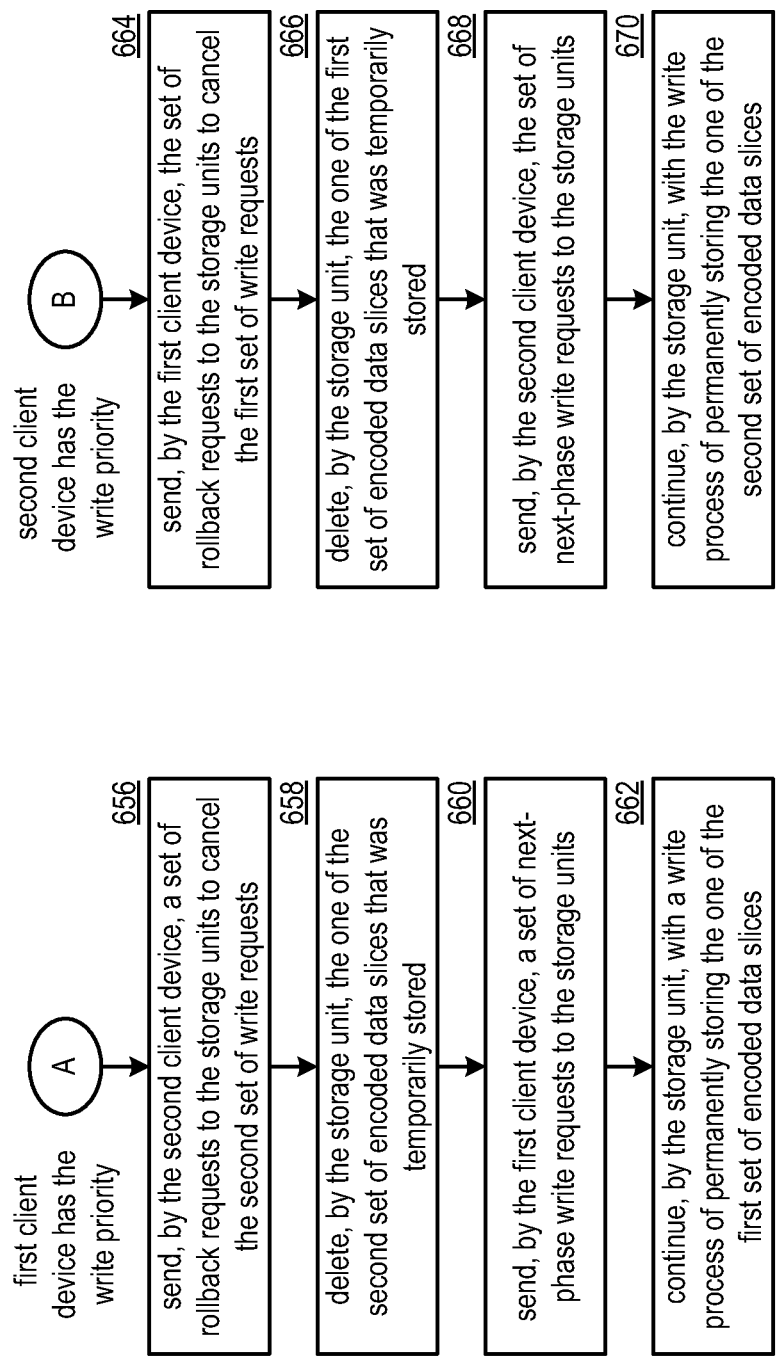
Figure 47A:
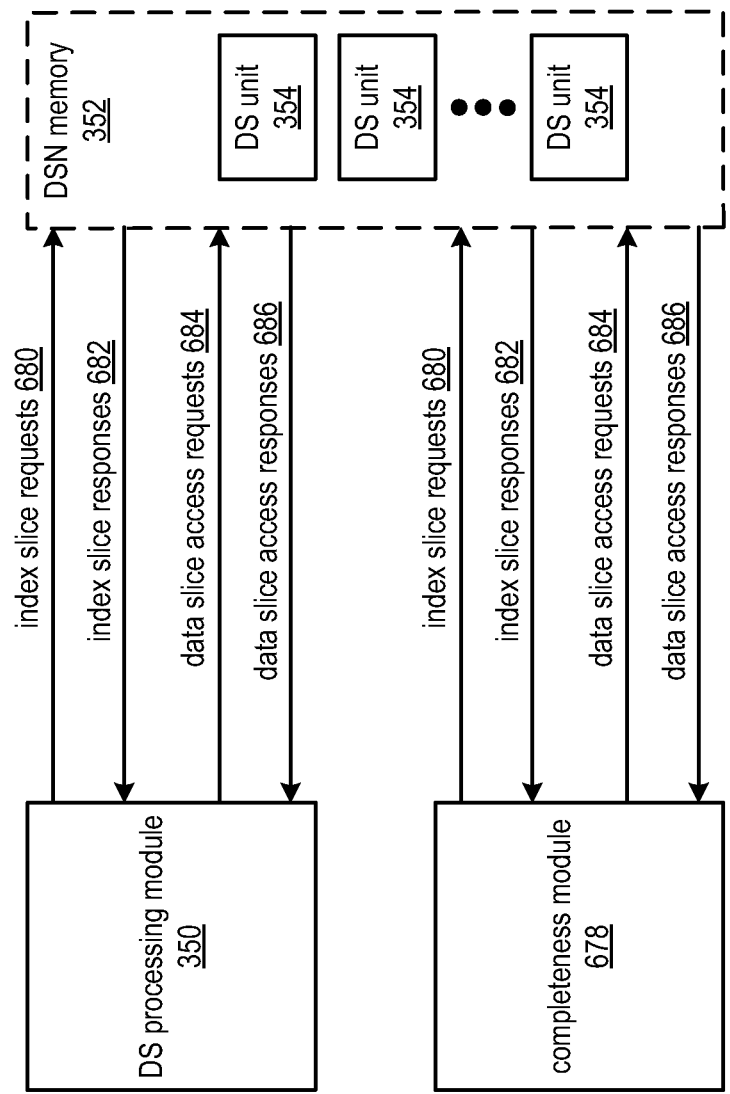

FIGS. 46A, D, and E are schematic block diagrams of an embodiment of a dispersed storage network in accordance with the present invention;

FIG. 46B is a diagram illustrating an example of timing of a storage process in accordance with the present invention;

FIG. 46C is a table illustrating assigning storage unit score values in accordance with the present invention;

FIG. 46F is a flowchart illustrating an example of resolving write conflicts in accordance with the present invention;

FIG. 46G is a flowchart illustrating another example of resolving write conflicts in accordance with the present invention;

FIG. 47A is a schematic block diagram of another embodiment of a dispersed storage system in accordance with the present invention;

FIG. 47B is a flowchart illustrating an example of writing data in accordance with the present invention; and FIG. 47C is a flowchart illustrating an example of deleting partially written data in accordance with the present invention.

DETAILED DESCRIPTION OF THE INVENTION

Figure 1:
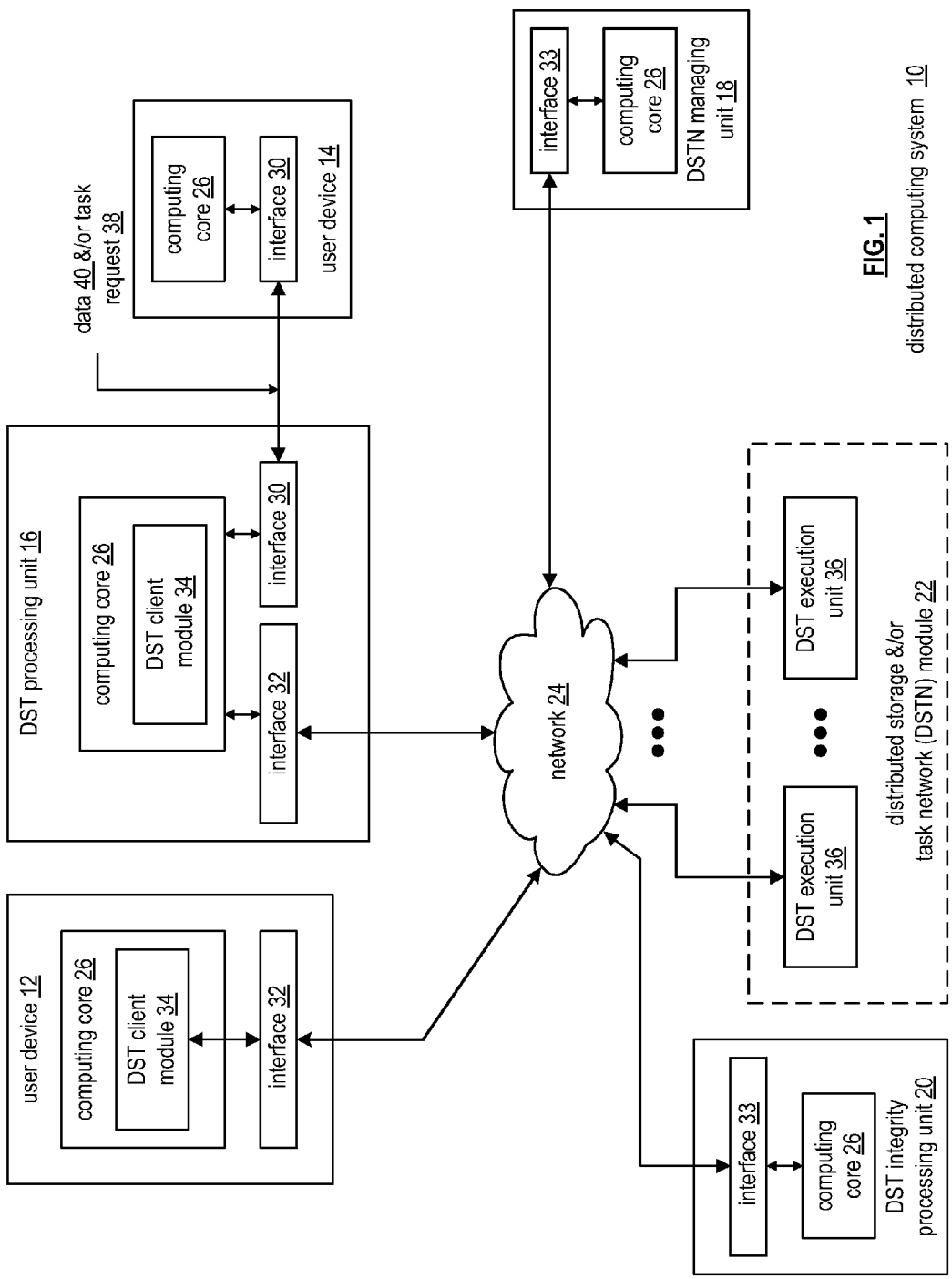
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
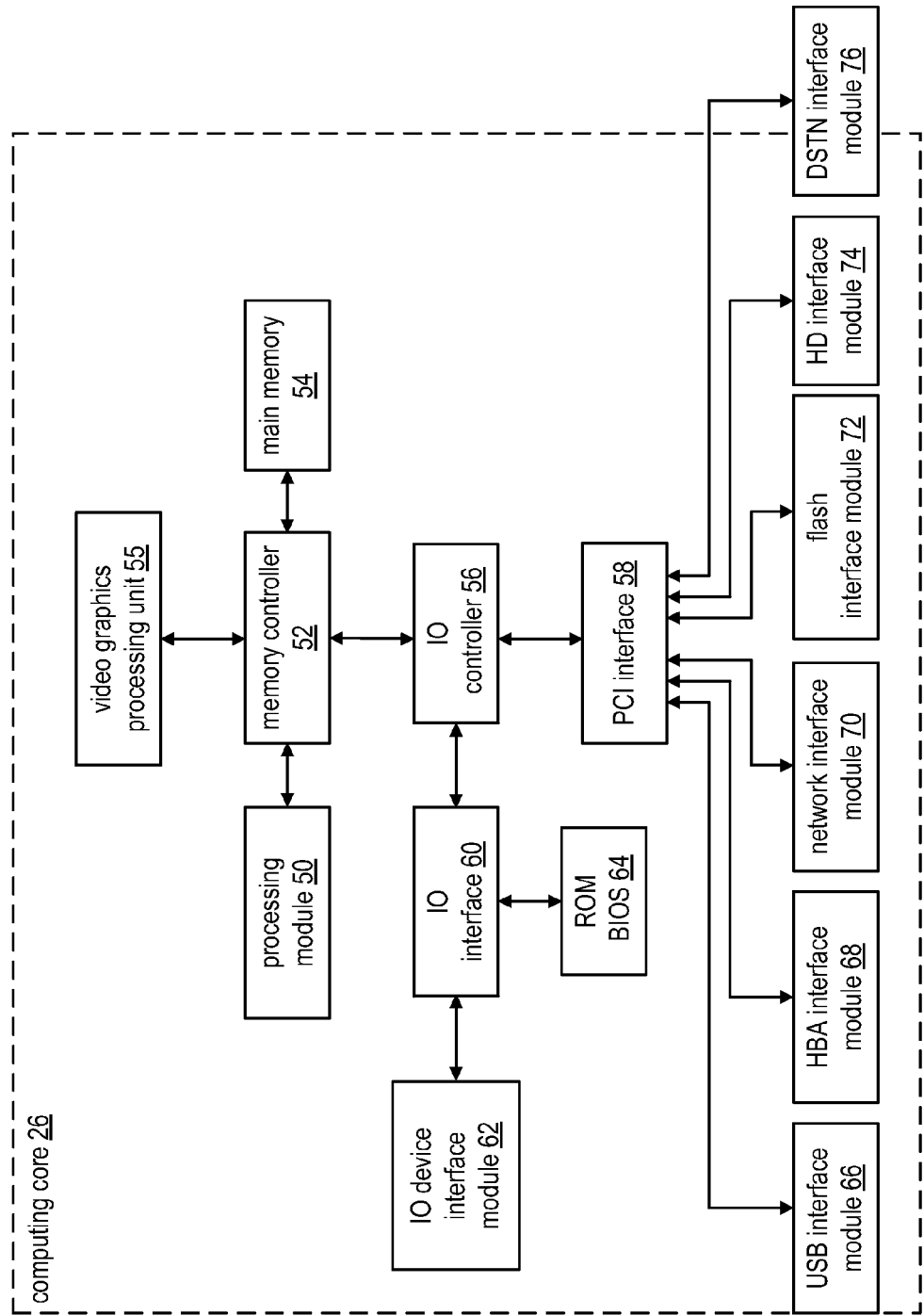
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
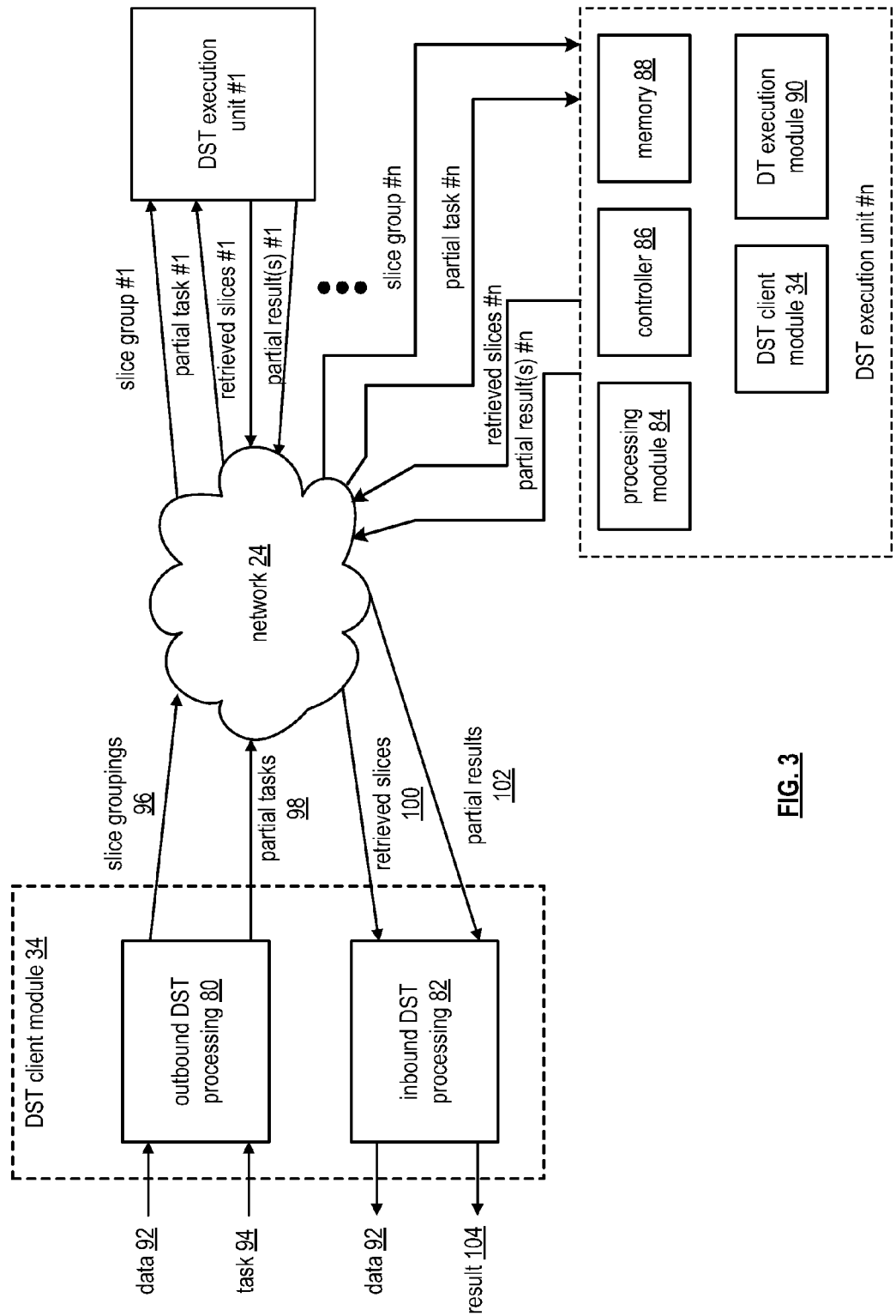
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module).

In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
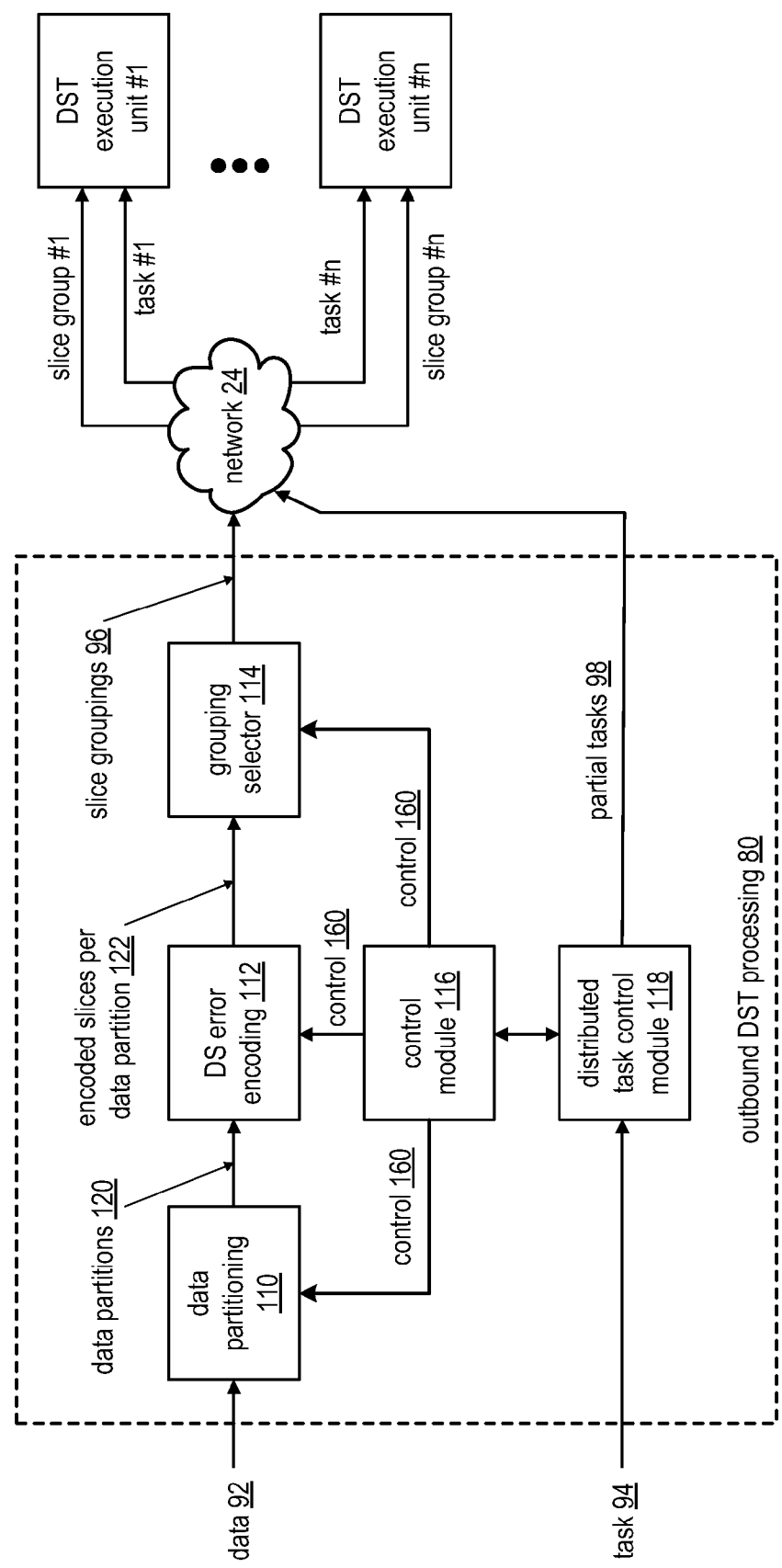
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
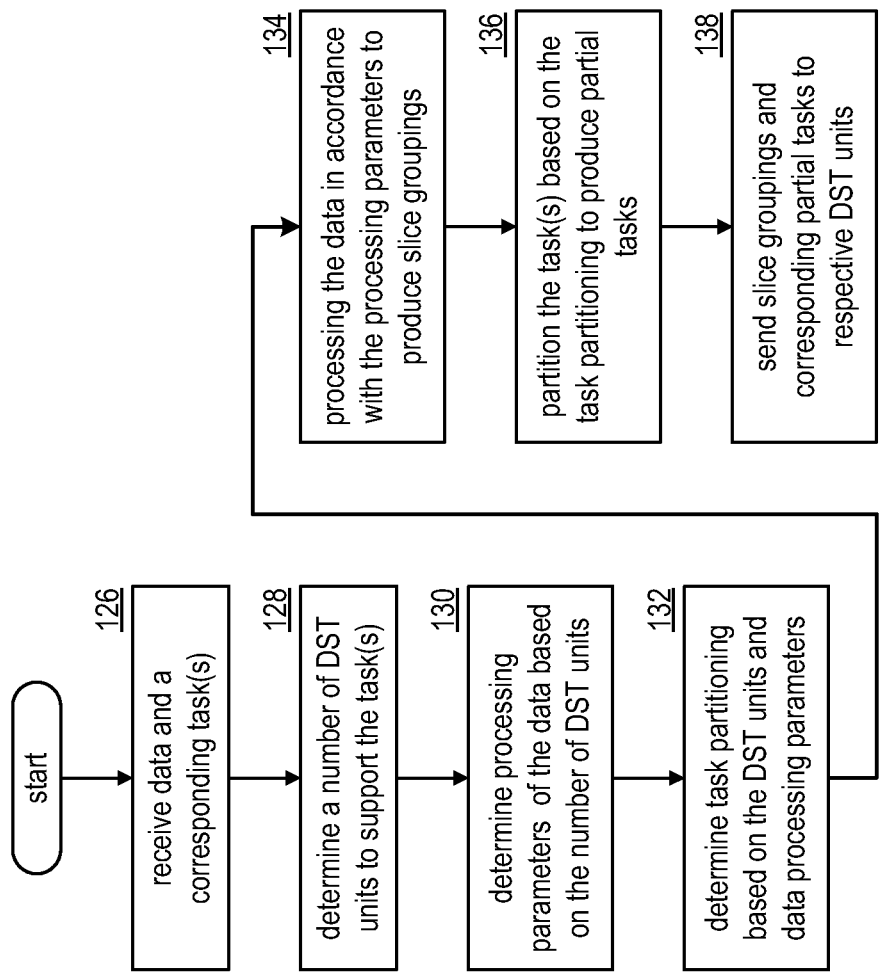
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
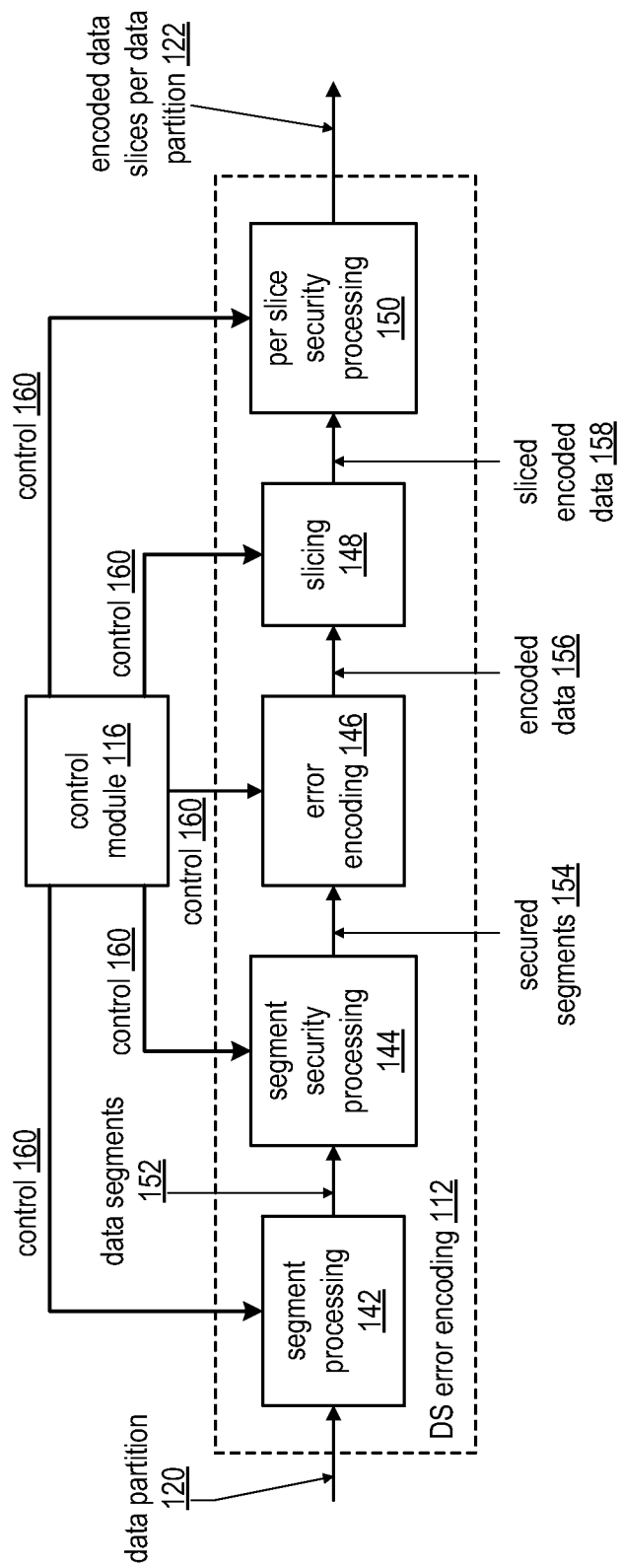
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
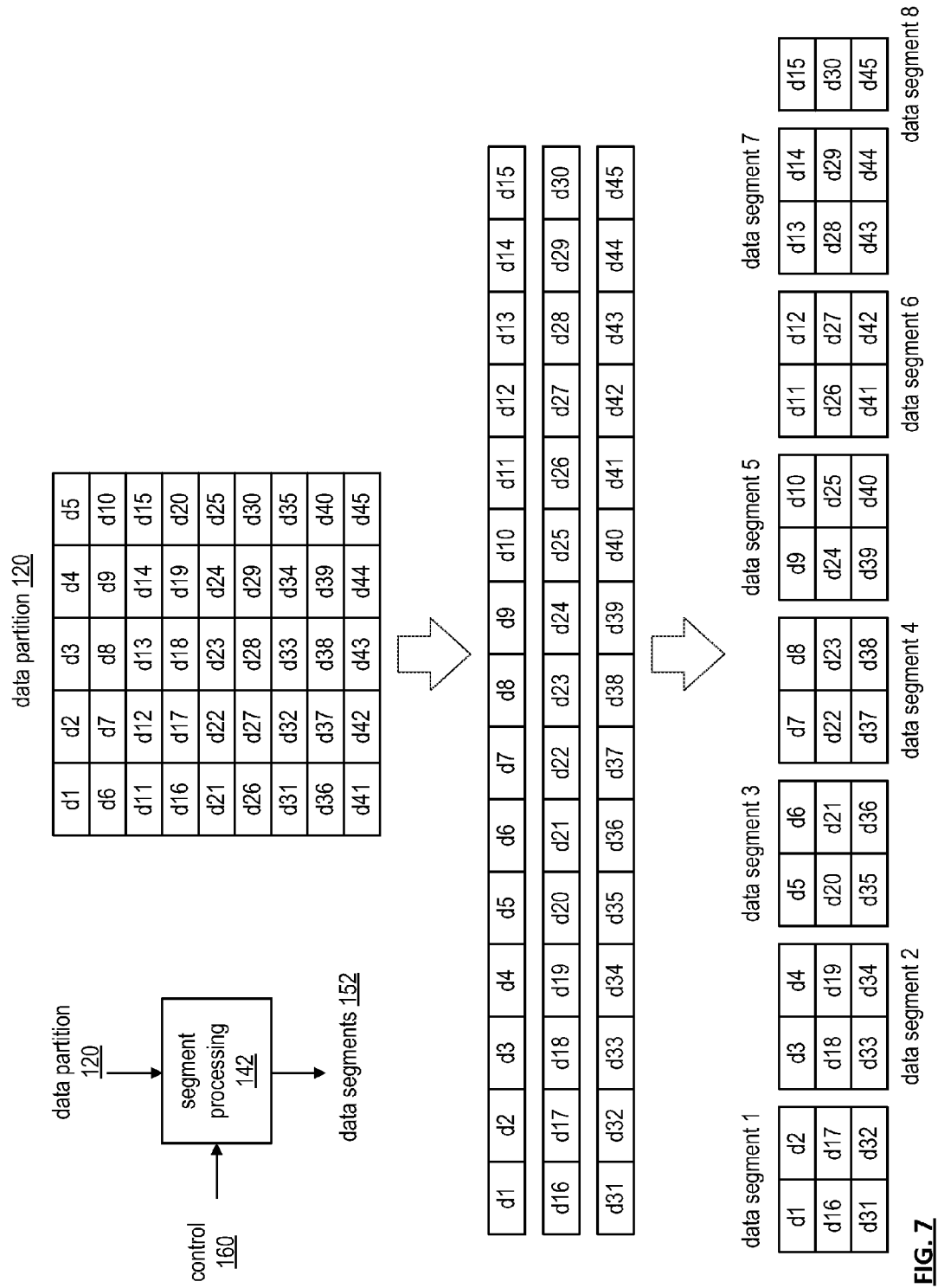
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
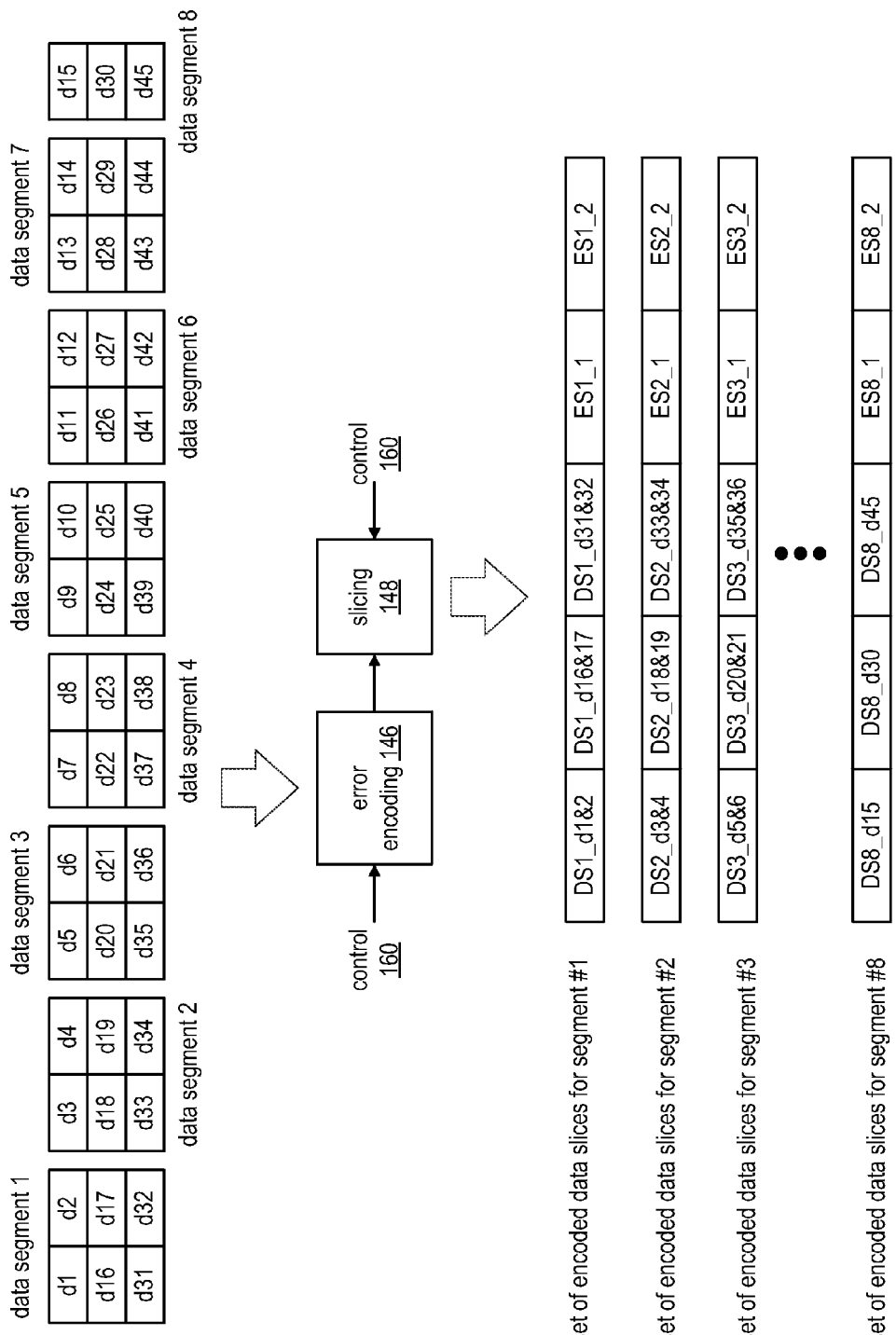
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
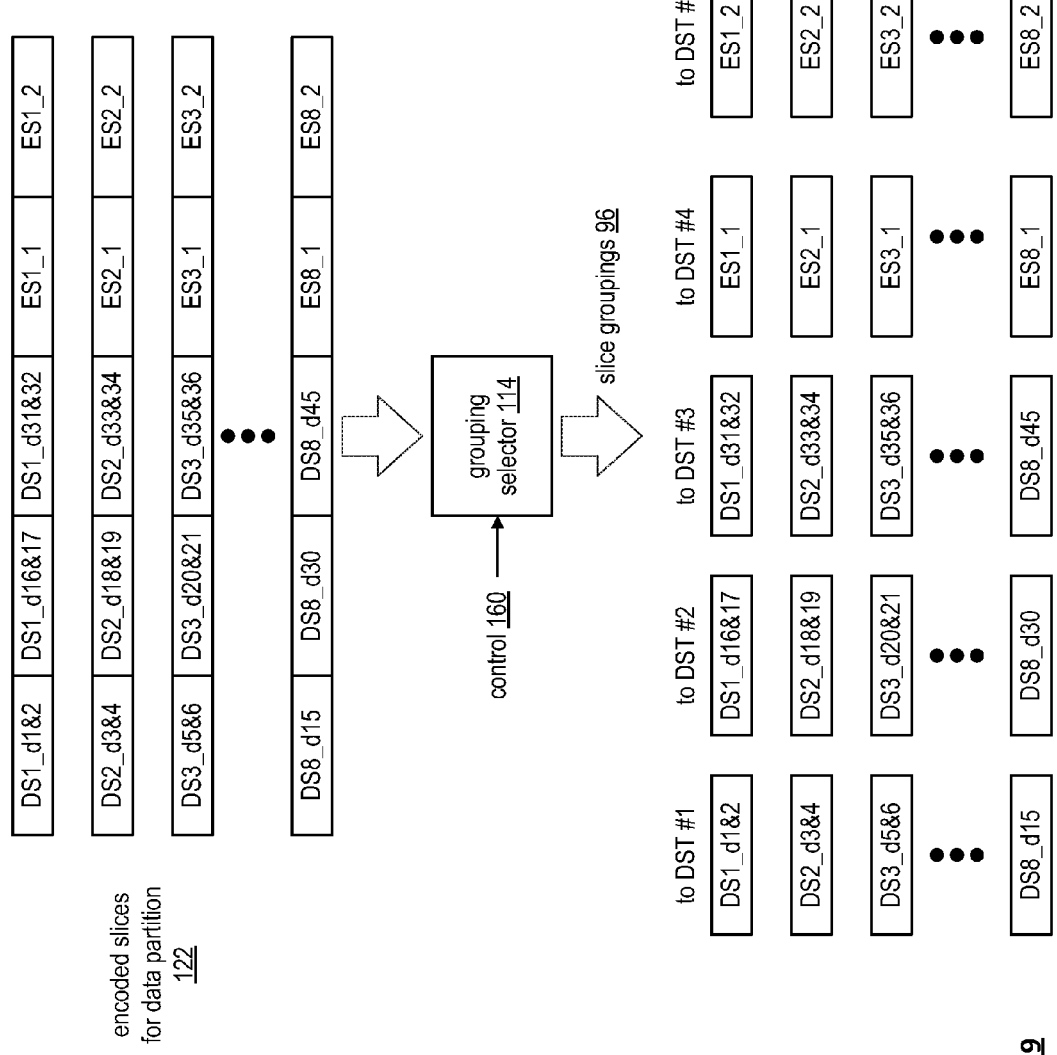
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selection module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
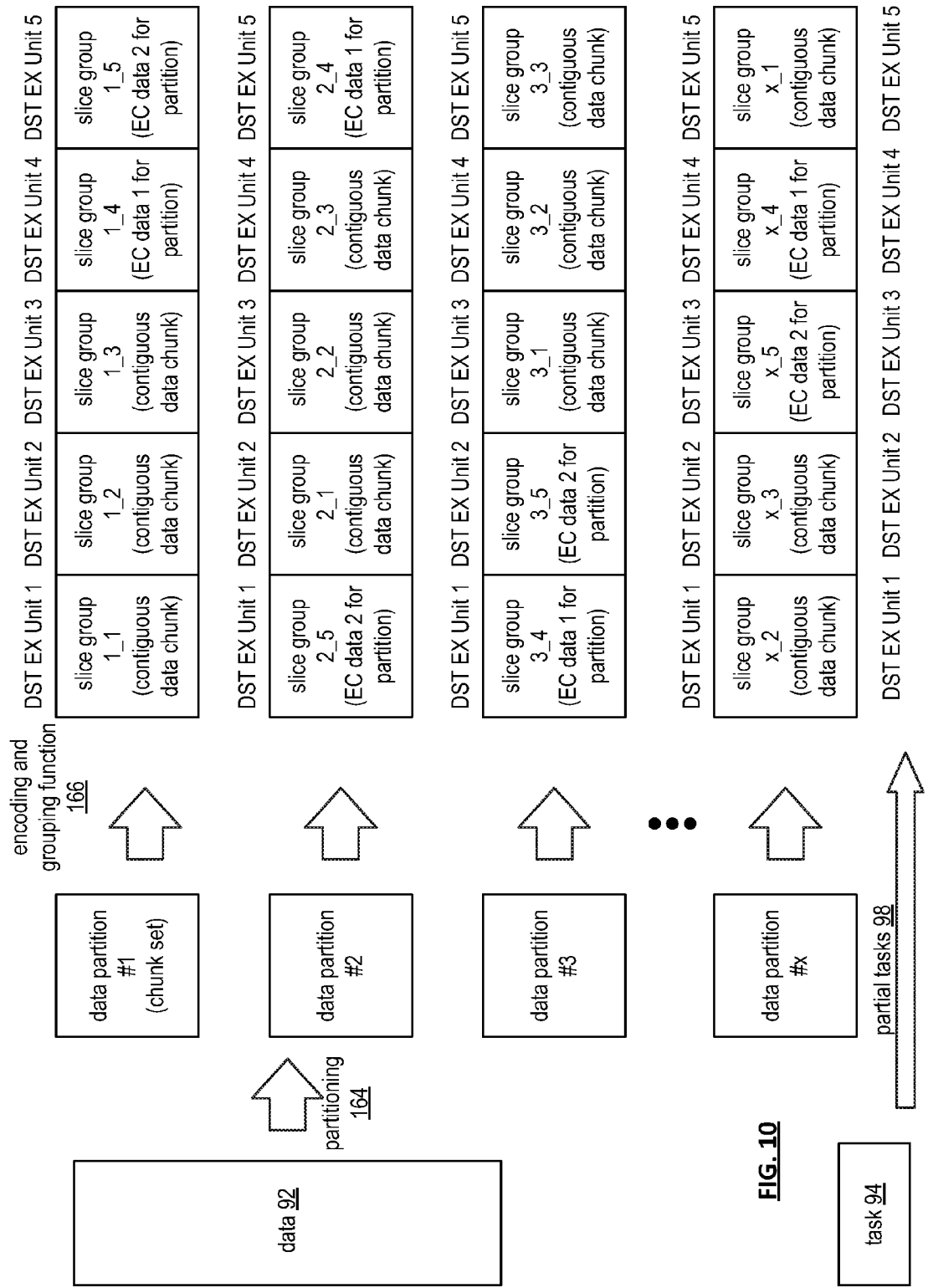
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
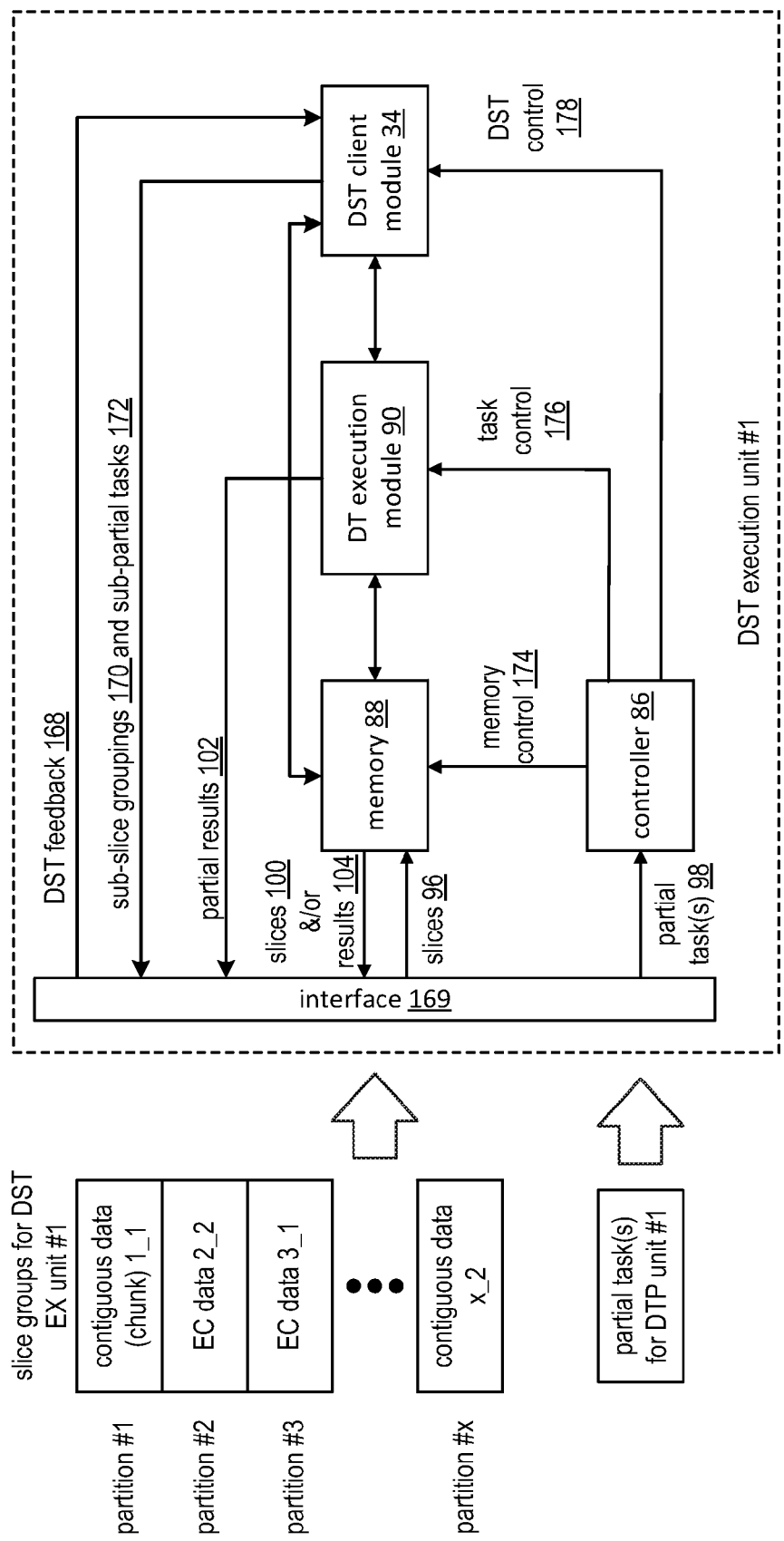
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
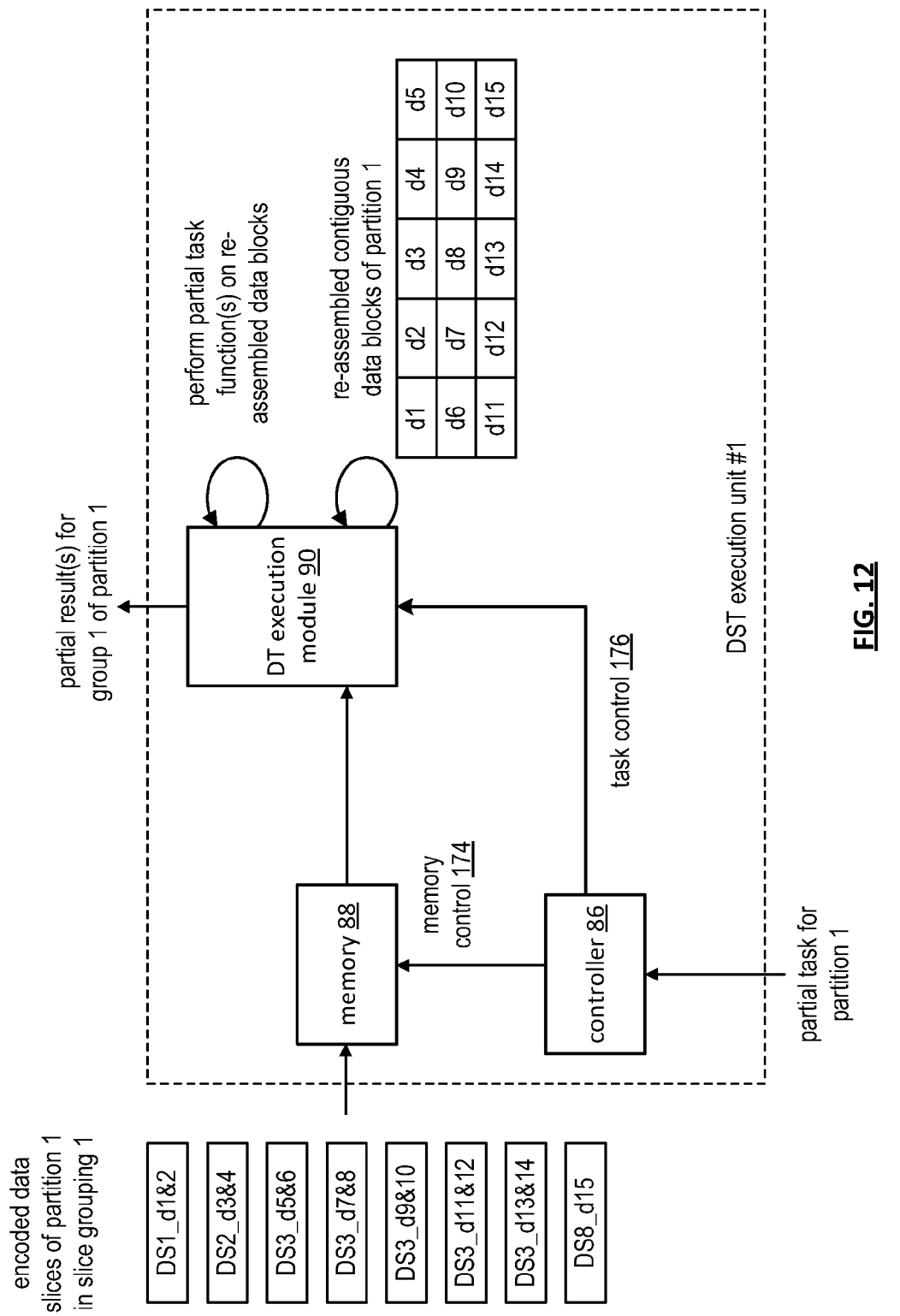
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
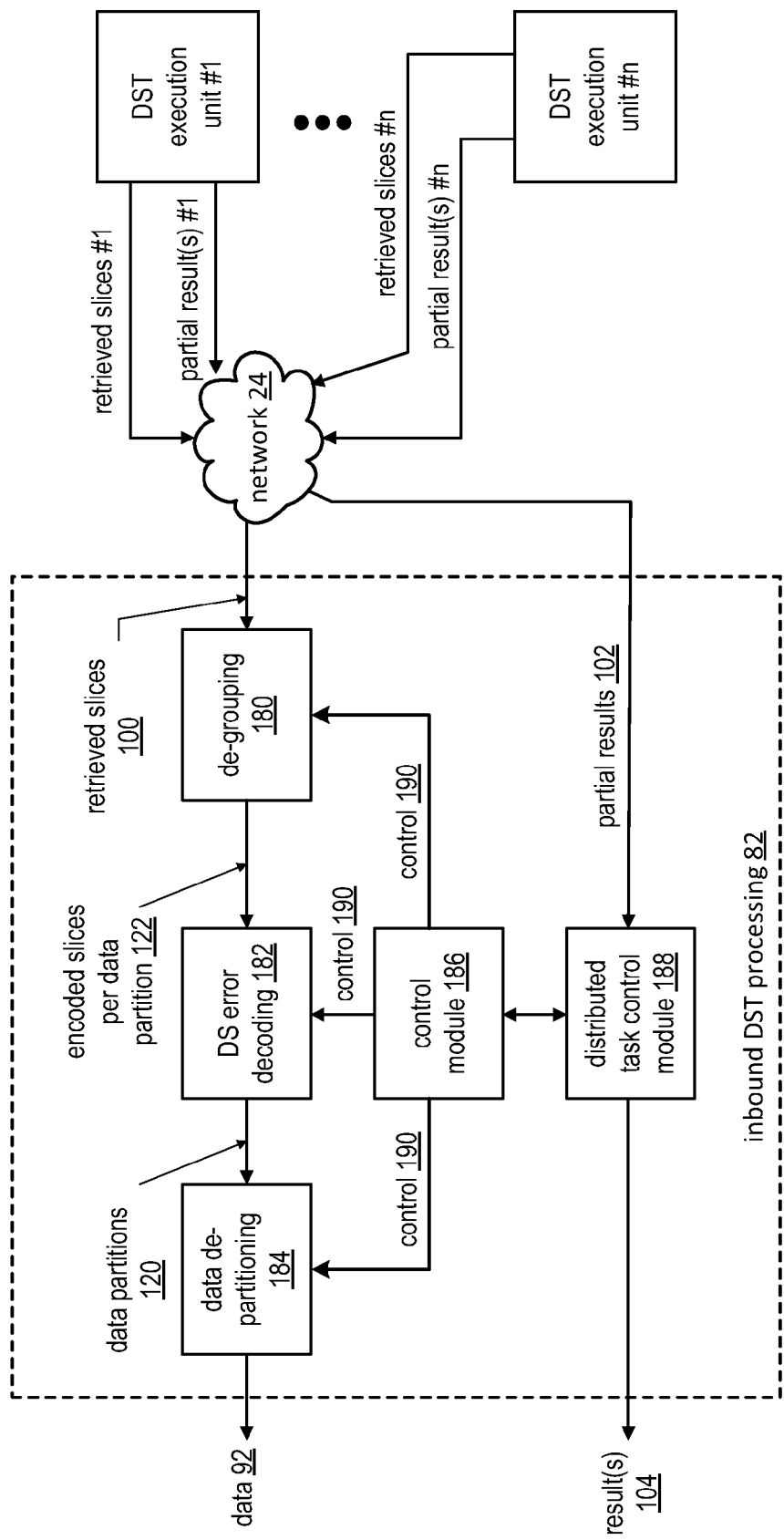
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
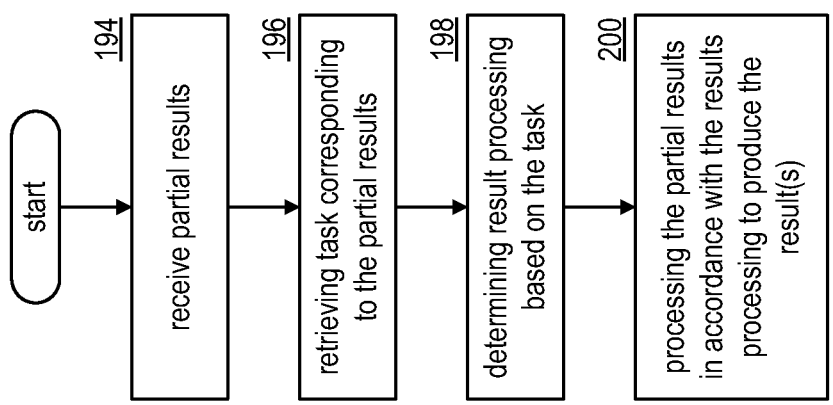
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
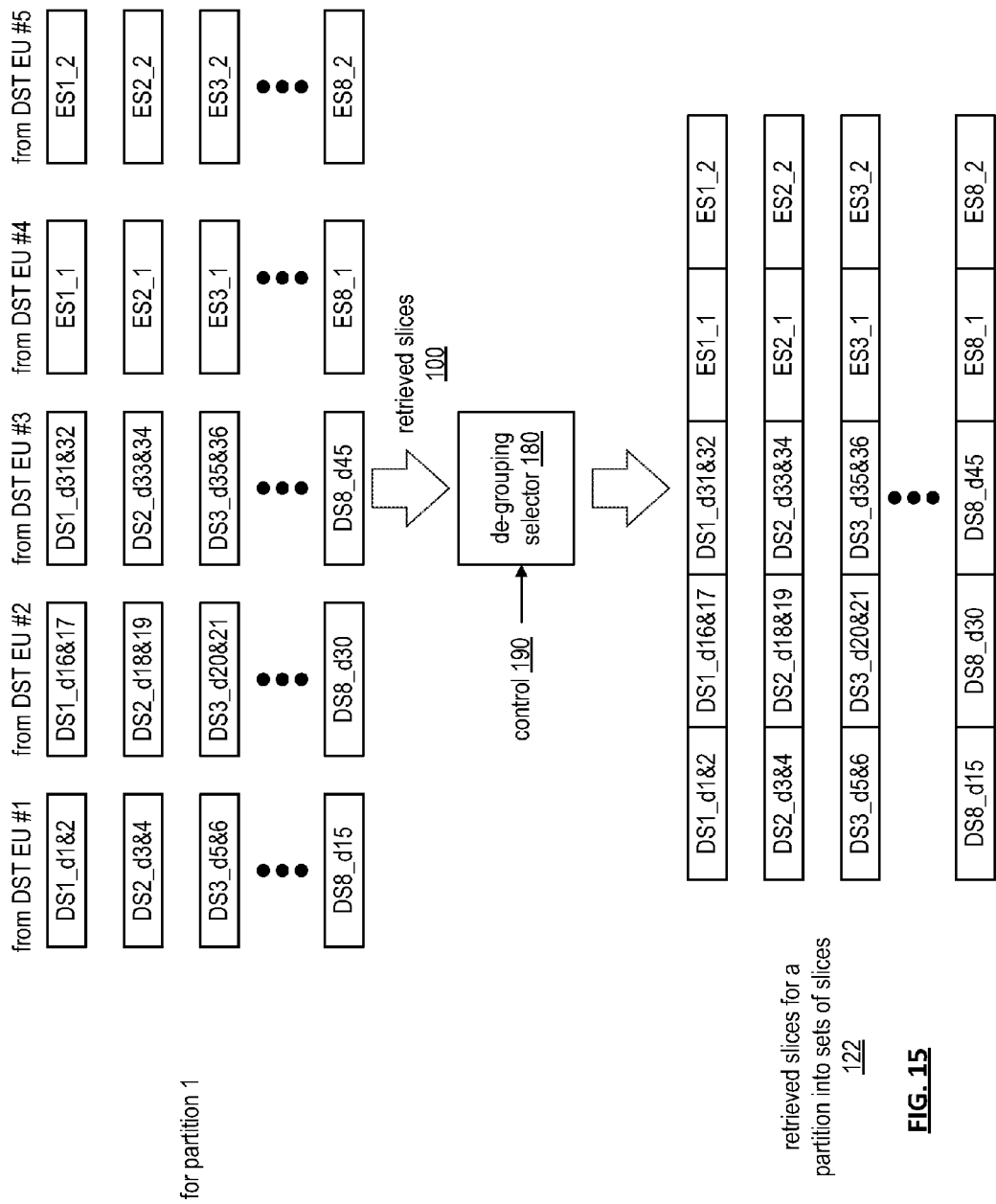
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
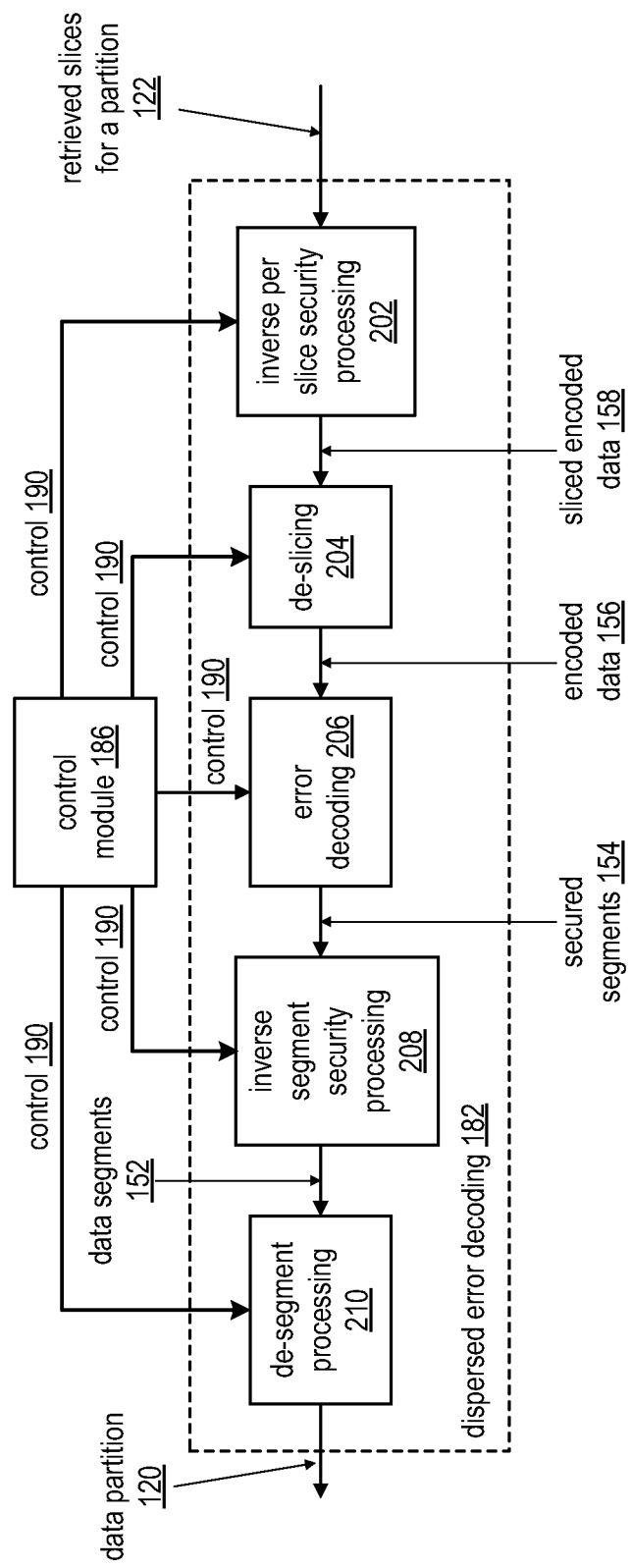
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
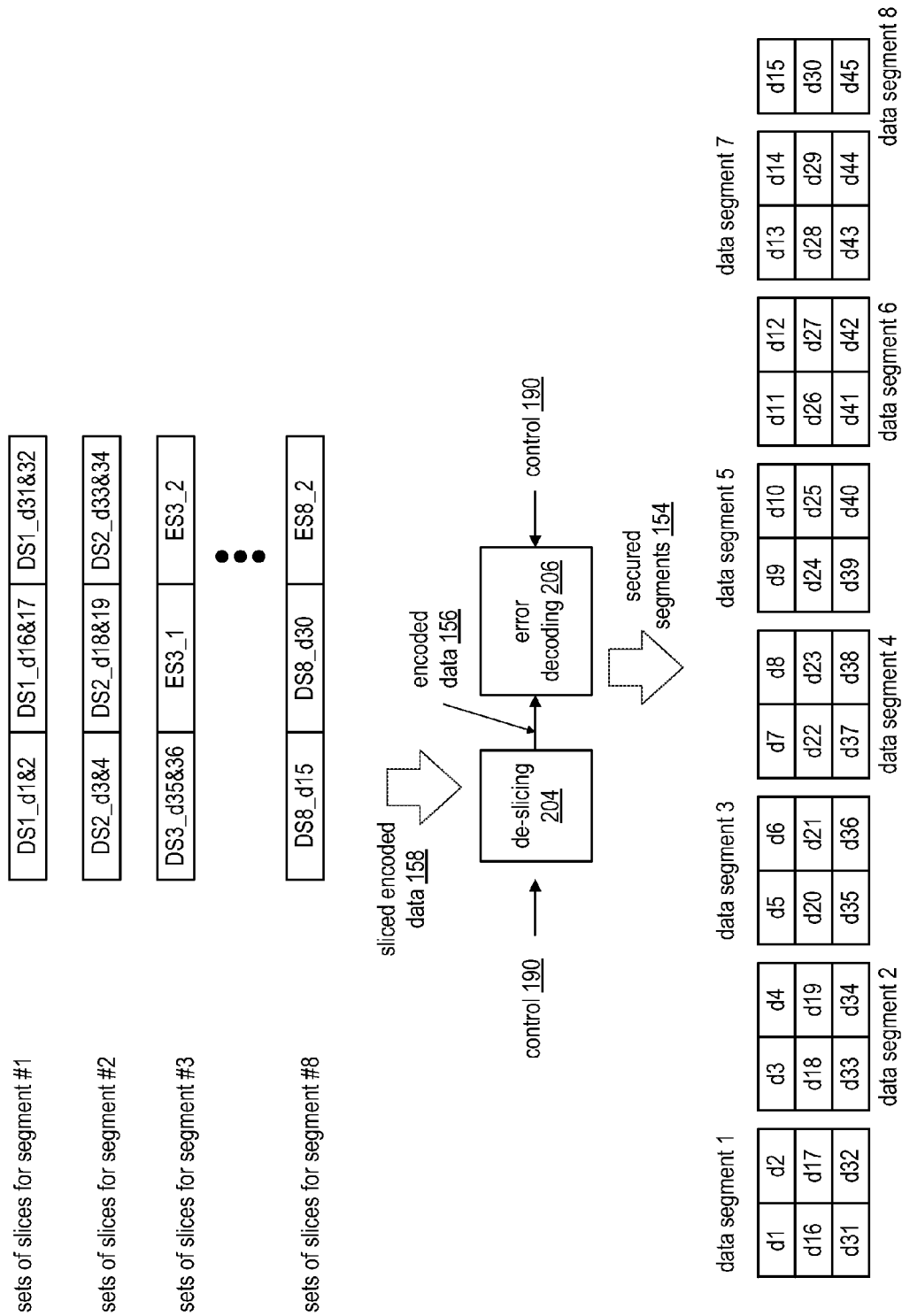
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
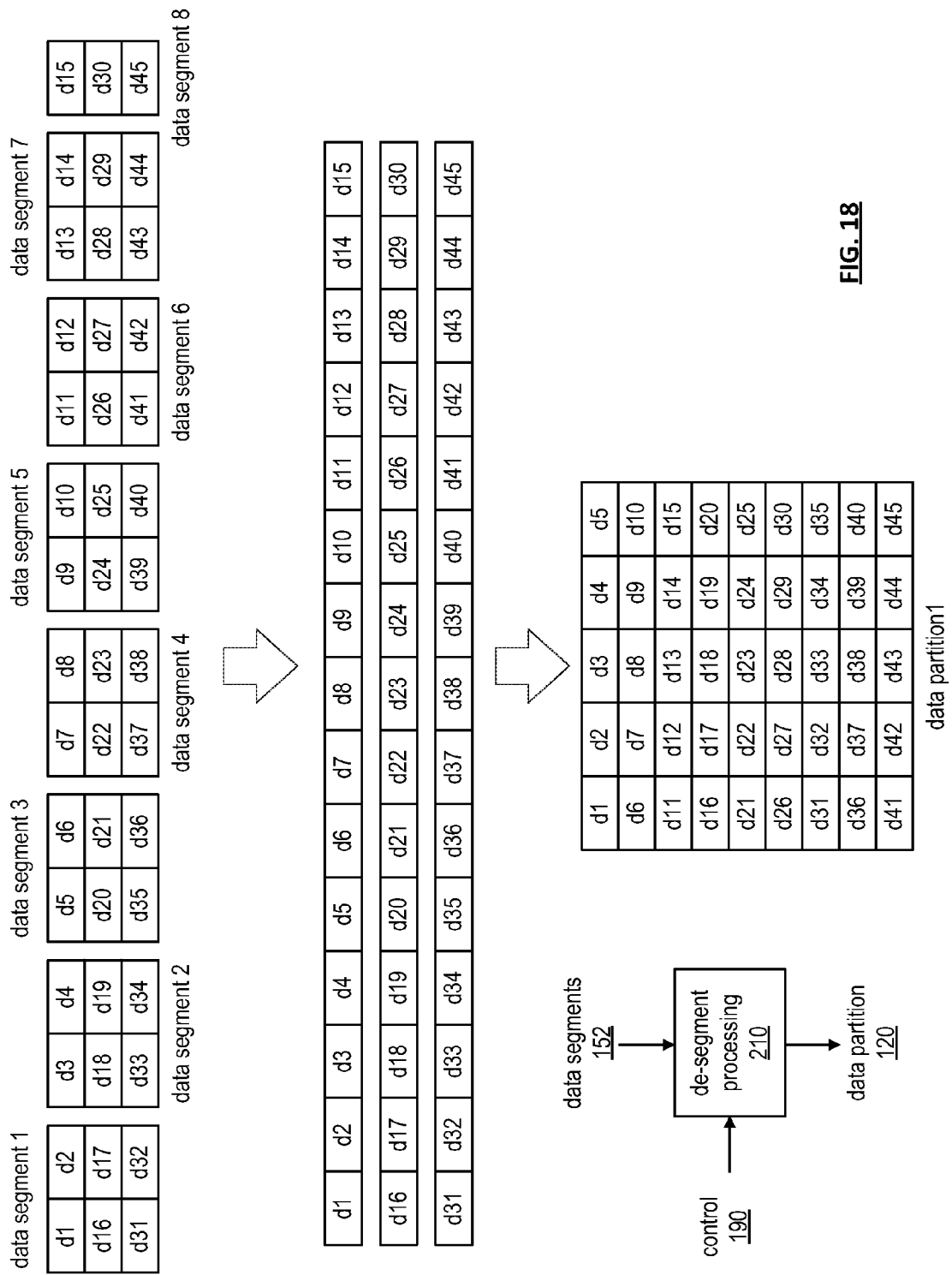
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
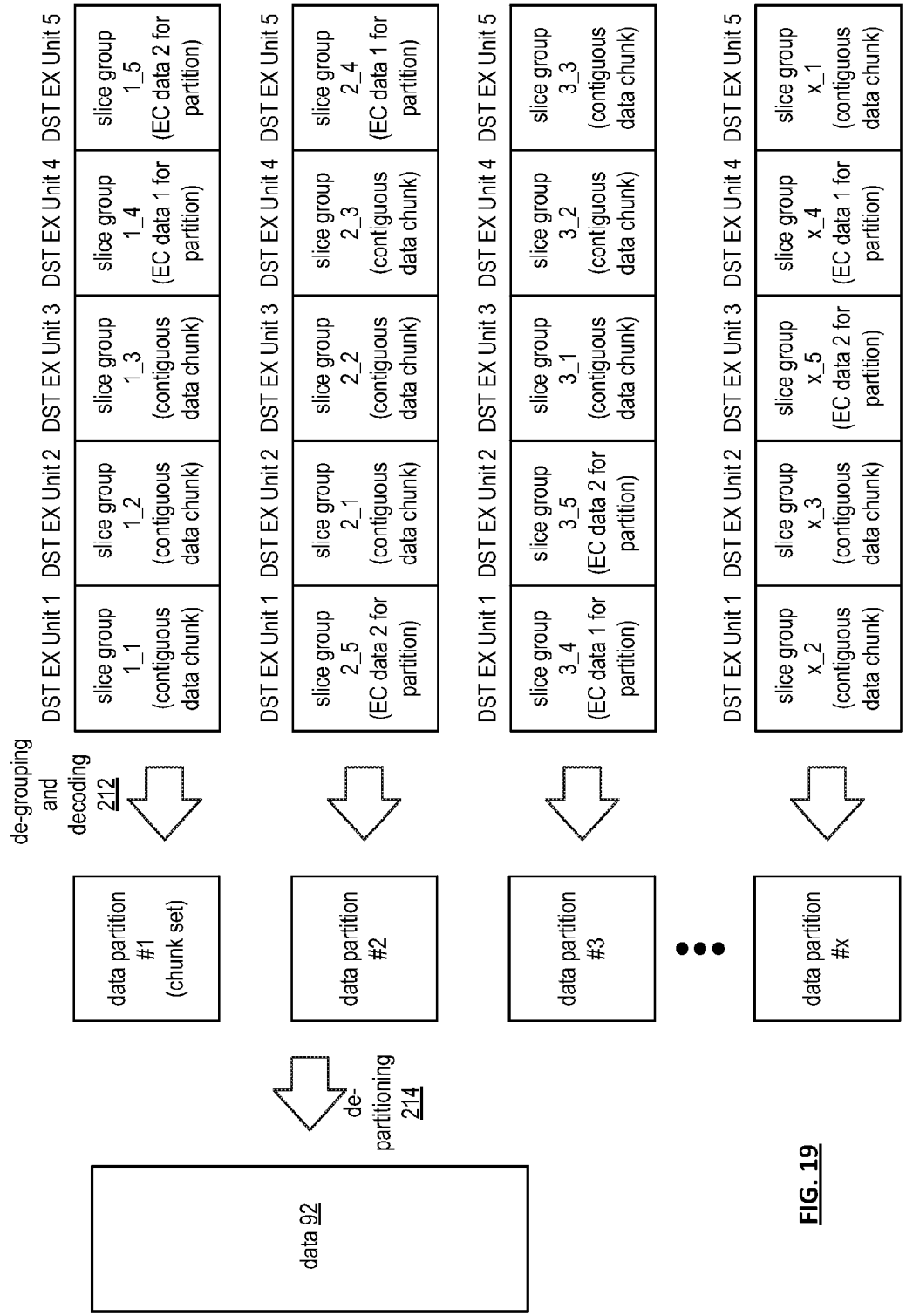
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
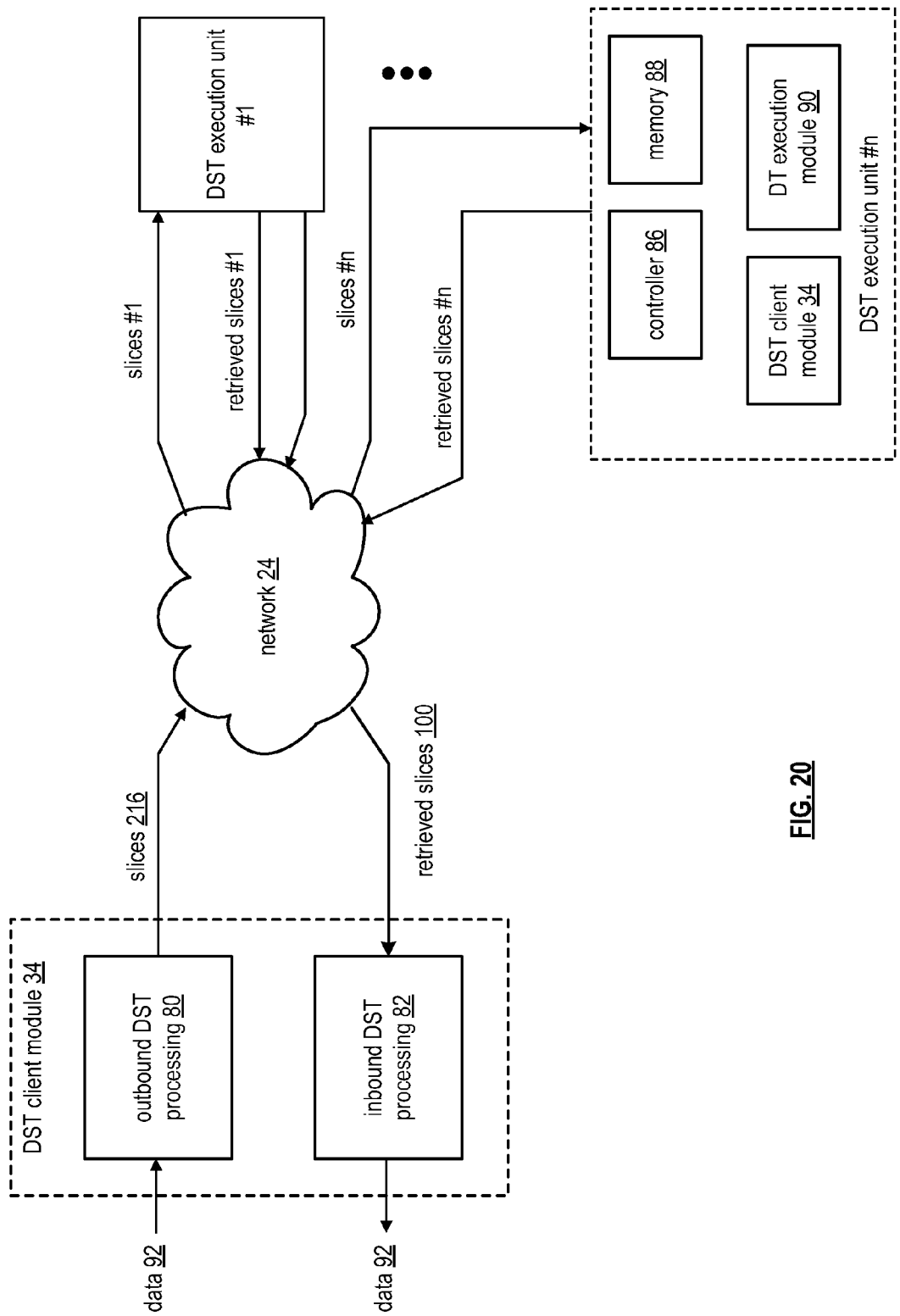
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
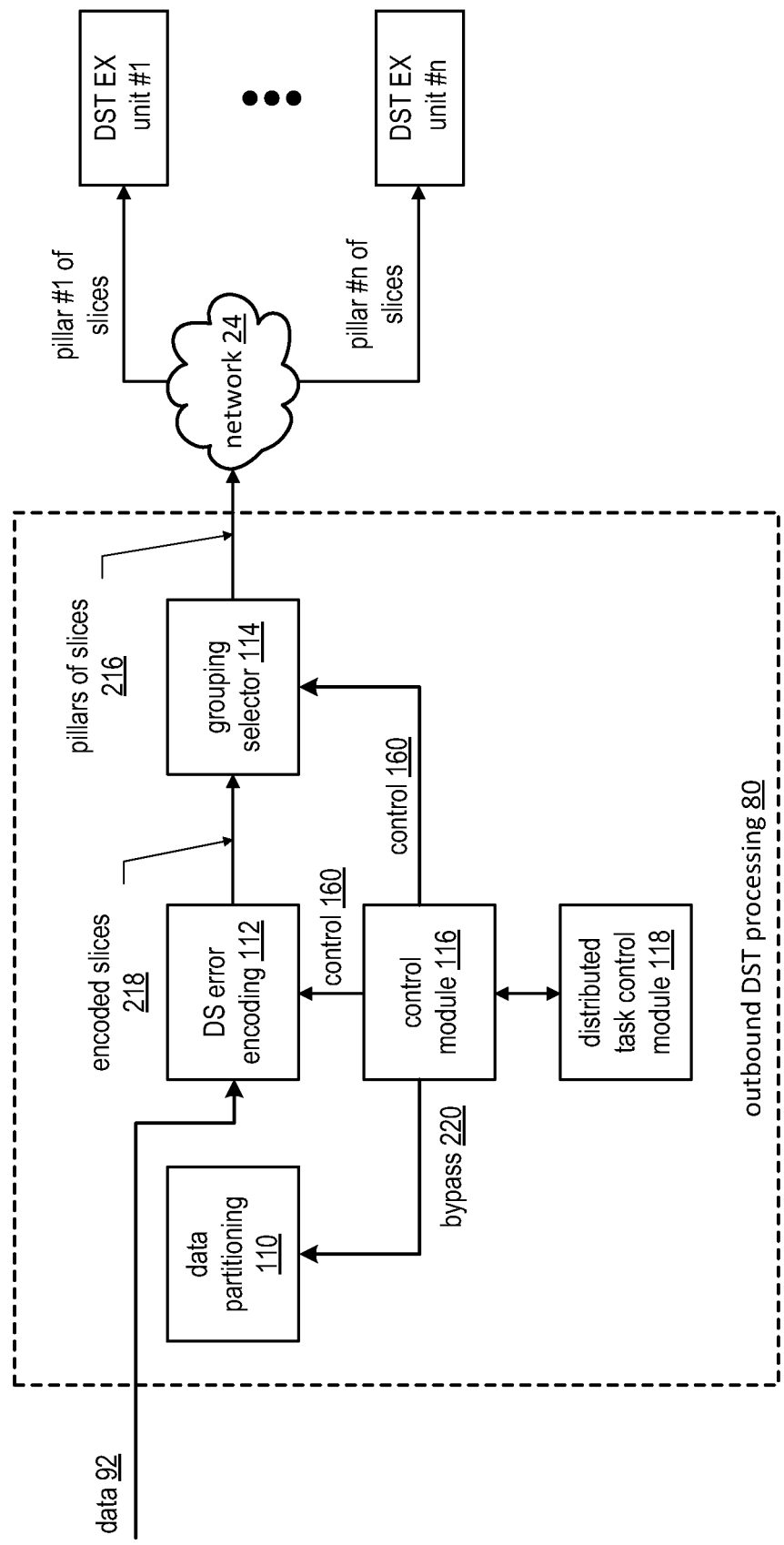
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
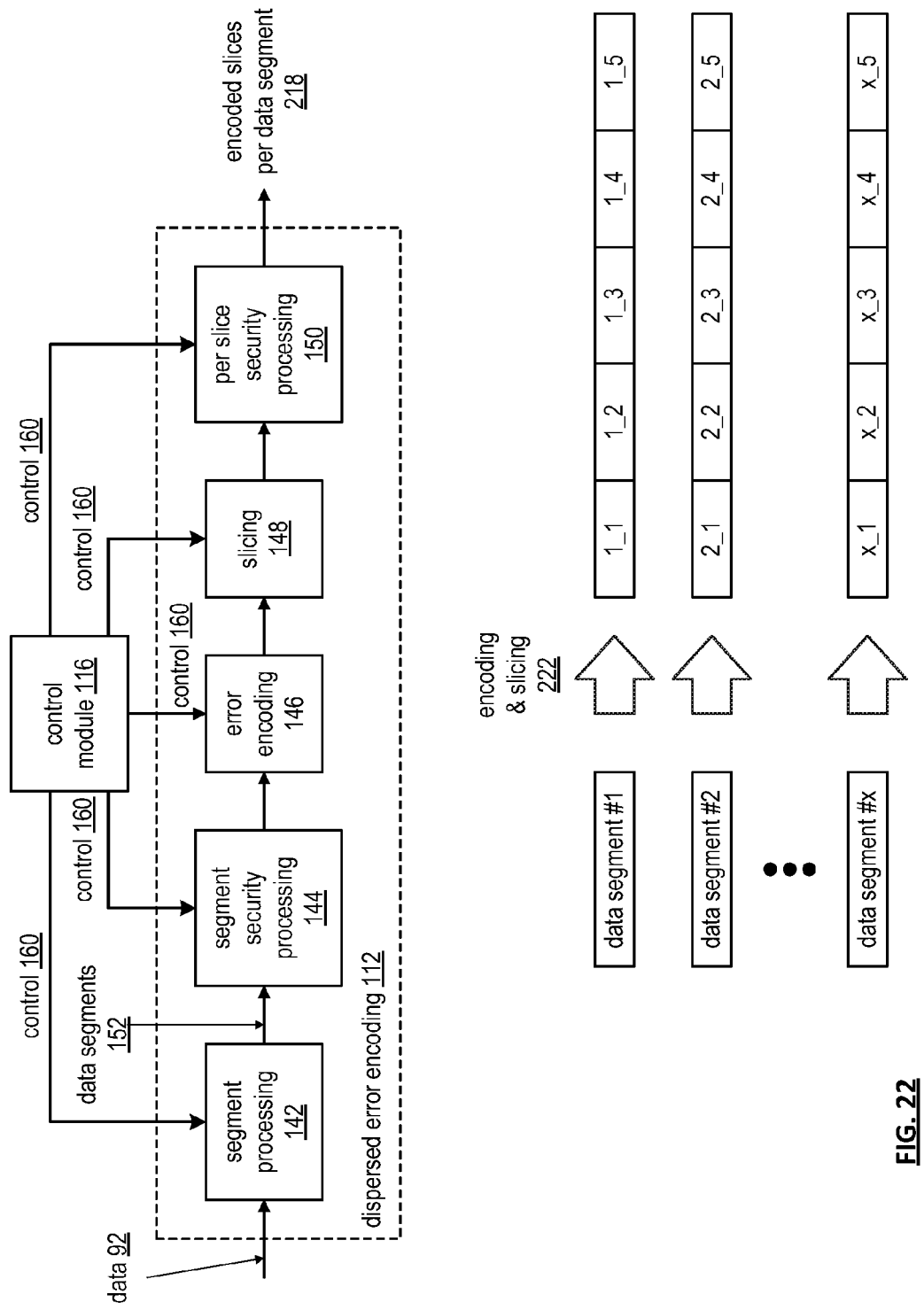
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
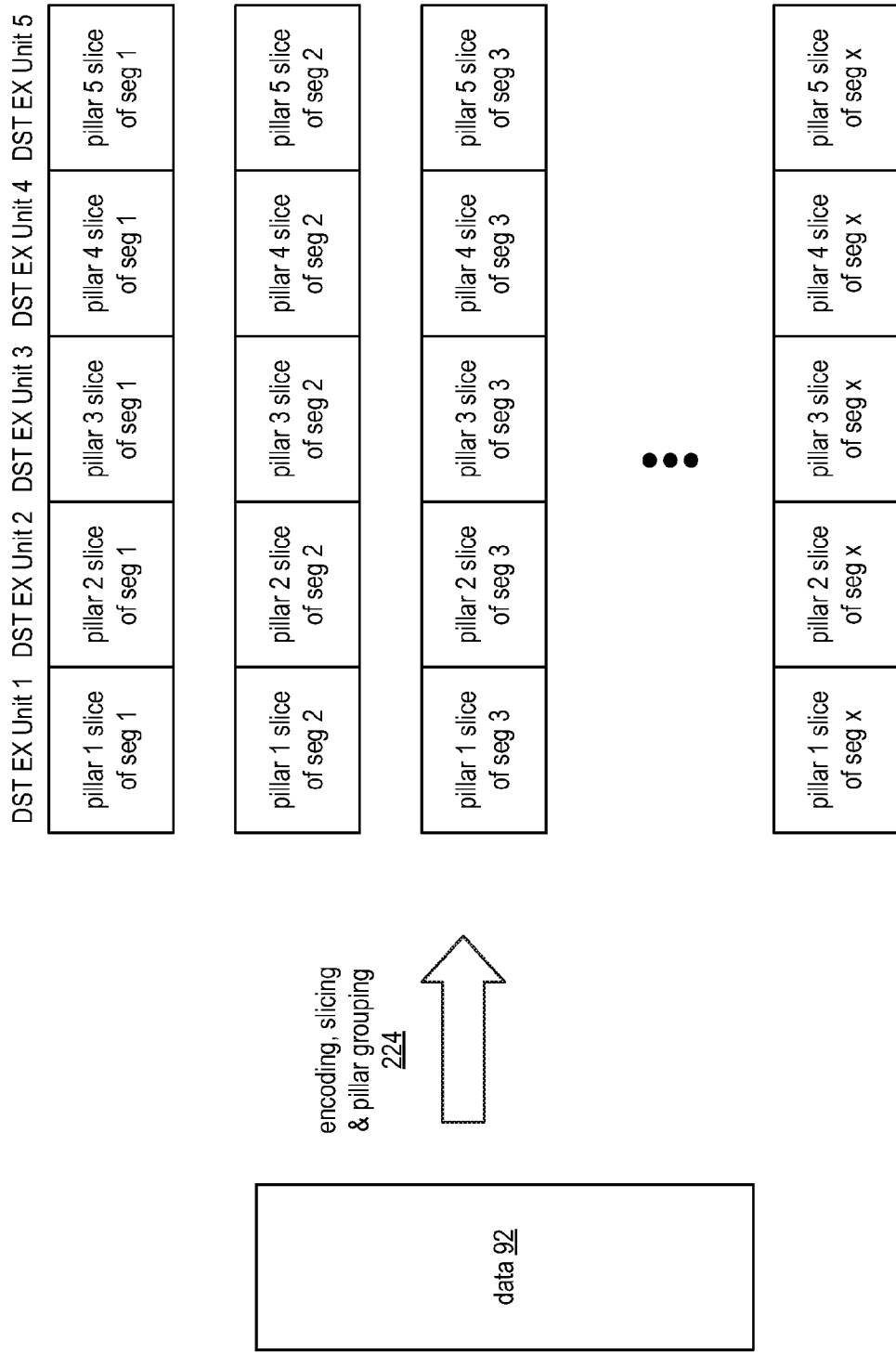
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
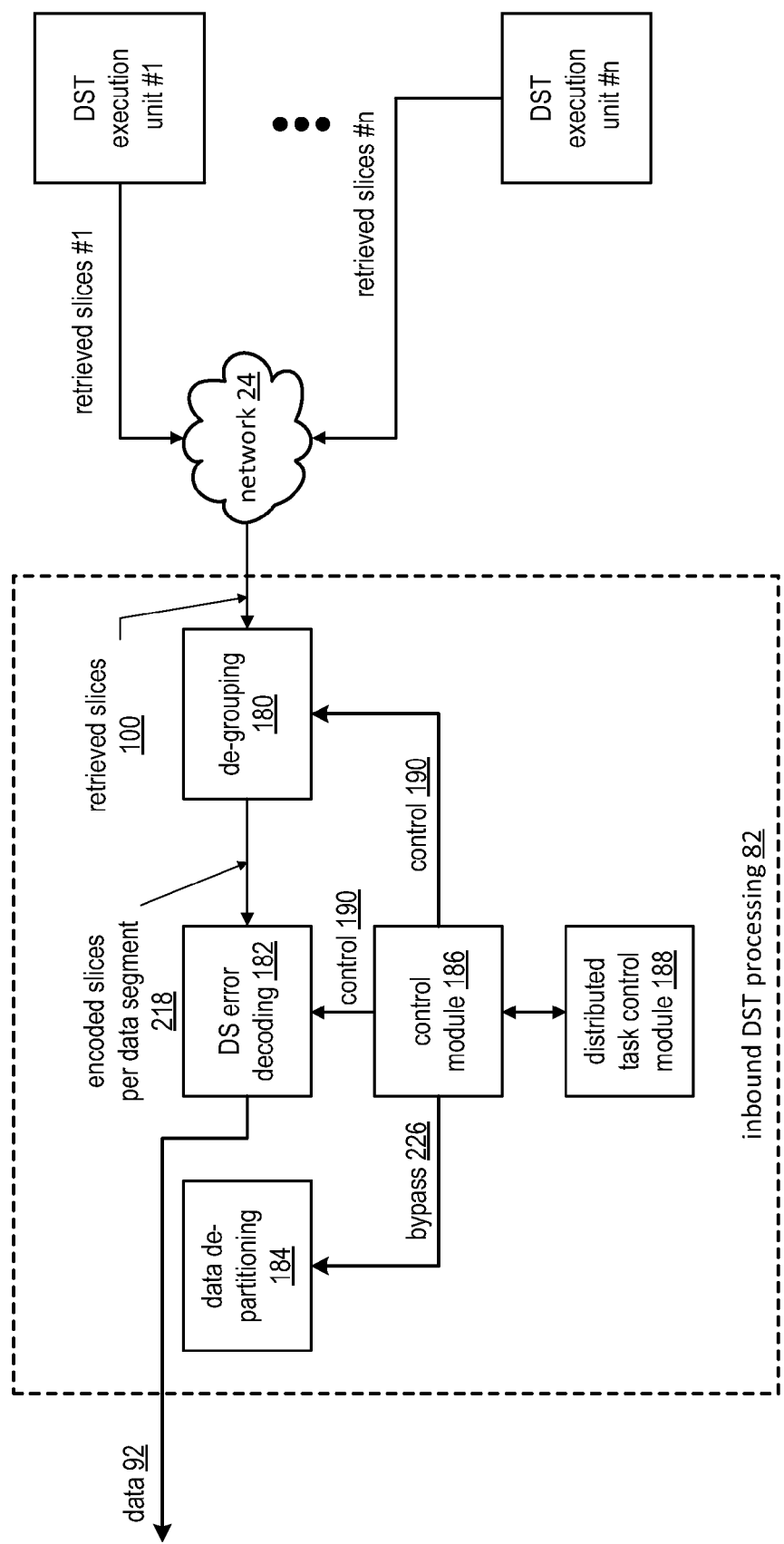
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
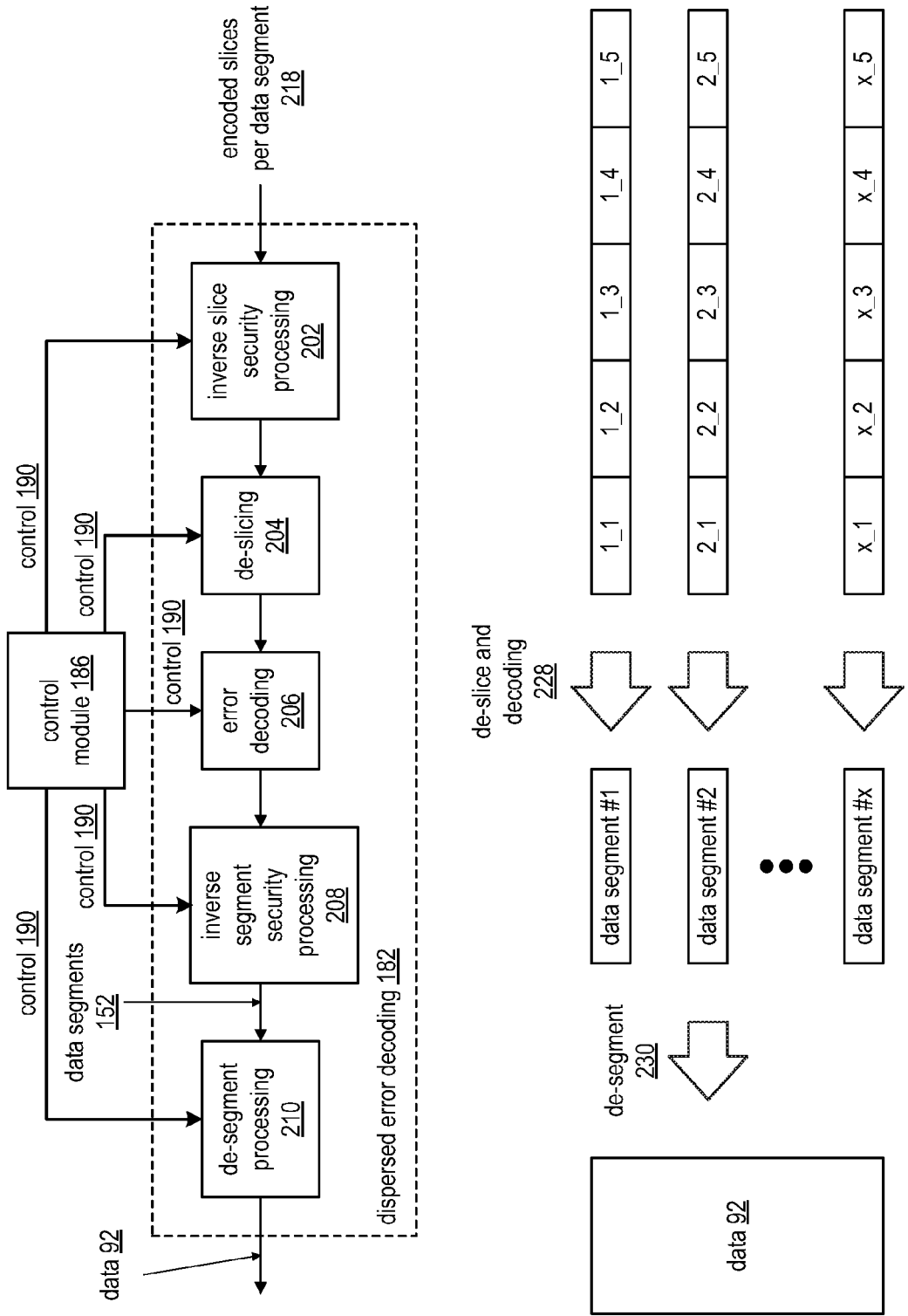
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
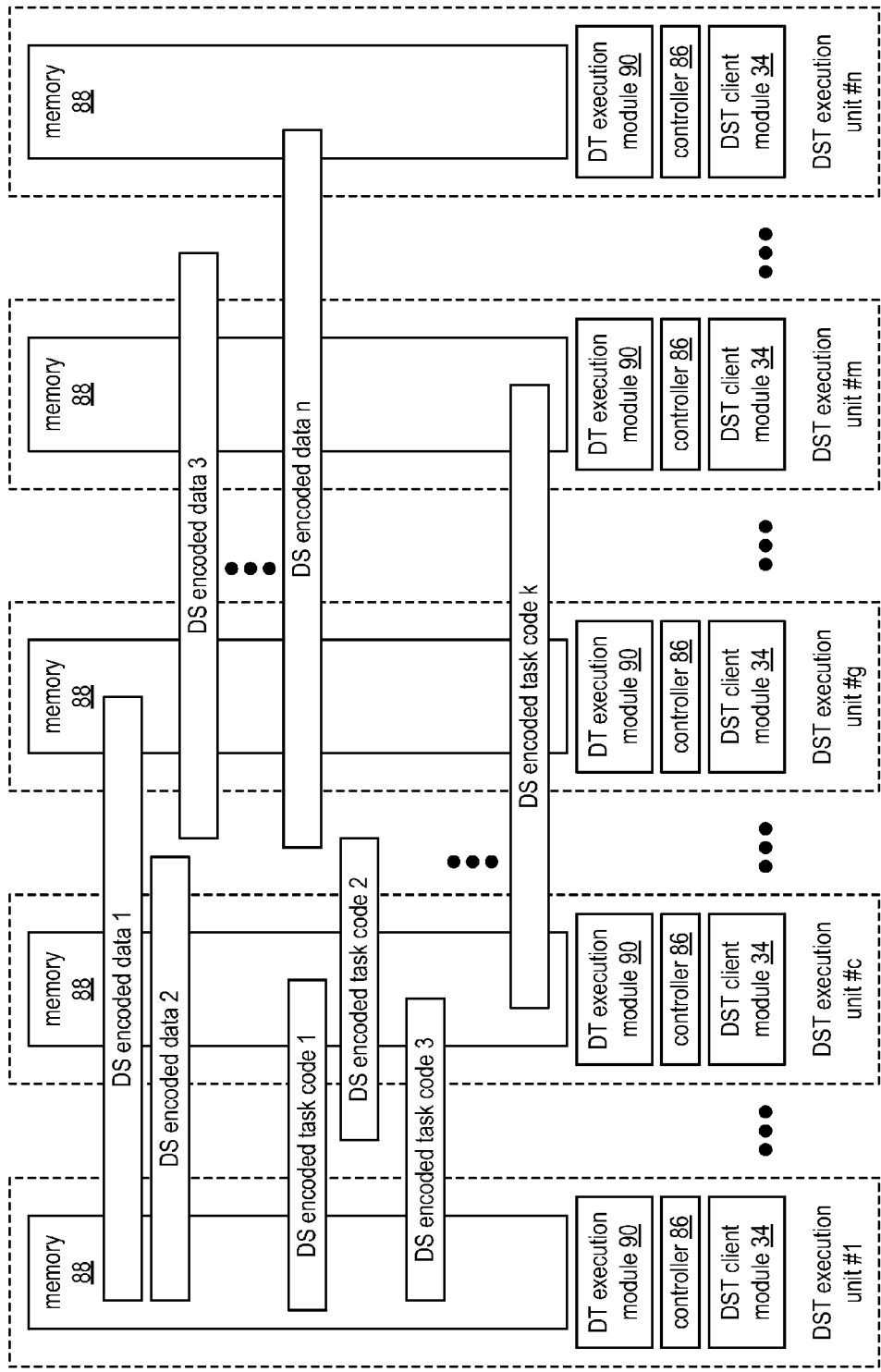
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
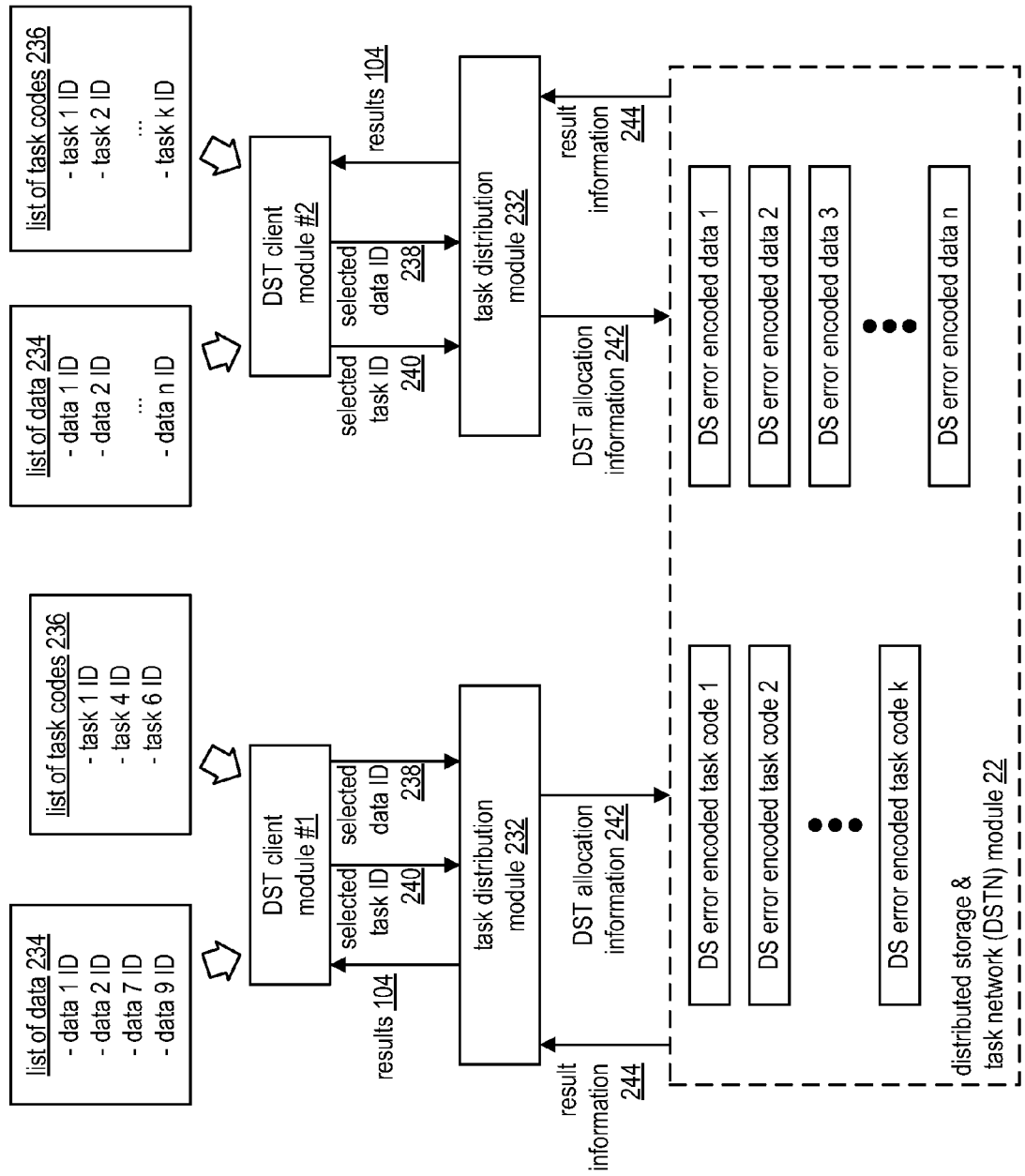
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
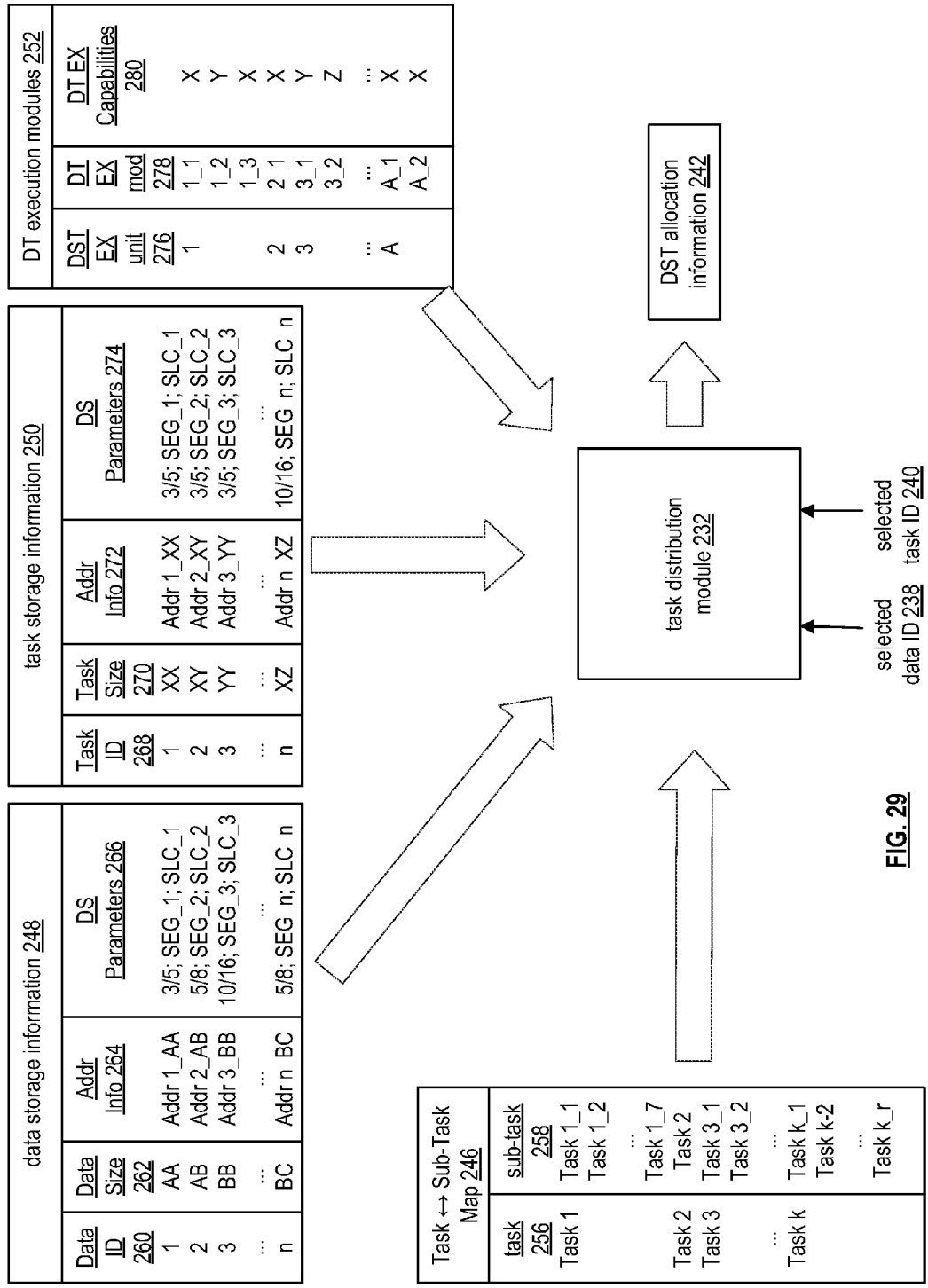
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
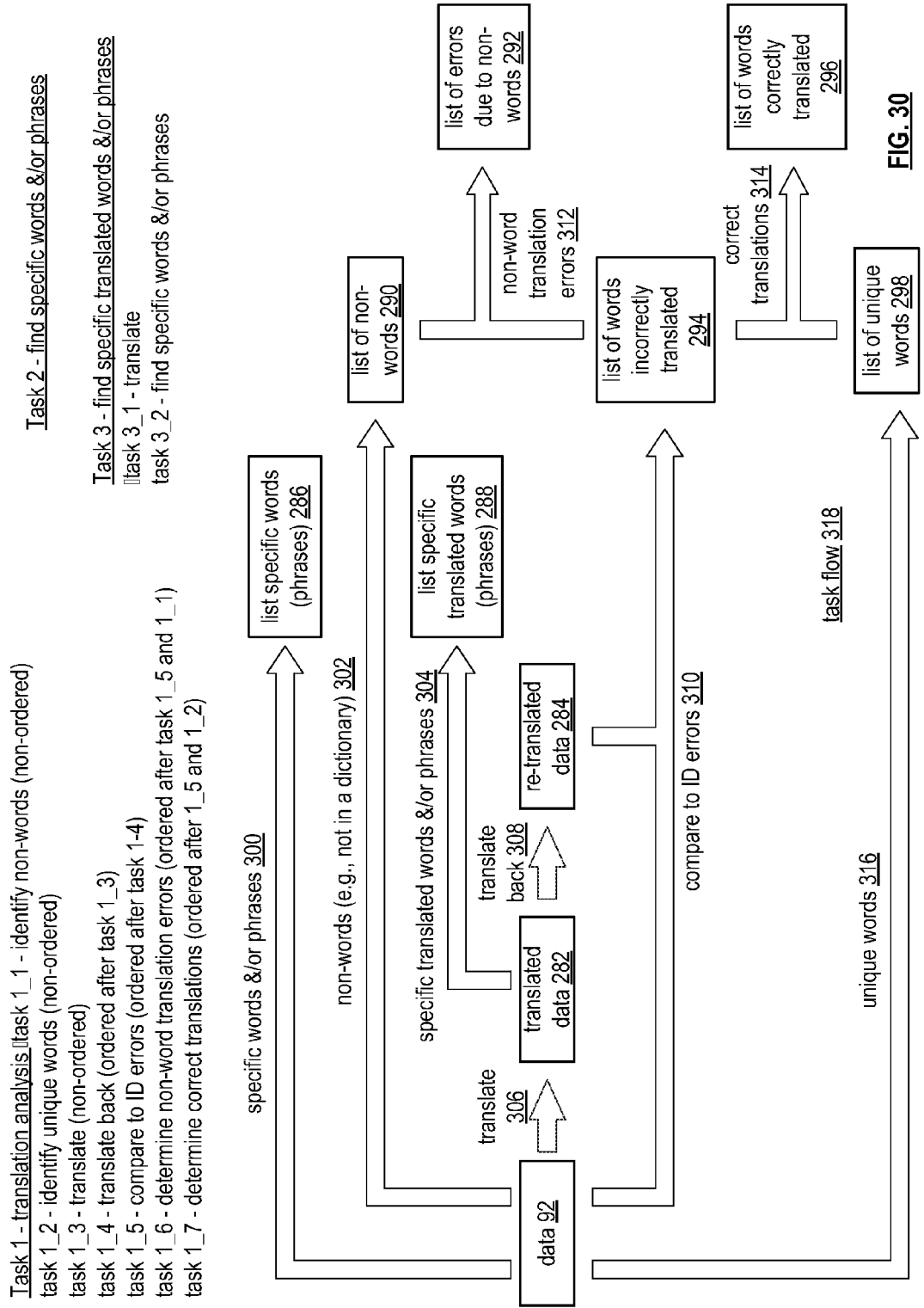
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6 —determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
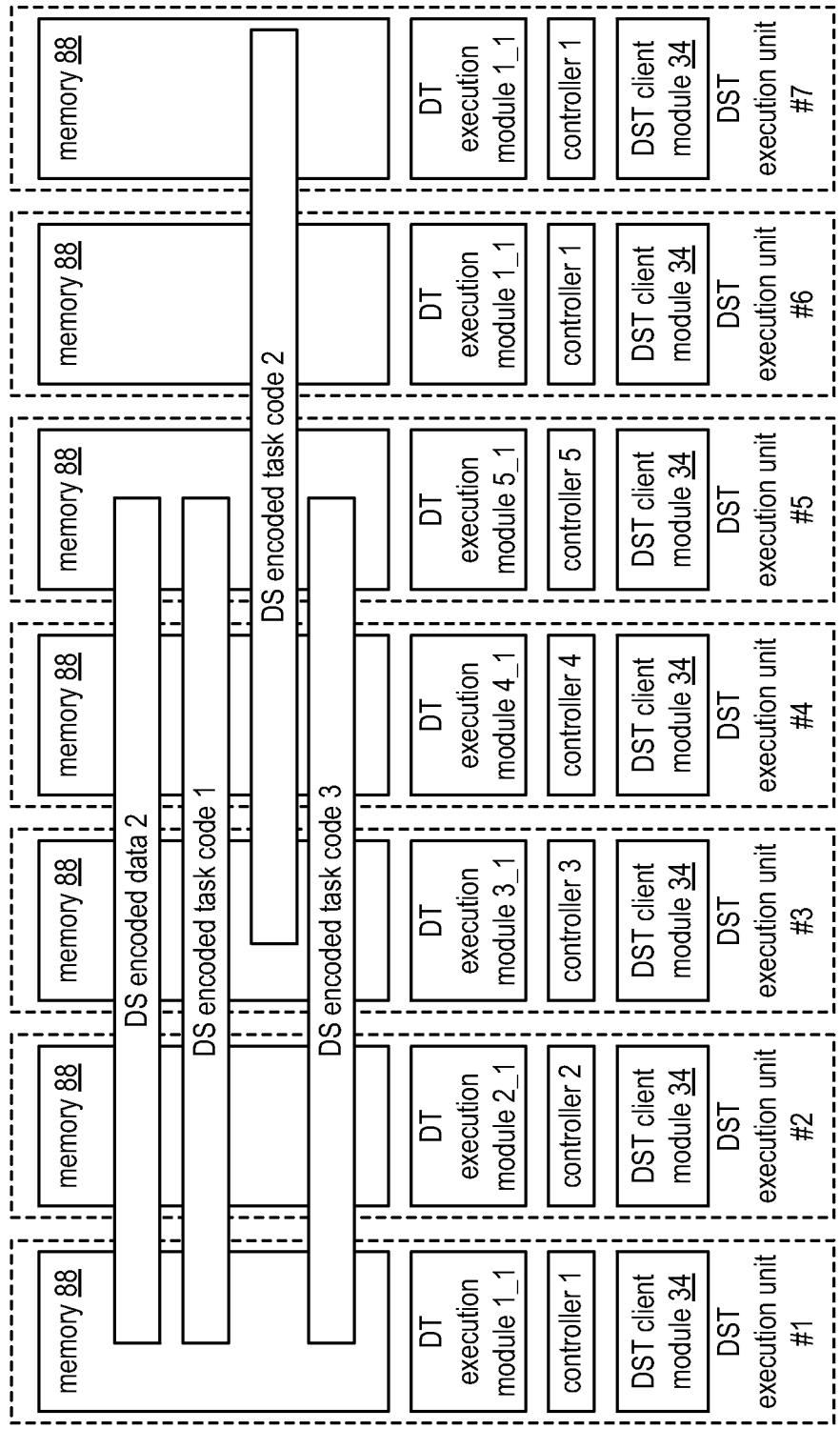
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task _5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
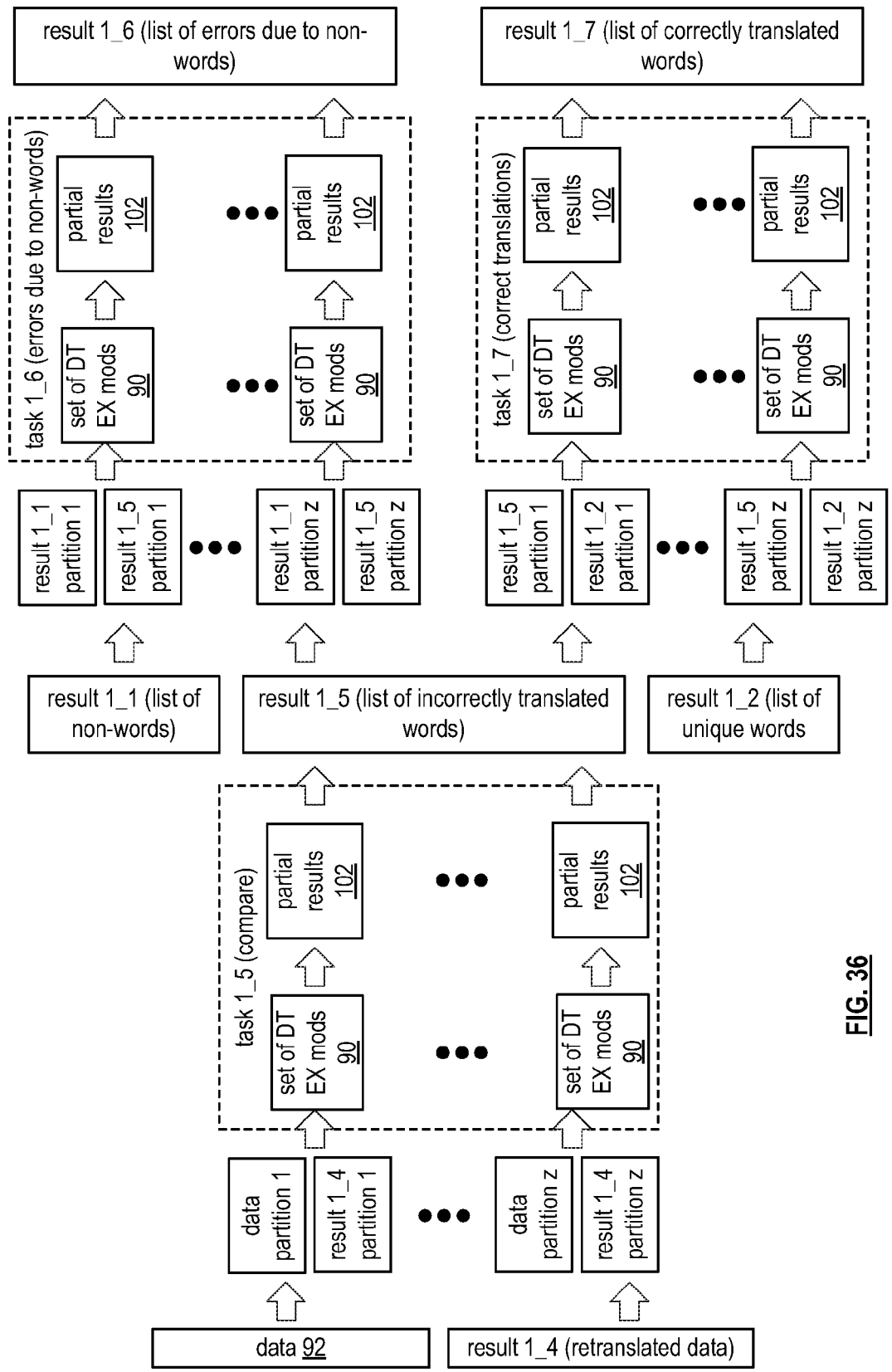

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1$^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1$^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
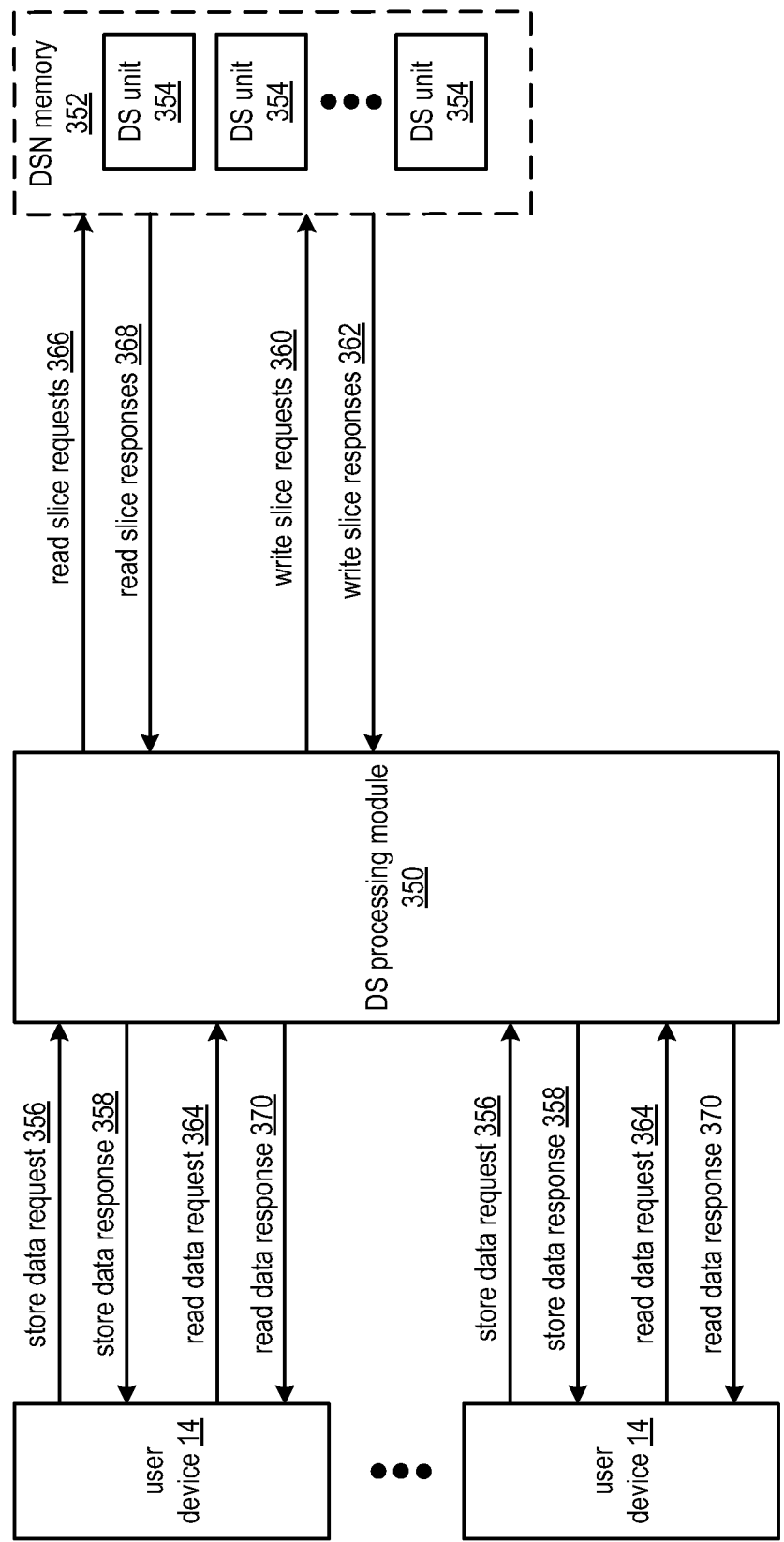
FIG. 40A is a schematic block diagram of an embodiment of a dispersed storage system in accordance with the present invention.

FIG. 40A is a schematic block diagram of an embodiment of a dispersed storage system that includes user devices 14 of FIG. 1, a dispersed storage (DS) processing module 350, and a dispersed storage network (DSN) memory 352. The DSN memory 352 includes one or more sets of DS units 354. Each DS unit 354 may be implemented utilizing one or more of a storage node, the distributed storage and task (DST) execution unit 36 of FIG. 1, a storage server, a storage unit, a storage module, a memory device, a memory, a user device, the DST processing unit 16 of FIG. 1, and a DST processing module. The DS processing module 350 may be implemented utilizing one or more of a server, a computer, the DS unit 354, the user device 14, and the DST processing unit 16.

The system functions to store data from the user devices 14 in the DSN memory 352 where the data is encrypted and encoded to produce pluralities of non-redundant encoded data slices for storage in the at least one set of DS units. The system further functions to retrieve the pluralities of non-redundant encoded data slices from the at least one set of DS units to recover the data. In an example of storing the data, the user device 14 issues a store data request 356 to the DS processing module 350 to initiate a process to store the data in the DSN memory 352. The store data request 356 includes one or more of the data, a data tag, and a data identifier of the data, where the user device generates the data tag based on performing at least one deterministic function on the data. The operation of the user device 14 is discussed in greater detail with regards to FIGS. 40B and 40C.

The DS processing module 350 issues a store data response 358 to the user device 14, where the store data response 358 includes a duplicate data indicator. The DS processing module 350 generates the duplicate data indicator to indicate whether the data has already been stored in the DSN memory 352. The generating includes the DS processing module 350 determining whether the data tag compares favorably to a retrieved data tag associated with data already stored in the DSN memory 352. The DS processing module 350 compares the data tag to a list of data tags associated with the data already stored in the DSN memory 352. The DS processing module 350 generates the duplicate data indicator to indicate that the data has already been stored in the DSN memory 352 when the data tag compares favorably (e.g., substantially the same) to a data tag of the list of data tags.

The user device 14 receives the store data response 358 and issues another store data request 356 that includes an encrypted key and further includes encrypted data of the data when the duplicate data indicator indicates that the data is that duplicate data. The user device 14 generates the encrypted key by encrypting, with a private key associated with the user device, a key utilized to encrypt the data. The user device 14 performs a deterministic function on the data to produce the key utilized to encrypt the data. The DS processing module 350 stores the encrypted key in a record-keeping mechanism associated with the data including at least one of a directory, an index, a registry for a vault associated with the user device, as a data object in the DSN memory 352, and a user record.

The DS processing module 350 stores the encrypted key in at least one of a local memory of the DS processing module and the DSN memory 352 as a set of encoded encrypted key slices. For example, the DS processing module 350 encodes the encrypted key using a dispersed storage error coding function to produce the set of encoded encrypted key slices, generates a set of write slice requests 360 that includes the set of encoded encrypted key slices, and outputs the set of write slice requests 360 to the DSN memory 352. The DS processing module 350 may receive a set of write slice responses 362 from the DSN memory 352 with regards to the set of write slice requests 360 indicating a status of the set of write slice requests 360. When receiving the encrypted data, the DS processing module 350 stores the encrypted data in the DSN memory 352 as a plurality of sets of encoded encrypted data slices. The DS processing module 350 encodes the encrypted data using the dispersed storage error coding function to produce the plurality of sets of encoded encrypted data slices.

In an example of retrieving the data, the user device 14 issues a read data request 364 to the DS processing module 350, where the read data request 364 includes one or more of the data identifier and the data tag. The DS processing module 350 accesses the record-keeping mechanism associated with the data to recover the encrypted key and accesses the DSN memory 352 to recover the encrypted data. For example, the DS processing module 350 issues a set of read slice requests 366 to retrieve the set of encoded encrypted key slices extracted from read slice responses 368 received from the DSN memory 352 and decodes at least a decode threshold number of encoded encrypted key slices to recover the encrypted key. As another example, the DS processing module 350 issues another set of read slice requests 366 to retrieve the plurality of sets of encoded encrypted data slices from the DSN memory 352 and decodes at least a decode threshold number of encoded encrypted data slices for each set of the plurality of sets to recover the encrypted data.

Having recovered the encrypted key and the encrypted data, the DS processing module 350 issues a read data response 370 to the user device 14, where the read data response 370 includes the encrypted key and the encrypted data. The user device 14 decrypts the encrypted key using the private key of the user device to recover the key. The user device 14 decrypts the encrypted data using the recovered key to produce recovered data.

Figure 40B:
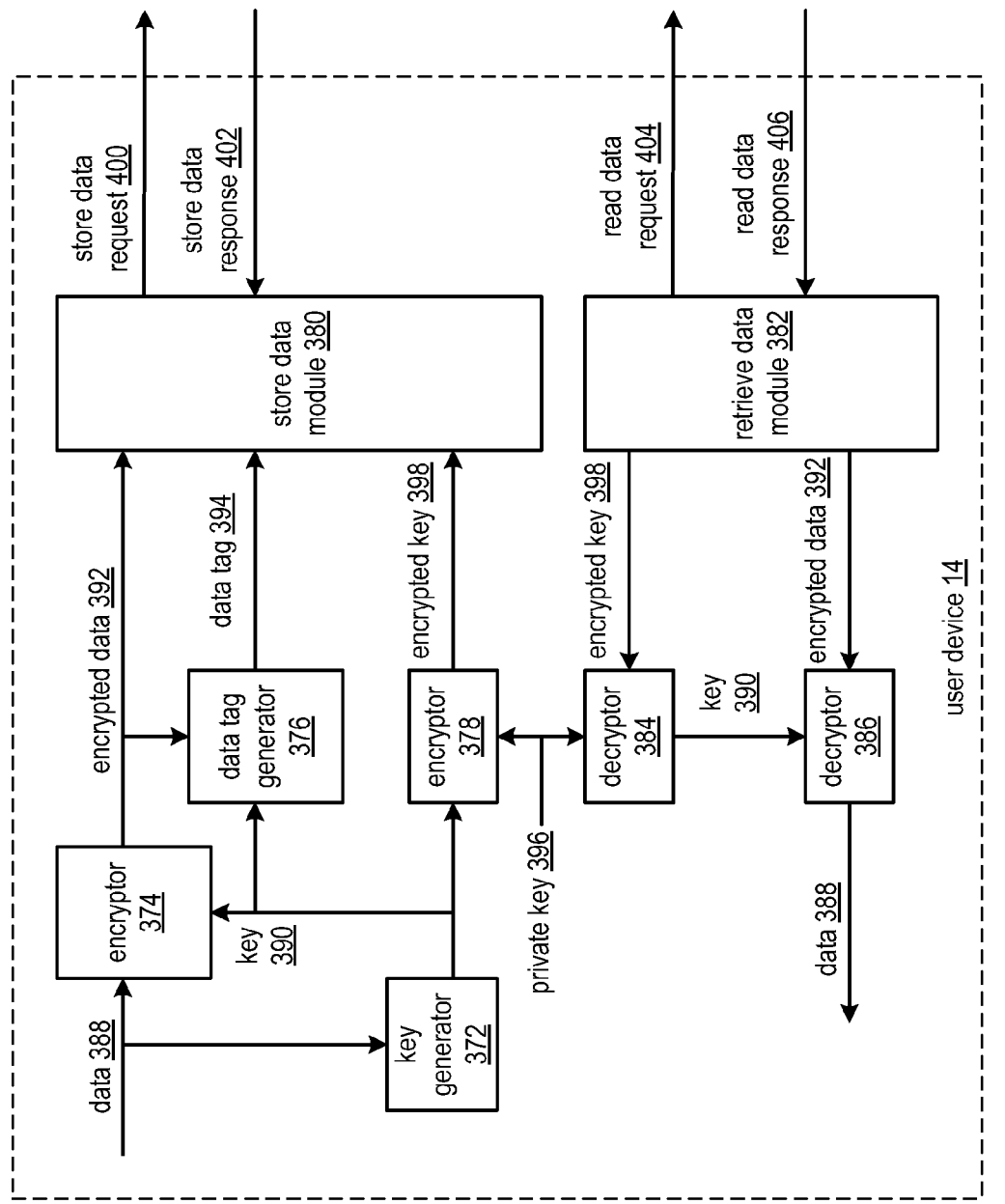
FIG. 40B is a schematic block diagram of a user device in accordance with the present invention.

FIG. 40B is a schematic block diagram of the user device 14 of FIG. 1 that includes a key generator 372, an encryptor 374, a data tag generator 376, another encryptor 378, a store data module 380, a retrieve data module 382, a decryptor 384, and another decryptor 386. The user device 14 functions to securely access data 388 in a dispersed storage network (DSN). The key generator 372 performs a deterministic function on the data 388 to generate a key 390. The deterministic function may include at least one of a hashing function, a cyclic redundancy code function, a mask generating function, and a hash based message authentication code function.

The encryptor 374 encrypts the data 388 using the key 390 to generate encrypted data 392. The data tag generator 376 performs another deterministic function on one or more of the key 390 and the encrypted data 392 to produce a data tag 394. The other encryptor 378 encrypts the key 390 using a private key 396 associated with the user device 14 (e.g., a private key of a public-private key pair associated with the user device) to produce an encrypted key 398. Alternatively, or in addition to, the private key 396 may be associated with the data 388. For example, a private key list associates a plurality of data identifiers with a plurality of private keys. The user device 14 may obtain the private key by at least one of retrieving the private key 396 from a local memory, retrieving the private key 396 from a distributed authentication system, receiving the private key 396 from a user input, and retrieving a private key 396 from the DSN.

When the user device 14 accesses the DSN to store the data 388 in the DSN, the store data module 380 issues a first store data request 400 to the DSN, where the first store data request 400 includes one or more of the data tag 394 and a data identifier associated with the data 388. When the store data module 380 receives a store data response 402 from the DSN, the store data module 380 issues a second store data request 400 to the DSN. The second store data request 400 includes the encrypted key 398 and when the store data response 402 indicates that a duplicate copy of the encrypted data does not exist within the DSN, the second store data request 400 includes the encrypted data 392.

When the user device 14 accesses the DSN to recover the data 388 from the DSN, the retrieve data module 382 issues a read data request 404 to the DSN where the read data request 404 includes the data identifier. Alternatively, the read data request 404 includes the data tag 394 associated with the data (e.g., when the user device 14 stores the data tag 394 in association with the data ID). The retrieve data module 382 receives a read data response 406 that includes recovered encrypted data 382 and a recovered encrypted key 398. The decryptor 384 decrypts the recovered encrypted key 398 using the private key 396 to produce a recovered key 390. The other decryptor 386 decrypts the recovered encrypted data 392 using the recovered key 390 to produce recovered data 388.

Figure 40C:
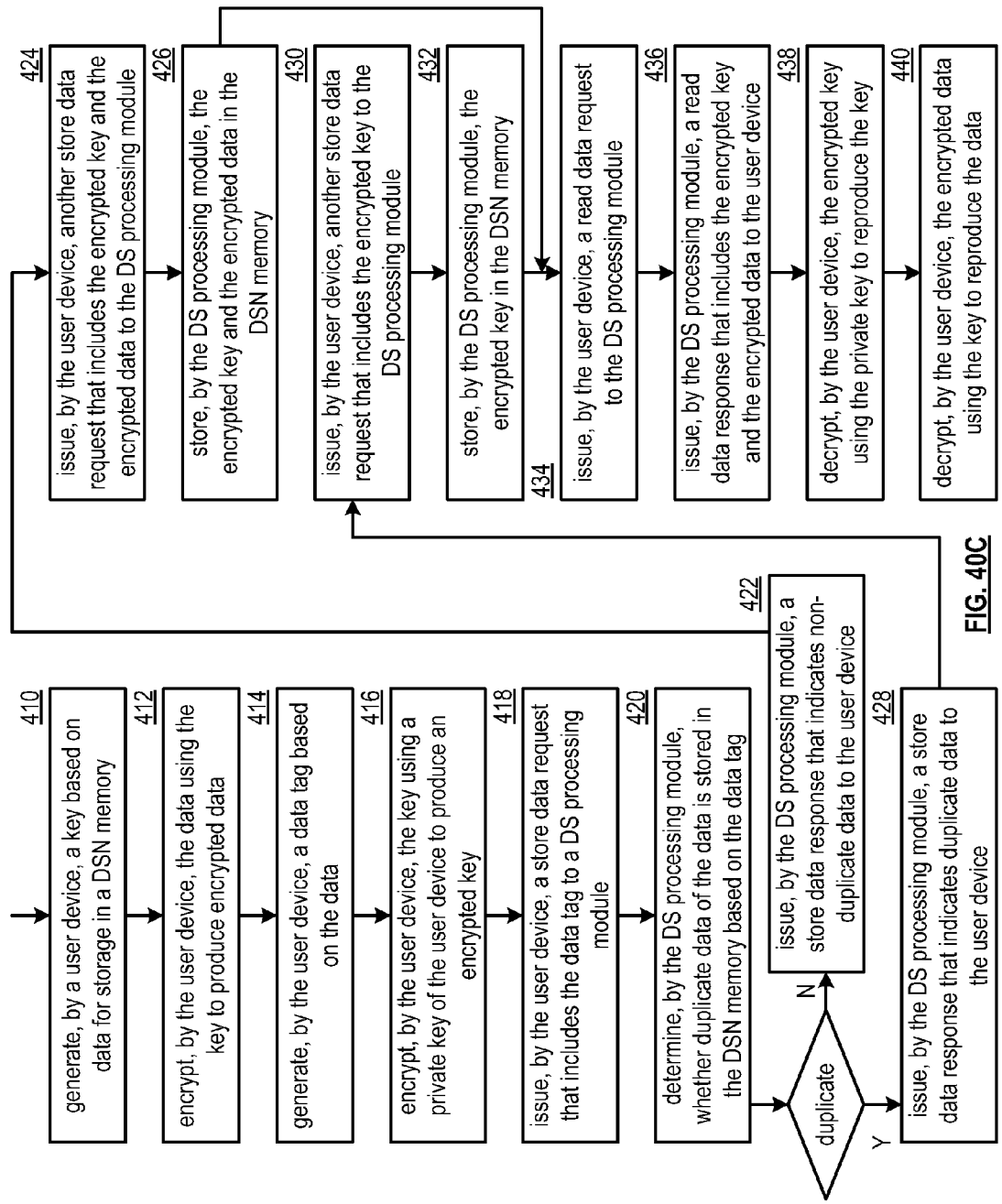
FIG. 40C is a flowchart illustrating an example of accessing non-redundant data in accordance with the present invention.

FIG. 40C is a flowchart illustrating an example of accessing non-redundant data. The method begins at step 410 where a user device generates a key based on data for storage in a dispersed storage network (DSN) memory. For example, the user device performs a deterministic function on the data to generate the key. The method continues at step 412 where the user device encrypts the data using the key to produce encrypted data. The method continues at step 414 where the user device generates a data tag based on the data. For example, the user device performs another deterministic function on one or more of the key and encrypted data to generate the data tag. For instance, the user device performs a mask generating function on the encrypted data to produce the data tag. In another instance, a user device performs a hashing function on the key to produce the data tag. In yet another instance, the user device performs the hashing function on the key to produce an intermediate value, performs the mask generating function on the encrypted data to produce another intermediate value, and performs an exclusive OR function on the intermediate value and the other intermediate value to produce the data tag.

The method continues at step 416 where the user device encrypts the key using a private key associated with at least one of the user device and the data to produce an encrypted key. The method continues at step 418 where the user device issues a store data request that includes one or more of the data tag, an identifier of the user device, and a data identifier of the data to a dispersed storage (DS) processing module associated with the DSN memory. The method continues at step 420 where the DS processing module determines whether duplicate data of the data is stored in the DSN memory based on the data tag. The determining includes at least one of initiating a query, initiating a search, comparing the data tag to a data tag list, accessing a hierarchical index associated with storage of data objects in the DSN memory to identify an index node for extraction of one or more store data tags, comparing the data tag to one or more data tags associated with data stored in the DSN memory. For example, the DS processing module indicates that the duplicate data of the data is stored in the DSN memory when a retrieved data tag compares (e.g., substantially the same) favorably to the data tag. When duplicate data of the data is stored in the DSN memory, the method branches to step 428. When duplicate data of the data is not stored in the DSN memory, the method continues to step 422.

The method continues at step 422 where the DS processing module issues a store data response that indicates non-duplicate data to the user device when the duplicate data of the data is not stored in the DSN memory. The method continues at step 424 where the user device issues another store data request that includes the encrypted key and encrypted data to the DS processing module. The method continues at step 426 where the DS processing module stores the encrypted key and encrypted data in the DSN memory. In addition, the DS processing module may update the hierarchical index to indicate that one or more of the user device and the data is associated with DSN addresses utilized for storage of the encrypted key and encrypted data. The method branches to step 434.

When the duplicate data of the data is stored in the DSN memory, the method continues at step 428 where the DS processing module issues a store data response that indicates duplicate data to the user device. The method continues at step 430 where the user device issues another store data request that includes the encrypted key to the DS processing module. The method continues at step 432 where the DS processing module stores the encrypted data in the DSN memory. In addition, the DS processing module may update the hierarchical index to indicate that one or more of the user device and the data is associated with a DSN addresses utilized for storage of the encrypted key and the duplicate data (e.g., duplicate encrypted data).

When the user device accesses the DSN memory to recover the data, the method continues at step 434 where the user device issues a read data request to the DS processing module where the read data request includes the data identifier. The method continues at step 436 where the DS processing module issues a read data response to the user device that includes the encrypt key and the at least one of the duplicate data and the encrypted data. The method continues at step 438 where the user device decrypts the encrypted key using the private key to produce a recovered key. The method continues at step 440 where the user device decrypts the at least one of the duplicate data and the encrypted data using the recovered key to produce recovered data.

FIG. 41A is a schematic block diagram of a data encryption system that includes an analyzer 442, a manipulator 446, a key generator 444, an encryptor 448, and a storage module 450. The data encryption system functions to securely store data 452 (e.g., in a dispersed storage network (DSN) memory and/or a local memory). The analyzer 442 analyzes the data 452 to determine a secure storage approach 454. The analyzing includes determining a predictability level of the data 452. For example, the analyzer compresses the data 452 and indicates that the predictability level of the data is high when a size of compressed data is less than a compression threshold value. As another example, the analyzer 442 indicates that the predictability level of the data is high when a size of the data is less than a size threshold value.

The determining the secure storage approach includes producing the approach 454 to indicate whether to generate a key 458 based on the data 452 or a random number. For example, the analyzer 442 produces the approach 454 to indicate to generate the key 458 based on the random number when the predictability level of the data is high. As another example, the analyzer 442 that produces the approach 454 indicates to generate the key 458 based on the data when the predictability level of the data is low. When indicating to generate the key 458 based on the data 452, the determining the secure storage approach may further include producing the approach 454 to indicate whether to manipulate the data 452 prior to encrypting the data. For example, the analyzer 442 produces the approach 454 to indicate to manipulate the data when the predictability of the data is low and the size of the data is greater than the size threshold value.

The manipulator 446 manipulates the data 452 in accordance with the approach to produce manipulated data 456. For example, the manipulator 446 produces the manipulated data 456 to be substantially the same as the data 452 when the approach indicates not to manipulate the data. As another example, the manipulator 446 pads up the data 452 to produce the manipulated data 456 when the approach indicates to manipulate the data. When padding the data 452, the manipulator 446 examines the current file size and adds padding bytes to the end of the data 452 until a new data size is that of a next highest rounded value. The rounded values may be calculated to never expand the data by more than 1%. This can be done by calculating (log(file_size)/log(1+1%)), rounding that value up to the next highest integer to get N, then calculating (1+1%)^N. The data is padded to round up by adding the appropriate amount of padding bytes to mask its true size.

The key generator 444 generates the key 458 in accordance with the approach 454. The key generator 444 generates the key 458 based on the random number when the approach 454 indicates to utilize the random number. The key generator 444 generates the key 458 based on one or more of the data 452 and the manipulated data 456 in accordance with the approach 454. The key generator 444 generates the key 458 based on one or more of the data 452 and the manipulated data 456 by performing a deterministic function on one or more of the data 452 and the manipulated data 456 to produce the key 458. For example, key generator 444 performs a hashing function on the data 452 to produce a data digest, performs the hashing function on the manipulated data 456 to produce a manipulated data digest, and performs a mask generating function on the data digest and the manipulated data digest to produce the key 458.

The encryptor 448 encrypts the manipulated data 456 using the key 458 to produce encrypted data 460. The storage module 450 facilitates storage of the encrypted data 460 and the key 458 in one or more of the local memory and the DSN memory. For example, the storage module 450 sends the encrypted data 460 and the key 458 to a dispersed storage processing module associated with the DSN memory. As another example, the storage module 450 encodes the encrypted data 460 and the key 458 to produce a plurality of sets of slices, generates a plurality of sets of write slice requests that includes the plurality of sets of slices, and outputs the plurality of sets of write slice requests to the DSN memory.

Figure 41B:
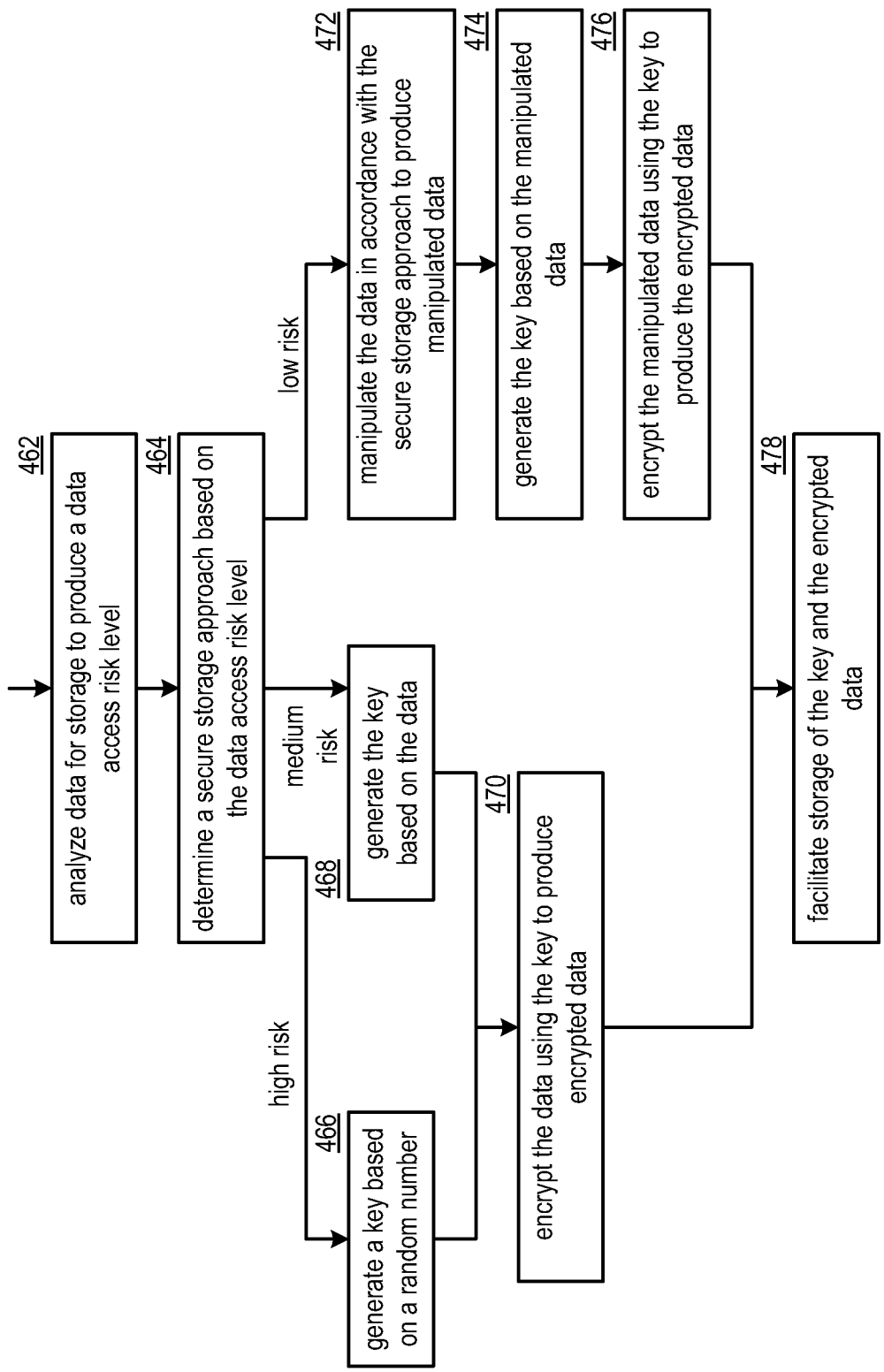
FIG. 41B is a flowchart illustrating an example of securely storing data in accordance with the present invention.

FIG. 41B is a flowchart illustrating an example of securely storing data. The method begins at step 462 where a processing module (e.g., of a dispersed storage (DS) processing module) analyzes data for storage to produce a data access risk level. The analyzing includes determining one or more of a predictability level, a size, a data type, a source, an owner, a required data security level, a data access risk level, and a data sensitivity level. The method continues at step 464 where the processing module determines a secure storage approach based on the data access risk level. The secure storage approach includes one of a high risk approach, a medium risk approach, and a low risk approach. For example, the processing module selects the high risk approach when the data access risk level is greater than a high risk threshold. As another example, the processing module selects the medium risk approach when the data access risk level is greater than a medium risk threshold and less than the high risk threshold. As yet another example, the processing module selects the low risk approach when the data access risk level is less than the medium risk threshold.

When the secure storage approach includes the high risk approach, the method continues at step 466 where the processing module generates a key based on a random number. The method branches to step 470 where the processing module encrypts the data using the key to produce encrypted data. Next, the method branches to step 478 where the processing module facilitates storage of the key and encrypted data. The facilitating includes at least one of storing the key and encrypted data in a local memory and storing the key and encrypted data in a dispersed storage network memory.

When the secure storage approach includes the medium risk approach, the method continues at step 468 where the processing module generates the key based on the data. The generating includes performing a deterministic function on the data to produce the key. The method branches to step 470.

When the secure storage approach includes the low risk approach, the method continues to step 472 where the processing module manipulates the data in accordance with the secure storage approach to produce manipulated data. The manipulating of the data includes at least one of padding the data at the end of the data, padding the data at the beginning of the data, interleaving portions of the data, and compressing a portion of the data. The method continues at step 474 where the processing module generates the key based on the manipulated data. The generating includes performing a deterministic function on the manipulated data to produce the key. Alternatively, the processing module performs a deterministic function on the data and the manipulated data to produce the key. The method continues at step 476 where the processing module encrypts the manipulated data using the key to produce the encrypted data. The method branches to step 478.

Figure 42B:
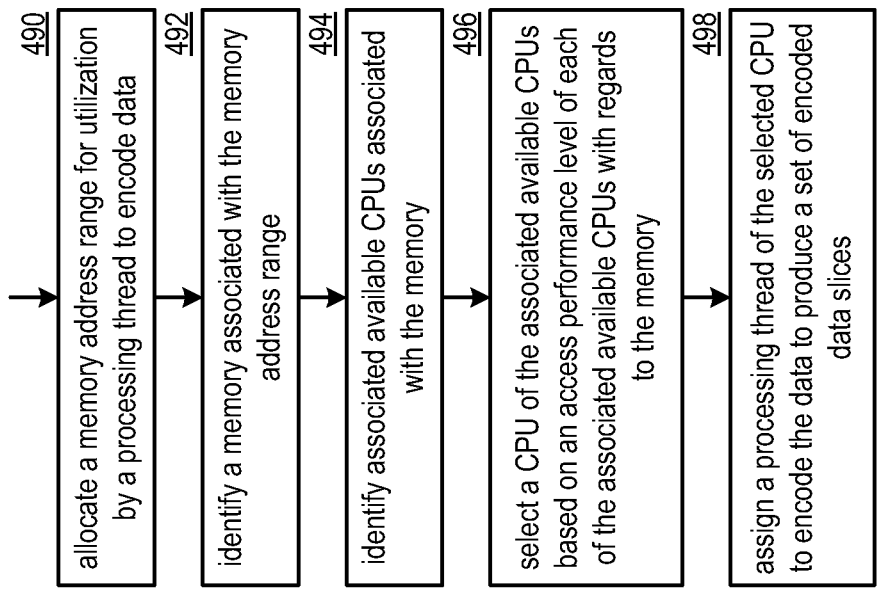
FIG. 42B is a flowchart illustrating an example of assigning processing resources in accordance with the present invention.
Figure 42A:
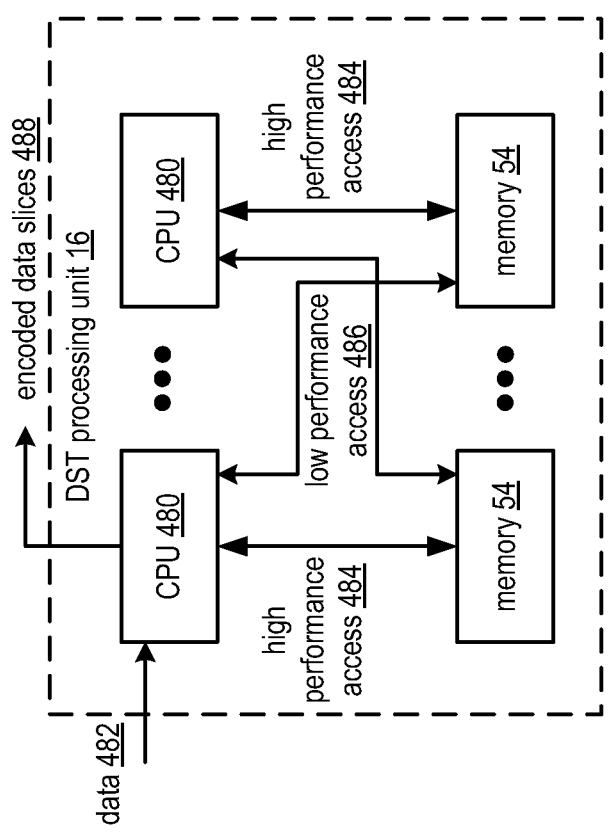
FIG. 42A is a schematic block diagram of another distributed storage and task (DST processing unit in accordance with the present invention.

FIG. 42A is a schematic block diagram of another distributed storage and task (DST processing unit 16 that includes a plurality of central processing units (CPUs) 480 and a plurality of memories 54 of FIG. 2. Each CPU 480 is operably coupled to one or more memories of the plurality of memories 54 to provide access for storage and retrieval of intermediate data associated with one or more processing threads available to the CPU 480. From time to time, at least one processing thread of the one or more processing threads may be utilized to encode data using a dispersed storage error coding function to produce one or more sets of encoded data slices 488.

The access may be in accordance with a variety of performance levels based on one or more of configuration information, performance restraints, hardware interfaces, loading levels, bus bandwidth, serial interface bandwidth, and hardware architecture. Each CPU of the plurality of CPUs may have high-performance access 484 to at least one memory device 54 of the plurality of memory devices. The each CPU has low performance access 486 for remaining memory devices 54 of the plurality of memory devices.

In an example of operation, a first CPU 480 of the plurality of CPUs receives data 482 for encoding into the set of encoded data slices 488. The first CPU 480 allocates a memory address range for utilization by a processing thread to encode the data 482. The first CPU 480 identifies a memory 54 of the plurality of memories that is associated with the allocated memory address range (e.g., based on a lookup). The first CPU 480 identifies associated available CPUs 480 associated with the identified memory 54. The first CPU 480 selects a second CPU 480 of the associated available CPUs based on an access performance level of each of the associated CPUs with regards to the identified memory. For example, the first CPU 480 selects the second CPU 480 when the second CPU has high-performance access 484 to the identified memory 54. The first CPU 480 transfers the data 482 to the second CPU 480. The second CPU 480 utilizes a processing thread of the second CPU to encode the data 482 using the dispersed storage error coding function to produce the set of encoded data slices 488. The second CPU 480 outputs the set of encoded data slices 488.

Alternatively, or in addition to, the first CPU 480 distributes a portion of the data 482 to one or more other CPUs 480 of the plurality of CPUs to facilitate parallel processing of the encoding of the data 482. For example, the first CPU 480 distributes a first portion of the data and a portion of an encoding matrix utilized in the dispersed storage error encoding of the data to a third CPU 480 such that the third CPU dispersed storage error encodes the first portion of the data using the portion of the encoding matrix to produce a corresponding portion of the set of encoded data slices 488.

FIG. 42B is a flowchart illustrating an example of assigning processing resources. The method begins at step 490 where a processing module (e.g., of a dispersed storage (DS) processing module) allocates a memory address range for utilization by a processing thread to encode data. The processing module may assign an amount of memory commensurate with an encoding algorithm utilized to encode the data. The method continues at step 492 where the processing module identifies a memory associated with the memory address range. For example, the processing module performs a lookup in an address range to memory device list based on the memory address range to identify the memory. The method continues at step 494 where the processing module identifies associated available central processing units (CPUs) of a plurality of CPUs associated with the memory (e.g., operably coupled via high-performance access paths and/or low performance access paths). The identifying includes at least one of performing a lookup in an association list, initiating a test, performing a query, and receiving a message.

The method continues at step 496 where the processing module selects a CPU of the associated available CPUs based on an access performance level of each of the associated available CPUs with regards to the memory. For example, the processing module selects a CPU of the associated available CPUs when the tenth CPU is associated with high-performance access to the identified memory. The method continues at step 498 where the processing module assigns a processing thread of the selected CPU to facilitate encoding of the data to produce at least one set of encoded data slices using a dispersed storage error coding function. Alternatively, or in addition to, the processing module distributes one or more of a portion of the data and a portion of an encoding matrix of the dispersed storage error coding function to one or more other CPUs of the associated available CPUs to facilitate parallel processing of encoding of the data to produce the at least one set of encoded data slices.

Figure 43A:
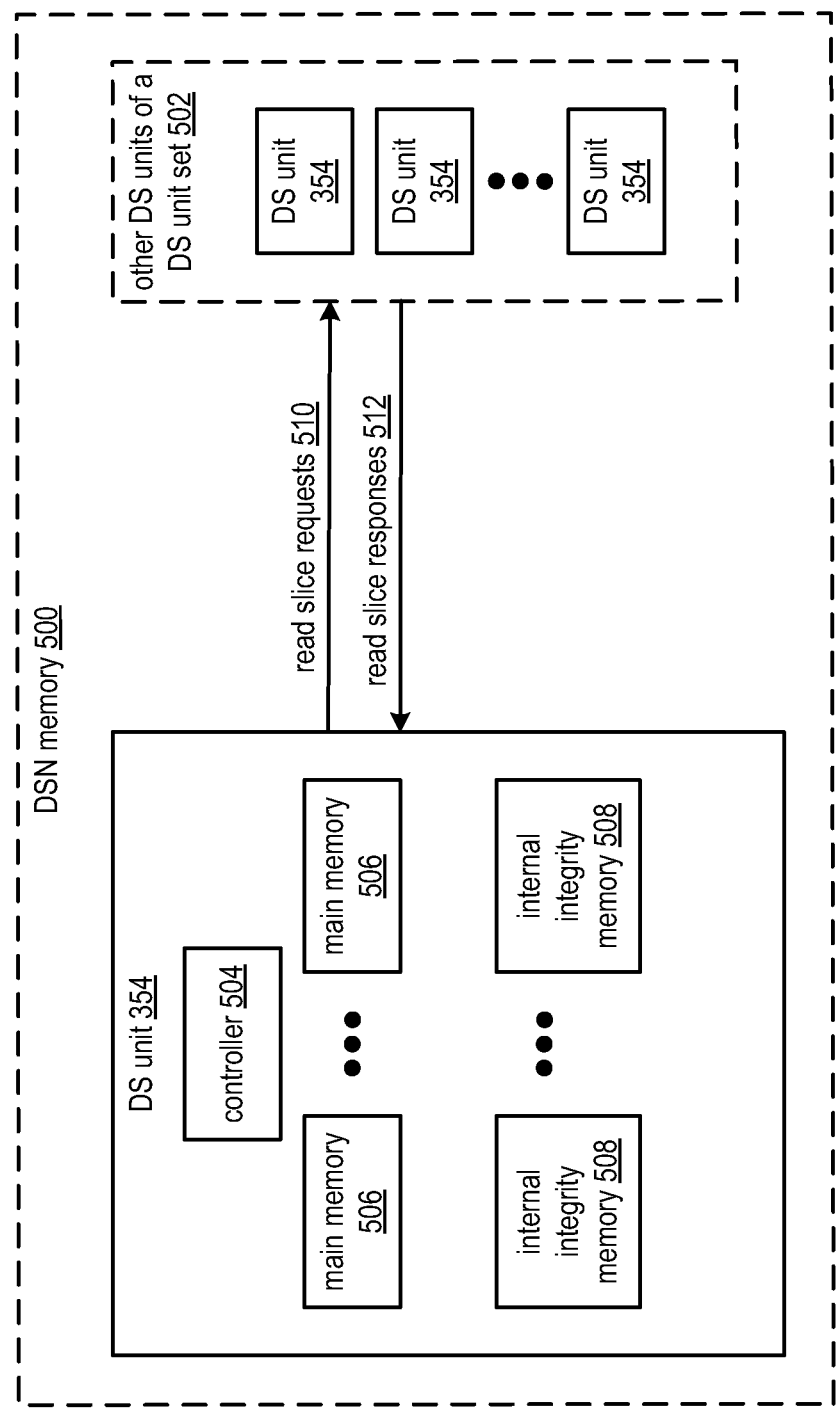
FIG. 43A is a schematic block diagram of a dispersed storage network memory in accordance with the present invention.

FIG. 43A is a schematic block diagram of a dispersed storage network (DSN) memory 500 that includes a plurality of the dispersed storage (DS) units 354 of FIG. 40A. The plurality of DS units 354 includes at least one DS unit set that includes a DS unit 354 and other DS units 502 of the DS unit set. The DS unit 354 includes a controller 504, a plurality of main memories 506, and a plurality of internal integrity memories 508. The DSN memory 500 functions to rebuild an encoded data slice to be rebuilt, where the encoded data slice to be rebuilt is associated with a main memory 506 of the plurality of main memories. Data is encoded using at least one of a dispersed storage error coding function and a redundant array of independent disks (RAID) coding function to produce rebuilding information, where recovery of the encoded data slice to be rebuilt is enabled by retrieving a threshold number of rebuilding elements of the rebuilding information. The rebuilding elements includes one or more of parity information and other encoded data slices of a set of encoded data slices that includes the encoded data slice to be rebuilt.

In an example of operation, the controller 504 identifies the encoded data slice to be rebuilt. The identifying includes a variety of approaches. A first approach includes indicating that the encoded data slice to be rebuilt requires rebuilding when a calculated integrity value of the encoded data slice to be rebuilt compares unfavorably to a retrieved integrity value associated with the encoded data slice to be rebuilt, where the retrieved integrity value is retrieved from an associated internal integrity memory. A second approach includes receiving an error message that includes an identifier of the encoded data slice to be rebuilt. A third approach includes receiving a rebuilding request that includes the identifier of the encoded data slice to be rebuilt.

Having identified the encoded data slice to be rebuilt, the controller 504 selects a rebuilding approach as one of an internal approach and an external approach. The selecting may be based on one or more of network traffic level, a main memory availability indicator, an internal integrity memory availability indicator, a number of available other DS units of the DS unit set, a performance requirement, estimated network traffic costs, a controller loading level, available control resources, and an active rebalancing operation status. The internal approach is associated with utilizing rebuilding information from at least a threshold number of internal integrity memories of the plurality of internal integrity memories. The external approach is associated with utilizing rebuilding information from at least a threshold number of other DS units of the DS unit set. For example, the controller 504 selects the internal approach when estimated network traffic costs are greater than a cost threshold. As another example, the controller 504 selects the external approach when the controller loading level is greater than a loading level threshold.

When the selected rebuilding approach includes the internal approach, the controller 504 retrieves a threshold number of rebuilding elements from the threshold number of internal integrity memories 508. For example, the controller 504 retrieves a threshold number of data blocks and/or parity blocks of a common data slice that includes the encoded data slice to be rebuilt when the RAID function is utilized. As another example, the controller 504 retrieves a threshold number of encoded data slices of the set of encoded data slices that includes the encoded data slice to be rebuilt from the threshold number of internal integrity memories 508 when the dispersed storage error coding function is utilized. The controller 504 decodes the threshold number of rebuilding elements to produce a rebuilt encoded data slice.

When the selected rebuilding approach includes the external approach, the controller 504 retrieves the threshold number of rebuilding elements from the threshold number of other DS units of the DS unit set 502. For example, the controller 504 issues read slice requests 510 and receives read slice responses 512 to retrieve the threshold number of encoded data slices of the set of encoded data slices that includes the encoded data slice to be rebuilt from the threshold number of other DS units of the DS unit set when the dispersed storage error coding function is utilized. The controller decodes the threshold number of rebuilding elements to produce the rebuilt encoded data slice.

Figure 43B:
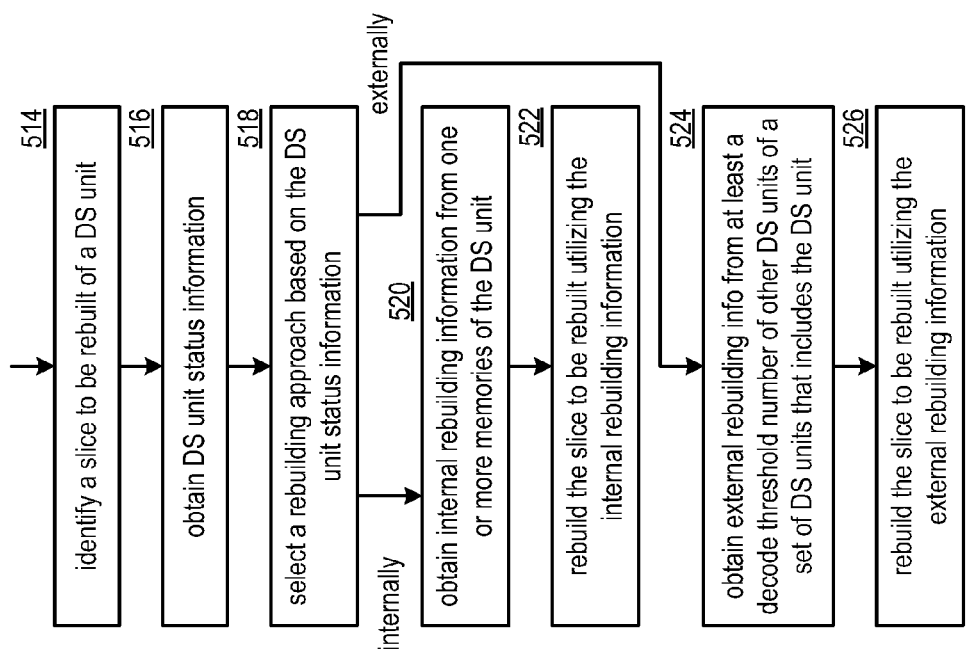
FIG. 43B is a flowchart illustrating an example of rebuilding a slice to be rebuilt in accordance with the present invention.

FIG. 43B is a flowchart illustrating an example of rebuilding a slice to be rebuilt. The method begins at step 514 where a processing module (e.g., of a dispersed storage (DS) processing module) identifies a slice to be rebuilt associated with a DS unit. The identifying includes at least one of receiving an error message, comparing storage integrity information to calculated integrity information, and comparing a slice name list from the DS unit and from other DS units of a DS unit set that includes the DS unit. The method continues at step 516 where the processing module obtains DS unit status information. The DS unit status information includes one or more of a network traffic level, a number of available other DS units of the DS unit set, estimated network traffic costs, a loading level of the DS unit, available resources of the DS unit, and active operation types of the DS unit.

The method continues at step 518 where the processing module selects a rebuilding approach based on the DS unit status information. The rebuilding approach includes one of an internal approach and an external approach. The internal approach is associated with utilizing rebuilding information from one or more memories (e.g., a threshold number) of the DS unit. The external approach is associated with utilizing rebuilding information from at least a threshold number of other DS units of the DS unit set where data is encoded using a dispersed storage error coding function to produce a set of encoded data slices, including the encoded data slice to be rebuilt, that are stored in the DS unit set. The method branches to step 524 when the processing module selects the external approach. The method continues to step 520 when the processing module selects the internal approach.

The method continues at step 520 where the processing module obtains internal rebuilding information from one or more memories of the DS unit when the internal approach is selected. The internal rebuilding information includes at least one of a threshold number of encoded data slices of the set of encoded data slices when the dispersed storage error coding function is utilized and a threshold number of data blocks and parity blocks when a redundant array of independent disks (RAID) function is utilized. For example, the processing module retrieves the threshold number of data blocks and parity blocks from a threshold number of memories of the DS unit when the RAID function is utilized. As another example, the processing module retrieves the threshold number of encoded data slices from the threshold number of memories of the DS unit when the dispersed storage error coding function is utilized. The dispersed storage error coding function and the RAID function may be utilized in accordance with a storage approach. The processing module may further determine the storage approach based on one or more of receiving the storage approach, a lookup, and selecting the storage approach based on storage requirements when initially storing data.

The method continues at step 522 where the processing module rebuilds the encoded data slice to be rebuilt utilizing the internal rebuilding information. For example, the processing module decodes the retrieved threshold number of encoded data slices using the dispersed storage error coding function to produce a rebuilt slice. As another example, the processing module utilizes the RAID function on the threshold number of data blocks and parity blocks to produce the rebuilt slice.

The method continues at step 524 where the processing module obtains external rebuilding information from at least a decode threshold number of other DS units of the set of DS units that includes the DS unit when the processing module selects the external approach. The obtaining includes issuing at least a decode threshold number of reads slice requests to the other DS units and receiving at least a decode threshold number of read slice responses. The method continues at step 526 where the processing module rebuilds the slice to be rebuilt utilizing the external rebuilding information. For example, the processing module decodes at least a decode threshold number of encoded data slices from the at least a decode threshold number of received read slice responses to produce the slice to be rebuilt.

Figure 44A:
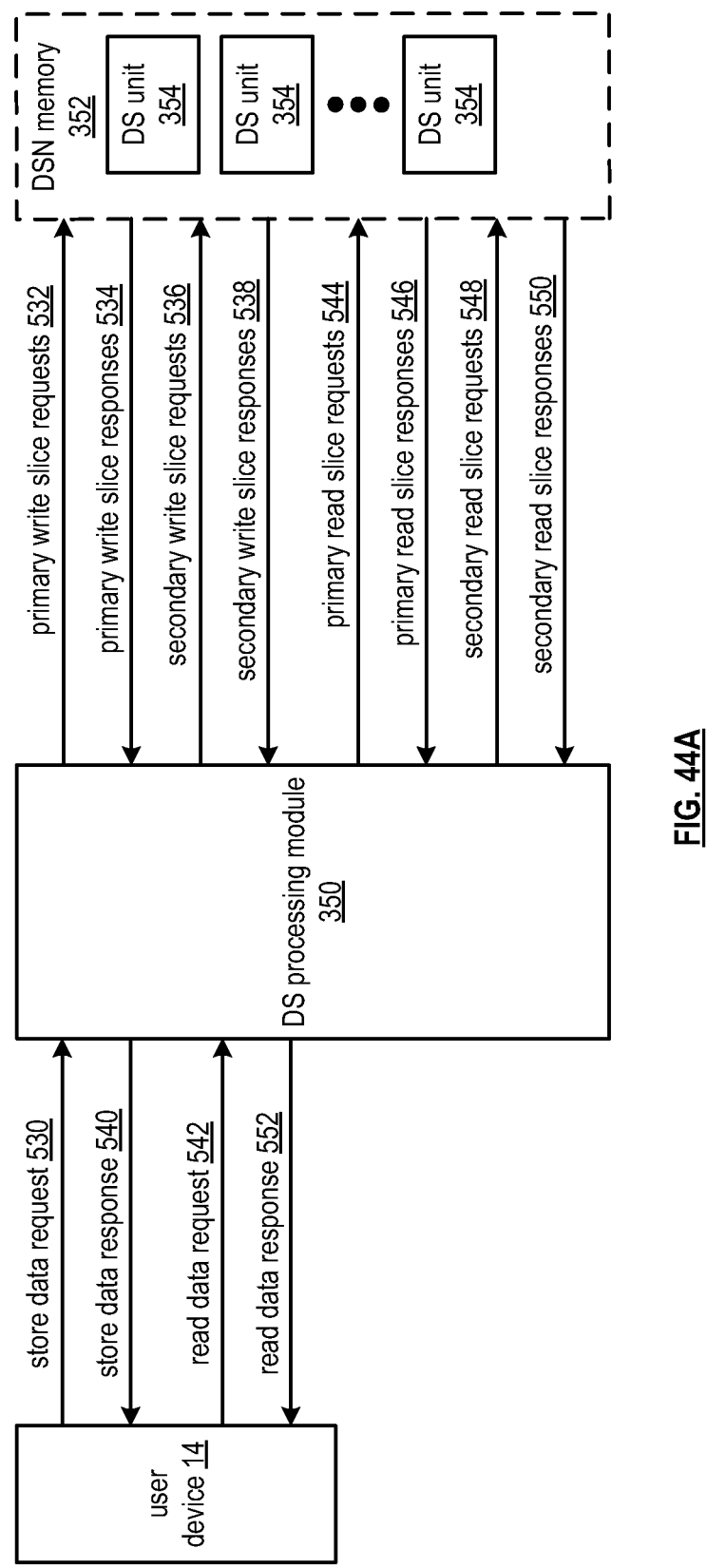
FIG. 44A is a schematic block diagram of another embodiment of a dispersed storage system in accordance with the present invention.

FIG. 44A is a schematic block diagram of another embodiment of a dispersed storage system that includes the user device 14 of FIG. 1, the dispersed storage (DS) processing module 350 of FIG. 40A, and the dispersed storage network (DSN) memory 352 of FIG. 40A. The DSN memory 352 includes one or more sets of DS units 354 of FIG. 40A. The system functions to provide the user device 14 access to data stored in the DSN memory 352. The user device 14 issues a store data request 530 to the DS processing module 350 to initiate a process to store the data in the DSN memory 352. The store data request 530 includes the data and a data identifier of the data. The DS processing module 350 encodes the data using a dispersed storage error coding function to produce a plurality of sets of encoded data slices. The DS processing module 350 generates a plurality of sets of primary slice names based on a primary source name. The DS processing module 350 generates the primary source name based on at least one of applying a deterministic function to the data identifier and utilizing a pseudorandom function.

The DS processing module 350 issues one or more sets of primary write slice requests 532 to the DSN memory 352 that includes the plurality of sets of primary slice names and the plurality of sets of encoded data slices. The DS processing module 350 receives one or more sets of primary write slice responses 534 from the DSN memory 352 indicating status of storing the plurality of sets of encoded data slices. The DS processing module updates an index to associate the data identifier with the primary source name.

The DS processing module 350 generates a plurality of sets of secondary slice names based on a secondary source name. For example, the DS processing module applies a deterministic function to the primary source name to produce the secondary source name. The DS processing module 350 issues one or more sets of secondary write slice requests 536 to the DSN memory 352 that includes the plurality of sets of secondary slice names and the plurality of sets of encoded data slices. The DS processing module 350 receives one or more sets of secondary write slice responses 538 from the DSN memory 352 indicating status of storing the plurality of sets of encoded data slices. The DS processing module 350 updates the index to associate the data identifier with the secondary source name. The DS processing module 350 issues a store data response 540 to the user device 14 indicating a status with regards to the process to store the data in the DSN memory 352 based on the one or more sets of secondary write slice responses 538 and one or more sets of primary write slice responses 534.

The user device 14 issues a read data request 542 to the DS processing module 350 to initiate a process to retrieve the data from the DSN memory 352. The read data request 542 includes the data identifier. The DS processing module 350 recovers the primary source name and the secondary source name from the index based on the data identifier of the read data request 542. The DS processing module 350 selects at least one of the primary source name and the secondary source name based on one or more of a system loading indicator, a predetermination, a request, a security indicator, a performance indicator, a DS unit set identifier associated with the primary source name, a DS unit set identifier associated with the secondary source name, a DS unit availability indicator, and a DSN memory availability indicator. For example, the DS processing module 350 selects the secondary source name when more DS units of a DS unit set associated with the secondary source name are available as compared to available DS units of a DS unit set associated with the primary source name.

The DS processing module 350 issues one or more of primary read slice requests 544 and secondary read slice requests 548 to the DSN memory 352 to initiate recovery of the data. The DS processing module 350 receives one or more of primary read slice responses 546 and secondary read slice responses 550 to produce received encoded data slices. The DS processing module 350 decodes the received encoded data slices to recover the data. The DS processing module 350 issues a read data response 552 to the user device 14 that includes the recovered data.

Figure 44B:
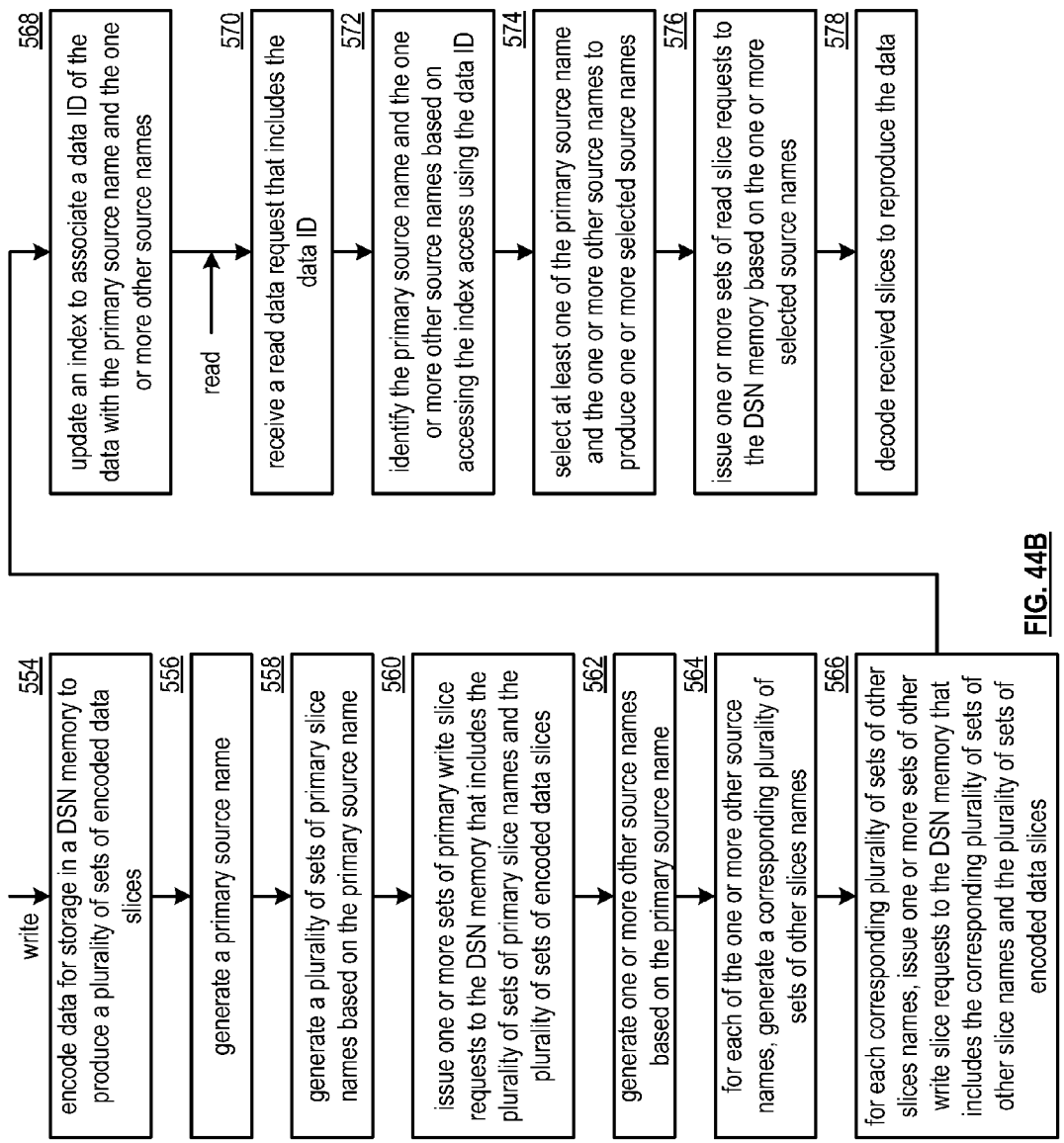
FIG. 44B is a flowchart illustrating an example of replicating data in accordance with the present invention.

FIG. 44B is a flowchart illustrating an example of replicating data. For a write sequence, a method begins at step 554 where a processing module (e.g., of a dispersed storage (DS) processing module) encodes data for storage in a dispersed storage network (DSN) memory to produce a plurality of sets of encoded data slices. The method continues at step 556 where the processing module generates a primary source name. The generating includes at least one of generating the primary source name pseudo-randomly and performing a deterministic function on a data identifier associated with the data. For example, the processing module accesses a registry based on the data identifier to recover a vault identifier and generates the primary source name to include the vault identifier and a pseudo-randomly generated object number. The method continues at step 558 where the processing module generates a plurality of sets of primary slice names based on the primary source name. For example, the processing module identifies a pillar width from the registry and generates slice index fields of the plurality of sets of primary slice names based on the pillar width.

The method continues at step 560 where the processing module issues one or more sets of primary write slice requests to the DSN memory that includes the plurality of sets of primary slice names and the plurality of sets of encoded data slices. The issuing includes generating and outputting the one or more sets of primary write slice requests. The method continues at step 562 where the processing module generates one or more other source names based on the primary source name. The processing module determines a number of the one or more other source names based on one or more of a request, a message, a reliability goal, a performance goal, a cost goal, a predetermination, a size of the data, a network loading level, a security goal, and a lookup. For example, the processing module determines a higher than average number of the one or more other source names when a security goal is higher than an average security goal level. The generating includes performing a deterministic function on the primary source name to generate each of the one or more other source names. For example, the processing module performs a mask generating function on the primary source name to generate a primary result. Next, the processing module adds a first offset to the primary result to produce a first source name of the one or more other source names. Next, the processing module adds a second offset to the primary result to produce a second source name of the one or more other source names, etc.

For each other source name of the one or more other source names, the method continues at step 564 where the processing module generates a corresponding plurality of sets of other slice names. For example, the processing module replaces the primary source name of a source name field of the plurality of sets of primary slice names with the other source name of the one or more source names to produce the corresponding plurality of sets of other slice names. For each corresponding plurality of sets of other slice names, the method continues at step 566 where the processing module issues one or more sets of other write slice requests to the DSN memory that includes the corresponding plurality of sets of other slice names and the plurality of sets of encoded data slices. The issuing includes generating and outputting the one or more sets of other write slice requests. The method continues at step 568 where the processing module updates a hierarchical index to associate a data identifier of the data with the primary source name and each of the one or more other source names. The updating includes at least one of modifying an existing entry of the hierarchical index and generating a new entry for the hierarchical index.

In an example of operation of a read sequence, the method continues or begins at step 570 where the processing module receives a read data request that includes the data identifier. The method continues at step 572 where the processing module identifies the primary source name and the one or more other source names based on accessing the hierarchical index using the data identifier. The identifying includes extracting association information from at least one hierarchical index entry associated with the data identifier. The method continues at step 574 where the processing module selects at least one of the primary source name and the one or more other source names to produce one or more selected source names. The selecting includes identifying a number of source names based on one or more of a performance requirement, a security requirement, a reliability requirement, an expected size of the data, a network loading level, and a predetermination. For example, the processing module selects a higher than average number of source names when the performance requirement indicates a higher than average required performance level.

The method continues at step 576 where the processing module issues one or more sets of read slice requests to the DSN memory based on the one or more selected source names. The issuing includes generating and outputting the one or more sets of read slice requests. The method continues at step 578 where the processing module decodes received slices to reproduce the data. The decoding includes, for each of the one or more sets of read slice requests, decoding at least a decode threshold number of slices for each set of a corresponding plurality of sets of read slice responses using a dispersed storage error coding function to produce a corresponding data segment for aggregation amongst a plurality of data segments to reproduce the data. Alternatively, or in addition to, the processing module may simultaneously decode two or more copies of the data by utilizing two or more source names in retrieving slices from the DSN memory. The processing module may stop the decoding of the received slices when sufficient received slices have been decoded to reproduce the data.

Figure 45A:
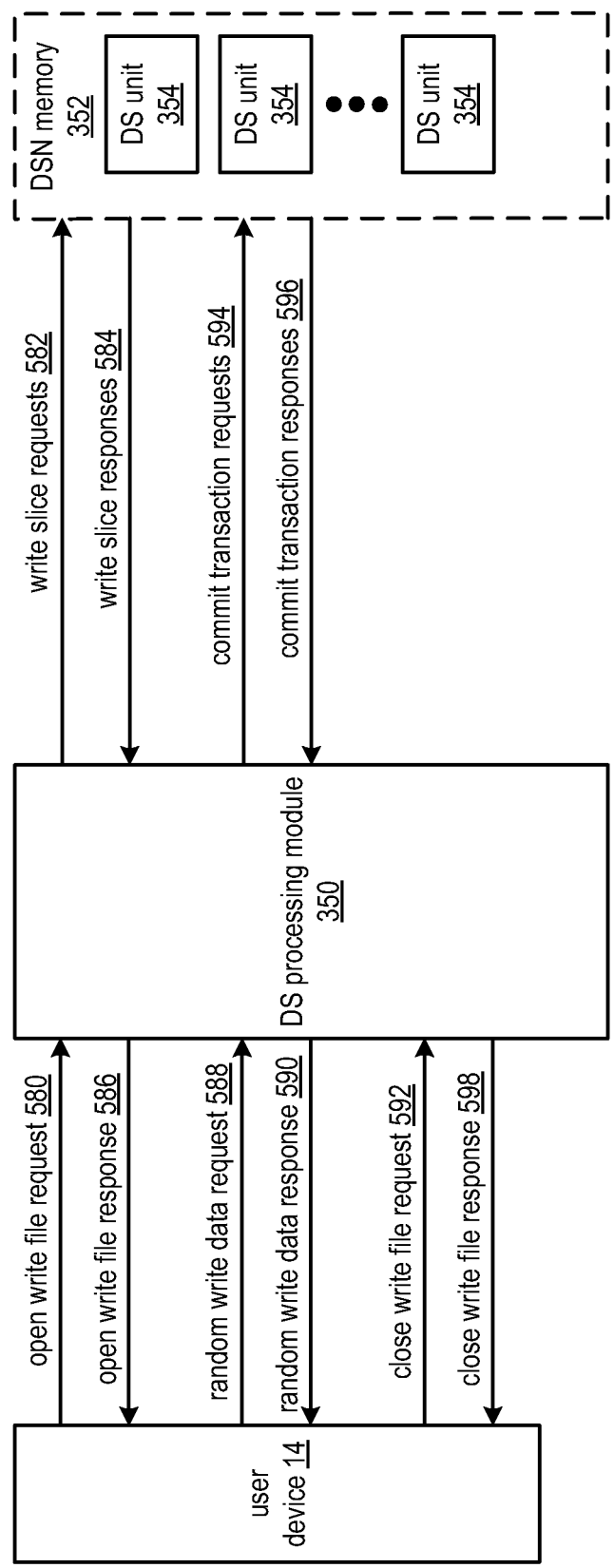
FIG. 45A is a schematic block diagram of another embodiment of a dispersed storage system in accordance with the present invention.

FIG. 45A is a schematic block diagram of another embodiment of a dispersed storage system that includes the user device 14 of FIG. 1, the dispersed storage (DS) processing module 350 of FIG. 40A, and the DSN memory 352 of FIG. 40A. The DSN memory 352 includes a set of DS units 354 of FIG. 40A. The system functions to utilize the set of DS units 354 to facilitate a random write process. In an example of operation, the user device 14 issues an open write file request 580 to the DS processing module 350 to initiate a write data process. The open write file request 580 may include one or more of a data file for storage in the set of DS units 354, a data identifier of the data file, a data size indicator of the data file, one or more data file offset indicators associated with one or more data strings of the data file, and an update likelihood indicator for at least one data file offset of the one or more data offset indicators. The DS processing module 350 partitions the data file into a plurality of data segments in accordance with at least one of at least some of the data file offsets and the data size indicator of the data file. For example, the DS processing module 350 partitions the data file into 15 data segments when the one or more data file offset indicators includes 15 indicators.

The DS processing module 350 temporarily stores at least some of the plurality of data segments in a local memory associated with the DS processing module 350. The DS processing module 350 stores remaining data segments of the plurality of data segments in the DSN memory 352. The DS processing module 350 may select which of the plurality of data segments to store in the local memory based on the update likelihood indicator. For example, the DS processing module 350 stores 5 of the 15 data segments in the local memory and stores a remaining 10 data segments in the DSN memory 352.

When storing a remaining data segment in the DSN memory 352, the DS processing module 350 encodes each remaining data segment using a dispersed storage error coding function to produce a set of encoded remaining slices and issues a set of write slice requests 582 to the set of DS units 354 that includes the set of encoded remaining slices and a common transaction number. The DS processing module 350 receives write slice responses 584 from the DSN memory 352 with regards to status of the set of write slice requests 582 (e.g., storage success or error). The DS processing module 350 issues a open write file response 586 to the user device 14. The open write file response 586 may include one or more of data segment identifiers of data segments of the plurality of data segments that are available for random writes and which remaining data segments of the plurality of data segments have been currently written to the DSN memory 352.

When updating a portion of the data file, the user device 14 issues a random write data request 588 to the DS processing module 350 that includes one or more of the data identifier, an updated portion of the data file, and an offset indicator corresponding to the updated portion of the data file. The DS processing module 350 updates a portion of the temporarily stored data file with the updated portion of the data file. The updating includes one or more of appending, interleaving, overwriting, and locally storing an updated portion of the temporally stored data file. The DS processing module 350 issues a random write data response 590 to the user device 14 to acknowledge execution of the random write data request 588. Alternatively, or in addition to, the DS processing module 350 may receive a read data request from the user device 14 to read one or more data segments of the at least some of data segments of the plurality of data segments. The DS processing module 350 issues a read data response to the user device that includes the requested one or more data segments in response to the read data request.

The user device 14 issues a close write file request 592 to the DS processing module 350 when the user device 14 determines to end the random write process on the data file. For each data segment of the at least some of the plurality of data segments, the DS processing module 350 encodes the data segment using the dispersed storage error coding function to produce a set of encoded data slices, generates a set of write slice requests 582 that includes the set of encoded data slices and the common transaction number, and outputs the set of write slice requests 582 to the DSN memory 352. When receiving a favorable number of write slice responses 584 (e.g., a write threshold number of write slice responses indicating successful storage for each set of encoded data slices), the DS processing module 350 issues one or more sets of commit transaction requests 594 to the set of DS units 354 that includes the common transaction number. The DS processing module 350 receives commit transaction responses 596 from the set of DS units 354 indicating a status of a commit operation. The DS processing module 350 issues a close write file response 598 to the user device 14 that includes status of the commit operation based on the received commit transaction responses 596.

Figure 45B:
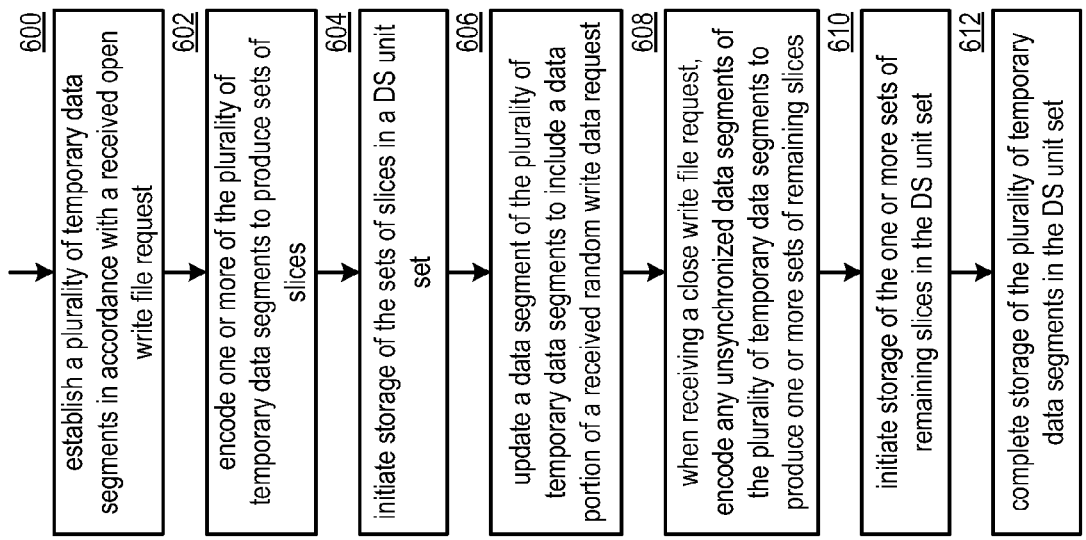
FIG. 45B is a flowchart illustrating an example of storing data utilizing a random writes in accordance with the present invention.

FIG. 45B is a flowchart illustrating an example of storing data utilizing random writes. The method begins at step 600 where a processing module (e.g., of a dispersed storage (DS) processing module) establishes a plurality of temporary data segments in accordance with a received open write file request. The establishing includes one or more of receiving the open write file request, partitioning a data file of the open write file request to produce the plurality of temporary data segments, selecting at least some of the plurality of temporary data segments, and temporarily storing the at least some of the plurality of temporary data segments in a local memory.

The method continues at step 602 where the processing module encodes one or more of the plurality of temporary data segments to produce sets of slices. The encoding includes selecting the one or more of the plurality of temporary data segments based on a likelihood of being updated indicator of the open write file request. For example, the processing module selects the one or more of the plurality of temporary data segments as data segments that are likely not to be updated during a random write process. The method continues at step 604 where the processing module initiates storage of the sets of slices in a DS unit set. The initiating includes generating at least one set of write slice requests to include the common transaction number and the sets of slices, outputting the at least one set of write slice requests to the DS unit set, and receiving write slice responses indicating status of some of the write slice requests.

The method continues at step 606 where the processing module updates a data segment of the plurality of temporary data segments to include a data portion of a received random write data request. The updating includes receiving the random write data request, overwriting and/or appending the data portion with regards to the data segment, and issuing a random write data response to a requesting entity to acknowledge the random write data request. When receiving a close write file request, the method continues at step 608 where the processing module encodes any unsynchronized data segments (e.g., data segments that have not been stored in the DS unit set) of the plurality of temporary data segments to produce one or more sets of remaining slices. The encoding includes identifying the unsynchronized data segments and encoding each unsynchronized data segment using a dispersed storage error coding function to produce the corresponding set of remaining slices.

The method continues at step 610 where the processing module initiates storage of the one or more sets of remaining slices in the DS unit set. The initiating of the storage includes generating one or more sets of write slice requests to include the one or more sets of remaining slices and outputting the one or more sets of write slice requests to the DS unit set. The method continues at step 612 where the processing module completes storage of the plurality of temporary data segments in the DS unit set. The completing of the storage includes one or more of determining whether at least a write threshold number of favorable write slice responses have been received for each data segment of the plurality of decoded data segments, generating one or more sets of commit transaction requests that includes the common transaction number, and outputting the one or more sets of commit transaction requests to the DS unit set. In addition, the processing module may issue a close file response to the requesting entity based on receiving a favorable number of commit transaction responses from the DS unit set. For example, the processing module receives at least a write threshold number of favorable commit transaction responses from the DS unit set for each data segment of the plurality of temporary data segments.

FIGS. 46A, D, and E are schematic block diagrams of an embodiment of a dispersed storage network (DSN) that includes two or more distributed storage and task (DST) client modules A-B, the network 24 of FIG. 1, and a DST execution (EX) unit set 620. The two or more DST client modules A-B may be implemented utilizing the DST client module 34 of FIG. 1. Each DST client module A-B includes the outbound DS processing module 80 of FIG. 3. The DST execution unit set 620 may include any number of DST execution units. For example, the DST execution unit set 620 includes DST execution units 1-5 when the DST execution unit set 620 includes five DST execution units. Each DST execution unit 1-5 may be implemented utilizing the DST execution unit 36 of FIG. 1. Each DST execution unit 1-5 includes the processing module 84 and the memory 88 of FIG. 3.

The DSN further includes at least one memory module, where the memory module includes a first storage device associated with the DST client modules A-B, a second storage device associated with the DST execution units 1-5, and a third storage device associated with the DST client modules A-B. The first and third storage devices may be the same or different storage devices. The first and third storage devices store operational instructions for execution by the DST client modules A-B. For example, the outbound DS processing module 80 of DST client module A executes the stored operational instructions of the first storage device and the third storage device. As another example, the outbound DS processing module 80 of DST client module B executes the stored operational instructions of the first storage device and the third storage device. The second storage device stores operational instructions for execution by the DST execution units 1-5. For example, the processing module 84 of DST execution unit 1 executes the stored operational instructions of the second storage device.

The DSN functions to store a data object in the DST execution unit set 620 in accordance with a write conflict resolution approach. As a specific example, the DST client modules A-B nearly concurrently initiate first (e.g., from A) and second (e.g., from B) transactions to write a data object Z to the DST execution unit set 620, the DST client module A cancels the first transaction when determining that the DST client module B has write priority over the DST client module A, and the DST client module B completes the second transaction when determining that the DST client module B has write priority over the DST client module A. As another specific example, the DST client modules A-B nearly concurrently initiate the first and second transactions to write the data object Z to the DST execution unit set 620, the DST client module B cancels the second transaction when determining that the DST client module A has write priority over the DST client module B, and the DST client module A completes the first transaction when determining that the DST client module A has write priority over the DST client module B. Hereafter, the DST client module A may be referred to as a first client device, the DST client module B may be referred to as a second client device, and a DST execution unit may be referred to as a storage unit.

FIG. 46A illustrates the example of the DST client modules A-B nearly concurrently initiating first and second transactions to write the data object Z to the DST execution unit set 620. Hereafter, operational examples of the outbound DS processing module 80 of the DST client modules A-B and processing module 84 of the DST execution units 1-5 includes execution of the operational instructions stored by the first, second, and third storage device of the memory module even though not explicitly stated.

As a specific example of the initiating of the first and second transactions, the DST client modules A-B each receive a store data object Z request 622 at substantially the same timeframe, where the store data object Z request 622 includes one or more of the data object Z, and a data identifier (ID) of the data object Z. The data object Z received by the DST client modules A-B may be the same or different revisions.

The DST client modules A-B each divide the data object Z into a plurality of data segments and encode each data segment using a dispersed storage error coding function to produce a set of encoded data slices. For example, the DST client module A divides the data object Z into 100 data segments and encodes a first data segment to produce a first set of encoded data slices (e.g., encoded data slices Z-1-1, Z-2-1, Z-3-1, Z-4-1, and Z-5-1) and the DST client module B divides the data object Z into the 100 data segments and encodes the first data segment to produce a second set of encoded data slices (e.g., encoded data slices Z-1-1, Z-2-1, Z-3-1, Z-4-1, and Z-5-1). The first and second set of encoded data slices are substantially the same when the received revisions of the data object Z are substantially the same and the first and second set of encoded data slices are not substantially the same when the received revisions of the data object Z are not substantially the same.

Having produced the first and second sets of encoded data slices, the outbound DS processing module 80 of the DST client module A transmits a first set of initiate write transaction requests A regarding the first set of encoded data slices to the DST execution unit set 620. For example, the DST client module A generates a first set of write slice requests 1-A, 2-A, 3-A, 4-A, and 5-A to include the first set of encoded data slices Z-1-1, Z-2-1, Z-3-1, Z-4-1, and Z-5-1, a set of slice names, and a first transaction number; and sends, via the network 24, the first set of write slice requests 1-A, 2-A, 3-A, 4-A, and 5-A to the DST execution units 1-5.

The outbound DS processing module 80 of the DST client module B transmits, nearly concurrently with the transmitting by the DST client module A, a second set of initiate write transaction requests B regarding the second set of encoded data slices to the DST execution unit set 620. For example, the outbound DST client module B generates a second set of write slice requests 1-B, 2-B, 3-B, 4-B, and 5-B to include the second set of encoded data slices Z-1-1, Z-2-1, Z-3-1, Z-4-1, and Z-5-1, the set of slice names, and a second transaction number; and sends, via the network 24, the second set of write slice requests 1-B, 2-B, 3-B, 4-B, and 5-B to the DST execution units 1-5. Examples of the transmitting by the DST client module B nearly concurrently with the transmitting by the DST client module A are discussed in greater detail with reference to FIG. 46B.

Each processing module 84 of each DST execution unit 1-5 temporarily stores one of the first set of encoded data slices in the memory 88 when the one of the first set of write slice requests is received. Each processing module 84 of each DST execution unit 1-5 temporarily stores one of the second set of encoded data slices in the memory 88 when the one of the second set of write slice requests is received (e.g., represented as shaded slices of FIG. 46A). The processing module 84 may delete the one of the first set of encoded data slices when a rollback timeframe has expired (e.g., one minute since temporarily storing the first set of encoded data slices) without receiving a commit transaction request that includes the first transaction number. The processing module 84 may delete the one of the second set of encoded data slices when the rollback timeframe has expired (e.g., one minute since temporarily storing the second set of encoded data slices) without receiving another commit transaction request that includes the second transaction number.

Having received the first and second sets of encoded data slices, the processing module 84 of the DST execution unit 1 determines whether the one of the first set of write slice requests was received before the one of the second set of write slice requests or whether the one of the second set of write slice requests was received before the one of the first set of write slice requests. As a specific example, the write slice requests 1-A, 2-A, and 3-A from the DST client module A were received by DST execution units 1-3 before the write slice requests 1-B, 2-B, and 3-B from the DST client module B and the write slice requests 4-B and 5-B from the DST client module B were received by DST execution units 4-5 before the write slice requests 4-A and 5-A from the DST client module A. Timing of such an example is discussed in greater detail with reference to FIG. 46B.

As an instance of the example, the processing module 84 indicates that the one of the first set of write slice requests was received before the one of the second set of write slice requests when a comparison of the slice name of the one of the first set of write slice requests to a list of locked slice names indicates that the slice name of the one of the first set of write slice requests is not locked yet. As another instance, the processing module 84 indicates that the one of the second set of write slice requests was received before the one of the first set of write slice requests when the comparison of the slice name of the one of the second set of write slice requests to the list of locked slice names indicates that the slice name of the one of the second set of write slice requests is not locked yet.

When the one of the first set of write slice requests is received before the one of the second set of write slice requests, the processing module 84 of the DST execution unit 1 generates a first write response 1 message that includes one or more of an indication that the slice name (e.g., of the first data segment, of the data object) is locked for the DST client module A, the first transaction number (e.g., now associated with the lock), an estimated duration of the lock, and a storage unit score value. The storage unit score value for DST execution unit 1 includes a unique value of 1 associated with DST execution unit 1.

Each DST execution unit 1-5 of the DST execution unit set 620 is associated with a unique storage unit score value of a set of unique storage unit score values where each storage unit score value is different from every other storage unit score value. For example, the DST execution unit 1 is associated with a storage unit score value of 1, the DST execution unit 2 is associated with a storage unit score value of 2, the DST execution unit 3 is associated with a storage unit score value of 4, the DST execution unit 4 is associated with a storage unit score value of 8, and the DST execution unit 5 is associated with the storage unit score value of 16. The score values may be the same or different for any of the data object, another data object, the first data segment, another data segment, and a different two or more DST client modules.

Having generated the first write response 1 message, the processing module 84 of the DST execution unit 1 sends, via the network 24, the first write response 1 message to the DST client module A in response to receiving the one of the first set of write requests. The processing module 84 of the DST execution unit 1 sends, via the network 24, the first write response 1 message to the DST client module B in response to receiving the one of the second set of write requests.

When the one of the second set of write slice requests is received before the one of the first set of write slice requests, the processing module 84 of the DST execution unit 4 generates a second write response 4 message that includes one or more of an indication that the slice name (e.g., of the first data segment, of the data object) is locked for the DST client module B, the second transaction number (e.g., now associated with the lock), the estimated duration of the lock, and the storage unit score value. The storage unit score value for DST execution unit 4 includes the unique value of 8 associated with DST execution unit 4. As an example of generating the second write response 4, the second write slice response 4 includes a slice name of Z-4-1, an assigned locking client ID of B as the indication that the slice name is locked for the DST client module B, and the DST execution unit 4 lock score of 8.

Having generated the second write response 4 message, the processing module 84 of the DST execution unit 4 sends, via the network 24, the second write response 4 message to the DST client module A in response to receiving the one of the first set of write requests. The processing module 84 of the DST execution unit 4 sends, via the network 24, the second write response 4 message to the DST client module B in response to receiving the one of the second set of write requests. The DST client modules A-B receive the locking information 624 that includes the write response messages from each of the DST execution units 1-5. As such, each DST client module A-B receives substantially the same locking information 624 and hence substantially the same storage unit score values for further processing.

FIG. 46B is a diagram illustrating an example of timing of a storage process of the example where the DST client modules A-B nearly concurrently initiate first (e.g., from A) and second (e.g., from B) transactions to write the data object Z to the DST execution unit set 620 of FIG. 46A. The diagram illustrates timing of messages between the DST client modules A-B and DST execution units 1-5 of the DST execution unit set 620, where time advances in a vertical direction going downward. The messages includes the DST client modules A-B issuing write slice requests to the DST execution units and the DST execution units issuing locking information (e.g., write responses) to the DST client modules A-B.

The example of timing illustrates timing for an example of operation where write slice requests (WSR) 1-A, 2-A, and 3-A from the DST client module A are received by DST execution units 1-3 before write slice requests 1-B, 2-B, and 3-B from the DST client module B and write slice requests 4-B and 5-B from the DST client module B are received by DST execution units 4-5 before the write slice requests 4-A and 5-A from the DST client module A. In the example of operation, the DST client module A sends the write slice request 1-A to the DST execution unit 1. The DST execution unit 1 issues locking information (LI) 1 to the DST client module A, where the locking information 1 indicates that DST client module A owns a lock associated with a first slice name of the write slice request 1-A and a storage unit score value of 1 when the first slice name was not locked. The DST client module B sends the write slice request 1-B to the DST execution unit 1. The DST execution unit 1 sends the locking information 1 to the DST client module B, when the first slice name is now locked by the DST client module A. A similar scenario is depicted for messages between the DST client modules A-B and the DST execution unit 2.

In another aspect of the example of operation, the DST client module A sends the write slice request 3-A to the DST execution unit 3 and the DST client module B sends the write slice request 3-B to the DST execution unit 3. The DST execution unit 1 issues locking information (LI) 3 to the DST client modules A-B, where the locking information 3 indicates that DST client module A owns a lock associated with a third slice name of the write slice request 3-A and a storage unit score value of 4 when the DST execution unit 3 determines that the write slice request 3-A was received before the write slice request 3-B and the third slice name was not locked.

In yet another aspect of the example of operation, the DST client module A sends the write slice request 4-A to the DST execution unit 4 before the DST client module B sends the write slice request 4-B to the DST execution unit 4. The DST execution unit 4 issues locking information (LI) 4 to the DST client module B, where the locking information 4 indicates that DST client module B owns a lock associated with a fourth slice name of the write slice request 4 -B and a storage unit score value of 8 when the DST execution unit 4 receives the write slice request 4-B before receiving the write slice request 4-A and the fourth slice name was not locked. The DST execution unit 4 sends the locking information 4 to the DST client module A, when the fourth slice name is now locked by the DST client module B. A similar scenario is depicted for messages between the DST client modules A-B and the DST execution unit 5.

FIG. 46C is a table illustrating assigning storage unit score values for the example where the DST client modules A-B nearly concurrently initiate first and second transactions to write the data object Z to the DST execution unit set 620 of FIG. 46A. The table includes, for each DST execution unit of the DST execution units 1-5 of the DST execution unit set 620, entries for a temporary lock assignment 626, entries for an available score 628, entries for the assigned scores 630 each DST client module A-B, and entries for total scores 632 for the DST client modules A-B.

The table illustrates the assigning of the storage unit score values for the example of operation where write slice requests (WSR) 1-A, 2-A, and 3-A from the DST client module A are received by DST execution units 1-3 before write slice requests 1-B, 2-B, and 3-B from the DST client module B and write slice requests 4-B and 5-B from the DST client module B are received by DST execution units 4-5 before the write slice requests 4-A and 5-A from the DST client module A as discussed in the FIGS. 46A-B. The entries of the temporary lock assignment 626 indicate that the DST client module A has locks associated with DST execution units 1-3 and that the DST client module B has locks associated with DST execution units 4-5.

The entries of the available score 628 indicate assignments of storage unit score values in accordance with a storage unit score value assignment approach. The approach includes at least one of maintaining unique values, doubling each first storage unit score value to calculate a second storage unit score value, assigning a weighted number based on a performance factor (e.g., DST execution unit performance, network performance), and assigning similar numbers that may require a separate tiebreaker method. As a specific example, the entries of the available score 628 indicates that DST execution unit 1 is associated with the storage unit score of 1, DST execution unit 2 is associated with the storage unit score of 2, DST execution unit 3 is associated with the storage unit score of 4, DST execution unit 4 is associated with the storage unit score of 8, and DST execution unit 5 is associated with the storage unit score of 16 when the approach includes doubling each storage unit score value to calculate another to avoid using the tiebreaker method.

The DST client modules A-B determine the assigned scores 630 based on receiving locking information from the DST execution units 1-5. For example, DST client module B receives locking information 2 from DST execution unit 2 indicating that the temporary lock assignment 626 is owned by DST client module A and that the available score 628 associated with the DST execution unit 2 is 2. As such, the DST client module B determines that the DST client module A receives a score of 2. Similarly, each of the DST client modules A-B determines that the DST client module A receives a score of 1 from DST execution unit 1, the score of 2 from DST execution unit 2, a score of 4 from DST execution unit 3, and that the DST client module B receives a score of 8 from DST execution unit 4 and a score of 16 from DST execution unit 5. Each of the DST client modules A-B determines entries of the total score 632 by adding up the scores. For example, the DST client modules A-B determines that the DST client module A receives a total score of 7 and DST client module B receives a total score of 24.

Having determined the entries of the total score 632, the DST client modules A-B mathematically process the DST execution unit 1-5 score values of the received first and second write response messages of FIG. 46A to determine whether the DST client module A has the write priority over the DST client module B, where each of the DST execution units 1-5 is assigned a storage value that, when mathematically processing, avoids a priority tie between the DST client modules A-B. For the example, the DST client modules A-B indicate that DST client module B has the write priority over the DST client module A when the score associated with the DST client module B is greater than the score associated with DST client module A when utilizing the doubling approach to avoid the tiebreaker (e.g., 24 is greater than 7).

Alternatively, when the storage unit score value assignment approach allows the total scores 632 that can result in the tie, the DST client modules A-B determine the write priority in accordance with a tiebreaker approach. As a specific example, the DST client modules A-B mathematically process the storage unit score values of the received first and second write response messages to produce the DST client module A score and the DST client module B score. When the DST client module A score compares favorably to the DST client module B score (e.g., the DST client module A score is greater than the DST client module B score), the DST client modules A-B indicate that the DST client module A has the write priority over the DST client module B. When the DST client module A score substantially equals the DST client module B score, the DST client modules A-B apply a tiebreaker mechanism to determine which of the DST client modules A-B has the write priority. The tie-breaker mechanism includes one or more of randomly selecting one of the DST client modules A-B, selecting a DST client module associated with a majority of the temporary lock assignments 626, selecting a DST client module associated with a preference indicator, and selecting the DST client module associated with a favorable performance level.

FIG. 46D illustrates the example of the DST client modules A canceling the first transaction when determining that the DST client module B has write priority over the DST client module A. As a specific example, the DST client modules A-B interpret the storage unit score values of received first and second write response messages to determine whether the DST client module A has write priority over the DST client module B. When the DST client module A does not have the write priority over the DST client module B, the DST client module A sends a set of cancel write transaction requests A to the DST execution unit set 620 regarding the data object Z such that the DST execution units 1-5 cancel the first set of write slice requests 1-A through 5-A. For instance, the DST client module A generates a set of rollback transaction requests A, where each rollback transaction request A includes the first transaction number, and sends, via the network 24, the set of rollback transaction requests A to the DST execution units 1-5.

Each of the DST execution units 1-5, in response to receiving one of the set of rollback transaction requests A, deletes the one of the first set of encoded data slices that was temporarily stored. For instance, the processing module 84 of the DST execution unit 1 deletes the encoded data slice Z-1-1 that was received from DST client module A, the processing module 84 of the DST execution unit 2 deletes the encoded data slice Z-2-1 that was received from DST client module A, the processing module 84 of the DST execution unit 3 deletes the encoded data slice Z-3-1 that was received from DST client module A, etc.

Alternatively, when the DST client module B does not have the write priority over the DST client module A, the DST client module sends the set of rollback requests B regarding the data object Z to the DST execution units 1-5 such that the DST execution units 1-5 cancel the second set of write slice requests. Each of the DST execution units 1-5, in response to receiving one of the set of rollback transaction requests B, deletes the one of the second set of encoded data slices that was temporarily stored.

FIG. 46E illustrates the example of the DST client module B completing the second transaction when determining that the DST client module B has write priority over the DST client module A. As a specific example, the DST client module B receives the first and second write response messages from the DST execution units 1-5 and interprets the storage unit score values of received first and second write response messages to determine whether the DST client module B has write priority over the DST client module A. When the DST client module B has the write priority over the DST client module A, the DST client module B sends a set of next-phase write transaction requests B regarding the data object Z to the DST execution unit set 620. For example, the DST client module B generates a set of commit transaction requests B, where each commit transaction request B includes the second transaction number, and sends the set of commit transaction requests B to the set of DST execution units 1-5.

Each DST execution unit 1-5, in response to receiving one of the set of next-phase write requests (e.g., the commit transaction request B) from the DST client module B, continues with a write process of permanently storing the one of the second set of encoded data slices. For example, the processing module 84 of the DST execution unit 3 permanently stores encoded data slice Z-3-1 and issues a commit transaction response 3-B indicating that the encoded data slice Z-3-1 associated with the second transaction number has been permanently stored. The DST client module B receives the next-phase write transaction responses B (e.g., commit transaction responses 1-B, 2-B, 3-B, 4-B, and 5-B) from the set of DST execution units 1-5 to confirm the permanent storage.

Alternatively, the DST client modules A-B interpret the storage unit score values of the received first and second write response messages to determine whether the DST client module A has the write priority over the DST client module B. When the DST client module A has the write priority over the DST client module B, the DST client module A sends the set of next-phase write requests regarding the data object to the DST execution units 1-5. In response to receiving one of the set of next-phase write requests, each DST execution unit 1-5 continues with the write process of permanently storing the one of the first set of encoded data slices (e.g., associated with the first write transaction number).

FIG. 46F is a flowchart illustrating an example of resolving write conflicts. The method begins at step 640 where a first client device (e.g., of a user device that includes a distributed storage and task (DST) client module A) transmits a first set of write requests regarding a first set of encoded data slices to storage units of a dispersed storage network (DSN), where the first client device dispersed storage error encoded a data object to produce the first set of encoded data slices. The method continues at step 642 where a second client device (e.g., of another user device that includes a DST client module B) transmits nearly concurrently with the transmitting by the first client device, a second set of write requests regarding a second set of encoded data slices to the storage units, where the second client device dispersed storage error encoded the data object to produce the second set of encoded data slices (e.g., encoded for a same portion of the data object as the first client device).

The method continues at step 644 where a storage unit of the storage units receives one of the first set of write requests before one of the second set of write requests or receives the one of the second set of write requests before the one of the first set of write requests. The method continues at step 646 where the storage unit temporarily stores one of the first set of encoded data slices when the one of the first set of write requests is received and temporarily stores one of the second set of encoded data slices when the one of the second set of write requests is received.

When the one of the first set of write requests is received before the one of the second set of write requests, the method continues at step 648 where the storage unit issues a first write response message to the first and second client devices. As a specific example, the storage unit generates the first write response message that includes an indication that the data object is locked for the first client device and a storage unit score value. Having generated the first write response message, the storage unit sends the first write response message to the first client device in response to receiving the one of the first set of write requests and the storage unit sends the first write response message to the second client device in response to receiving the one of the second set of write requests.

When the one of the second set of write requests is received before the one of the first set of write requests, the method continues at step 650 where the storage unit issues a second write response message to the first and second client devices. As a specific example, the storage unit generates the second write response message that includes an indication that the data object is locked for the second client device and the storage unit score value. Having generated the second write response message, the storage unit sends the second write response message to the first client device in response to receiving the one of the first set of write requests and sends the second write response message to the second client device in response to receiving the one of the second set of write requests.

The method continues at step 652 where the first and second client devices receive the first and second write response messages from the storage units. The method continues at step 654 where the first and second client devices interpret the storage unit score values of the received first and second write response messages to determine whether the first client device or the second client device has write priority. For example, the first and second client devices interpret the storage unit score values of the received first and second write response messages to determine whether the first client device has write priority over the second client device. As another example, the first and second client devices interpret the storage unit score values of the received first and second write response messages to determine whether the second client device has write priority over the first client device.

As a specific example of the interpreting the storage unit score values of the received first and second write response messages to determine whether the first client device has the write priority over the second client device, the first and second client devices mathematically process the storage unit score values of the received first and second write response messages to determine whether the first client device has the write priority over the second client device, where each of the storage units is assigned a storage value that, when mathematically processed, avoids a priority tie between the first and second client devices. For instance, the first and second client devices indicate that the first client device has the write priority over the second client device when the first and second client devices process the storage unit score values of the received first and second response messages to produce a first client device score and a second client device score (e.g., totals including storage unit score values from all of the storage units) where the first client device score is greater than the second client device score.

As another specific example of the determining whether the first client device or the second client device has write priority, the first and second client devices interpret the storage unit score values of the received first and second write response messages by mathematically processing the storage unit score values of the received first and second write response messages to produce the first client device score and the second client device score. Having produced the first and second client device scores, the first and second client devices indicate that the first client device has the write priority over the second client device when the first client device score compares favorably (e.g., greater than) to the second client device score. When the first client device score substantially equals the second client device score, the first and second client devices apply a tie-breaker mechanism to determine which of the first and second client devices has the write priority. The method branches to a step A of FIG. 46G when the first client device has the write priority. The method branches to a step B of FIG. 46G when the second client device has the write priority.

FIG. 46G is a flowchart illustrating another example of resolving write conflicts. The method follows, as step A from FIG. 46F, at step 656 where when the second client device does not have the write priority over the first client device, the second client device sends a set of rollback requests regarding the data object to the storage units such that the storage units cancel the second set of write requests. For example, the second client device generates and sends a set of rollback transaction requests to the storage units, where the set of rollback transaction requests includes a second transaction number associated with the second set of write requests.

In response to receiving one of the set of rollback requests, the method continues at step 658, where the storage unit deletes the one of the second set of encoded data slices that was temporally stored. When the first client device has the write priority over the second client device, the method continues at step 660 where the first client device sends a set of next-phase write requests regarding the data object to the storage units. For example, the first client device generates and sends a set of commit transaction requests to the storage units, where the set of commit transaction requests includes a first transaction number associated with the first set of write requests. In response to receiving one of the set of next-phase write requests, the method continues at step 662 where the storage unit continues with a write process of permanently storing the one of the first set of encoded data slices. For example, the storage unit indicates that the one of the first set of encoded data slices is available for retrieval and issues a commit transaction response to the first client device indicating that the corresponding commit transaction request has been successfully executed. Alternatively, the storage unit continues with the write process of permanently storing the one of the first set of encoded data slices in response to the receiving the one of the set of next-phase write requests from the first client device when receiving the one of the set of rollback requests (e.g., associated with a lock) from the second client device.

Alternatively, the method follows, as step B from FIG. 46F, at step 664 where when the first client device does not have the write priority over the second client device, the first client device sends the set of rollback requests regarding the data object to the storage units such that the storage units cancel the first set of write requests. For example, the first client device generates and sends the set of rollback transaction requests to the storage units, where the set of rollback transaction requests includes the first transaction number associated with the first set of write requests.

In response to receiving one of the set of rollback requests, the method continues at step 666, where the storage unit deletes the one of the first set of encoded data slices that was temporally stored. When the second client device has the write priority over the first client device, the method continues at step 668 where the second client device sends the set of next-phase write requests regarding the data object to the storage units. For example, the second client device generates and sends the set of commit transaction requests to the storage units, where the set of commit transaction requests includes the second transaction number associated with the second set of write requests. In response to receiving one of the set of next-phase write requests, the method continues at step 670 where the storage unit continues with the write process of permanently storing the one of the second set of encoded data slices. For example, the storage unit indicates that the one of the second set of encoded data slices is available for retrieval and issues the commit transaction response to the second client device indicating that the corresponding commit transaction request has been successfully executed. Alternatively, the storage unit continues with the write process of permanently storing the one of the second set of encoded data slices in response to the receiving the one of the set of next-phase write requests from the second client device when receiving the one of the set of rollback requests (e.g., associated with a lock) from the first client device.

FIG. 47A is a schematic block diagram of another embodiment of a dispersed storage system that includes the dispersed storage (DS) processing module 350 of FIG. 40A, a completeness module 678, and the dispersed storage network (DSN) memory 352 of FIG. 40A. The DSN memory 352 includes at least one DS unit set of a set of DS units 354 of FIG. 40A. The completeness module 678 may be implemented utilizing the DS processing module 350.

The system functions to store a very large data object in the DSN memory 352. The DS processing module 350 updates an active write process list in a hierarchical index stored in the DSN memory 352 to indicate a storing process is ongoing for the very large data object. The updating includes generating a list entry that includes one or more of a data identifier of the very large data object, a DS processing module identifier, a data transaction number, and a source name associated with the very large data object. The updating further includes issuing a set of index slice requests 680 to the DSN memory 352 to read a corresponding entry of the hierarchical index, receiving index slice responses 682, decoding index slices of the received index slice responses 682 using a dispersed storage error coding function to recover a portion of the hierarchical index, updating the portion of the hierarchical index with the list entry, encoding the updated portion of the hierarchical index using the dispersed storage error coding function to produce a set of updated index slices, issuing another set of index slice requests 680 to write the updated portion of the hierarchical index to the DSN memory 352, receiving at least a write threshold number of favorable other index slice responses 682 from the DSN memory 352 with regards to the other set of index slice requests 680, and issuing yet another set of index slice requests 680 to the DSN memory 352 that includes a set of commit transaction requests to complete storage of the updated index slices.

The DS processing module 350 generates a set of active slice names based on the data identifier (ID) and issues a set of data slice access requests 684 that includes a set of write requests including the set of active slice names, an active transaction number, and a set of dummy slices (e.g., null slices) to the DSN memory 352. The generating includes at least one of performing a lookup in a data ID to active slice names list and performing a deterministic function on the data ID to produce the set of active slice names. For example, the DS processing module 350 performs a mask generating function on the data ID to produce a source name that is utilized to produce the set of active slice names.

The DS processing module 350 partitions the very large data object to produce a plurality of data segments. For each data segment of the plurality data segments, the DS processing module 350 encodes the data segment using the dispersed storage error coding function to produce a set of encoded data slices and issues a set of data slice access requests 684 including write requests that includes the set of encoded data slices and a data transaction number to the DSN memory 352. When each data segment of the plurality data segments has been encoded and written to the DSN memory, the DS processing module generates one or more sets of data slice access requests 684 that includes a set of commit transaction requests including the data transaction number. The DS processing module 350 outputs the one or more sets of data slice access requests 684 to the DSN memory 352 to make the very large data object visible for subsequent read operations. The DS processing module 350 updates the active write process list to exclude the data ID (e.g., retrieve the hierarchical index portion, update and/or delete the entry, store the updated hierarchical index portion in the DSN memory). The DS processing module 350 issues a set of data slice access requests 684 to the DSN memory 352 that includes a set of rollback transaction requests including the active transaction number.

During the active write process, the completeness module 678 is operable to access the active write process list in the hierarchical index of the DSN memory 352 to identify the data ID. As a specific example, the completeness module 678 generates the set of active slice names based on the data ID and issues a set of data slice access requests 684 that includes a set of write requests including the set of active slice names, a random transaction number, and null slices (e.g., to test for a lock conflict). When receiving a write threshold number of favorable (e.g., no lock conflict) data slice access responses 686 the completeness module 678 initiates a cleanup process to delete one or more data segments of the plurality of data segments from the DSN memory 352 since the DS processing module 350 has taken too long to write the very large data object to the DSN memory 352 and the DSN memory 352 has automatically timed out and rolled back the lock on the active slice names (e.g., the DS processing module 350 may have crashed or lost communication with the DSN memory 352). The cleanup process includes the completeness module 678 issuing data slice access requests 684 (e.g., delete requests and/or rollback transaction requests) to delete all encoded data slices associated with the source name.

FIG. 47B is a flowchart illustrating an example of writing data. The method begins at step 690 where a processing module (e.g., of a dispersed storage (DS) processing module) updates an active write process list to include an entry for a data object to be stored in a dispersed storage network (DSN) memory. The updating includes one or more of retrieving index slices from the DSN memory, decoding the index slices to reproduce an index, updating the index, encoding the updated index, and storing updated index slices in the DSN memory. The method continues at step 692 where the processing module obtains a write lock on a set of active slice names associated with the data object. The obtaining includes generating the set of active slice names based on a data identifier (ID) associated with the data object (e.g., performing a deterministic function on the data ID). The method continues at step 694 where the processing module partitions the data object into a plurality of data segments in accordance with a data segmentation approach.

For each data segment of the plurality data segments, the method continues at step 696 where the processing module initiates writing the data segment to the DSN memory. The initiating includes encoding the data segment using a dispersed storage error coding function to produce a set of encoded data slices and issuing a set of write requests that includes the set of encoded data slices and a data transaction number. When the initiation of writing each data segment of the plurality of data segments has been successfully completed, the method continues at step 698 where the processing module completes writing the plurality of data segments to the DSN memory. The processing module indicates successful completion of writing each data segment when the corresponding write threshold number of favorable write slice responses has been received with regards to write slice requests of the data segment. The completion of the writing includes issuing a set of commit transaction requests that includes the data transaction number to the DSN memory.

The method continues at step 700 where the processing module updates the active write process list to exclude the entry for the data object. The updating includes retrieving a portion of the index that includes the entry, deleting the entry or deleting the data ID from the entry to produce an updated portion of the index, and storing the updated portion of the index in the DSN memory. The method continues at step 702 where the processing module releases the write lock on the set of active slice names associated with the data object. The releasing includes issuing a set of rollback transaction requests to the DSN memory that includes the active transaction number.

FIG. 47C is a flowchart illustrating an example of deleting partially written data. The method begins at step 704 where a processing module (e.g., of a completeness module) identifies a data object being written to a dispersed storage network (DSN) memory. The identifying includes accessing an active write process list and extracting a data identifier (ID) of the data object being written to the DSN memory. The method continues at step 706 where the processing module determines if a write lock on a set of active slice names associated with the data object can be obtained. The determining includes generating the set of active slice names based on the data ID (e.g., performing a deterministic function on the data ID to produce a source name utilized to produce the set of active slice names), issuing a set of write slice requests that includes the set of active slice names and a random transaction number, receiving write slice responses indicating whether the write lock was obtained for a dispersed storage (DS) unit of the DSN memory, and indicating that the write lock was obtained when a write threshold number of write locks have been obtained from a write threshold number of DS units.

When a write lock on the set of active slice names associated with the data object can be obtained, the method continues at step 708 where the processing module identifies one or more portions of the data object temporarily stored in the DSN memory for deletion. The identifying includes identifying a source name for the data object from the active write process list, generating a plurality of sets of slice names based on the source name, issuing one or more sets of list slice requests to the DSN memory, and receiving list slice responses indicating identities of encoded data slices for deletion. The method continues at step 710 where the processing module deletes the one or more portions of the data object from the DSN memory. For example, the DS processing module issues deleteslice requests utilizing slice names for deletion. As another example, the DS processing module issues a rollback transaction request that includes a data transaction number associated with the data object (e.g., retrieved from the active write process list).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the method comprises:

transmitting, by a first client device, a first set of write requests regarding a first set of encoded data slices to storage units of the DSN, wherein the first client device dispersed storage error encoded a data object to produce the first set of encoded data slices;

transmitting, by a second client device and nearly concurrently with the transmitting by the first client device, a second set of write requests regarding a second set of encoded data slices to the storage units, wherein the second client device dispersed storage error encoded the data object to produce the second set of encoded data slices;

for a storage unit of the storage units:
receiving one of the first set of write requests before one of the second set of write requests or receiving the one of the second set of write requests before the one of the first set of write requests;

when the one of the first set of write requests is received before the one of the second set of write requests:
generating a first write response message that includes an indication that the data object is locked for the first client device and a storage unit score value;
sending the first write response message to the first client device in response to receiving the one of the first set of write requests; and
sending the first write response message to the second client device in response to receiving the one of the second set of write requests;

when the one of the second set of write requests is received before the one of the first set of write requests:
generating a second write response message that includes an indication that the data object is locked for the second client device and the storage unit score value;
sending the second write response message to the first client device in response to receiving the one of the first set of write requests; and
sending the second write response message to the second client device in response to receiving the one of the second set of write requests;

receiving, by the first client device, first and second write response messages from the storage units;
interpreting, by the first client device, storage unit score values of the received first and second write response messages to determine whether the first client device has write priority over the second client device; and
when the first client device has the write priority over the second client device, sending, by the first client device, a set of next-phase write requests regarding the data object to the storage units.

2. The method of claim 1 further comprises:
when the first client device does not have the write priority over the second client device, sending, by the first client device, a set of rollback requests regarding the data object to the storage units such that the storage units cancel the first set of write requests.

3. The method of claim 1 further comprises:
receiving, by the second client device, the first and second write response messages from the storage units;
interpreting, by the second client device, the storage unit score values of the received first and second write response messages to determine whether the second client device has the write priority over the first client device; and
when the second client device has the write priority over the first client device, sending, by the second client device, the set of next-phase write requests regarding the data object to the storage units.

4. The method of claim 3 further comprises:
when the second client device does not have the write priority over the first client device, sending, by the second client device, a set of rollback requests regarding the data object to the storage units such that the storage units cancel the second set of write requests.

5. The method of claim 1, wherein the interpreting the storage unit score values of the received first and second write response messages further comprises:
mathematically processing the storage unit score values of the received first and second write response messages to determine whether the first client device has the write priority over the second client device, wherein each of the storage units is assigned a storage value that, when mathematically processing, avoids a priority tie between the first and second client devices.

6. The method of claim 1, wherein the interpreting the storage unit score values of the received first and second write response messages further comprises:
mathematically processing the storage unit score values of the received first and second write response messages to produce a first client device score and a second client device score;
when the first client device score compares favorably to the second client device score, indicating that the first client device has the write priority over the second client device; and
when the first client device score substantially equals the second client device score, applying a tie-breaker mechanism to determine which of the first and second client devices has the write priority.

7. The method of claim 1 further comprises:
temporarily storing, by the storage unit, one of the first set of encoded data slices when the one of the first set of write requests is received; and
temporarily storing, by the storage unit, one of the second set of encoded data slices when the one of the second set of write requests is received.

8. The method of claim 7 further comprises:
in response to receiving one of the set of next-phase write requests, continuing, by the storage unit, with a write process of permanently storing the one of the first set of encoded data slices; and
in response to receiving one of a set of rollback requests, deleting, by the storage unit, the one of the second set of encoded data slices that was temporarily stored.

9. The method of claim 7 further comprises:
in response to receiving one of a second set of next-phase write requests from the second client device, continuing, by the storage unit, with a write process of permanently storing the one of the second set of encoded data slices; and
in response to receiving one of a set of rollback requests from the first client device, deleting, by the storage unit, the one of the first set of encoded data slices that was temporarily stored.

10. A memory module of a dispersed storage network (DSN), the memory module comprises:
a first storage device that stores operational instructions that, when executed by a first client device or a second client device, causes the first client device or the second client device to:
transmit, as the first client device, a first set of write requests regarding a first set of encoded data slices to storage units of the DSN, wherein the first client device dispersed storage error encoded a data object to produce the first set of encoded data slices;
transmit, as the second client device and nearly concurrently with the transmitting by the first client device, a second set of write requests regarding a second set of encoded data slices to the storage units, wherein the second client device dispersed storage error encoded the data object to produce the second set of encoded data slices;
a second storage device that stores operational instructions that, when executed by a storage unit, causes the storage unit to:
 determine whether one of the first set of write requests was received before one of the second set of write requests or whether the one of the second set of write requests was received before the one of the first set of write requests;
 when the one of the first set of write requests is received before the one of the second set of write requests:
  generate a first write response message that includes an indication that the data object is locked for the first client device and a storage unit score value;
  send the first write response message to the first client device in response to receiving the one of the first set of write requests; and
  send the first write response message to the second client device in response to receiving the one of the second set of write requests;
 when the one of the second set of write requests is received before the one of the first set of write requests:
  generate a second write response message that includes an indication that the data object is locked for the second client device and the storage unit score value;
  send the second write response message to the first client device in response to receiving the one of the first set of write requests; and
  send the second write response message to the second client device in response to receiving the one of the second set of write requests; and
a third storage device that stores operational instructions that, when executed by the first client device or the second client device, causes the first client device or the second client device to:
 interpret storage unit score values of received first and second write response messages to determine whether the first client device has write priority over the second client device; and
 when the first client device has the write priority over the second client device, send, as the first client device, a set of next-phase write requests regarding the data object to the storage units.

11. The memory module of claim 10 further comprises:
the third storage device further stores operational instructions that, when executed by the first client device or the second client device, further causes the first client device or the second client device to:
 when the first client device does not have the write priority over the second client device, send, as the first client device, a set of rollback requests regarding the data object to the storage units such that the storage units cancel the first set of write requests.

12. The memory module of claim 10 further comprises:
the third storage device further stores operational instructions that, when executed by the first client device or the second client device, further causes the first client device or the second client device to:
 receive, as the second client device, first and second write response messages from the storage units;
 interpret, as the second client device, the storage unit score values of the received first and second write response messages to determine whether the second client device has the write priority over the first client device; and
 when the second client device has the write priority over the first client device, send, as the second client device, the set of next-phase write requests regarding the data object to the storage units.

13. The memory module of claim 12 further comprises:
the third storage device further stores operational instructions that, when executed by the first client device or the second client device, further causes the first client device or the second client device to:
 when the second client device does not have the write priority over the first client device, send, as the second client device, a set of rollback requests regarding the data object to the storage units such that the storage units cancel the second set of write requests.

14. The memory module of claim 10, wherein the operational instructions that, when executed by the first client device or the second client device, causes the first client device or the second client device to interpret the storage unit score values of the received first and second write response messages by:
 mathematically processing the storage unit score values of the received first and second write response messages to determine whether the first client device has the write priority over the second client device, wherein each of the storage units is assigned a storage value that, when mathematically processing, avoids a priority tie between the first and second client devices.

15. The memory module of claim 10, wherein the operational instructions that, when executed by the first client device or the second client device, causes the first client device or the second client device to interpret the storage unit score values of the received first and second write response messages by:
 mathematically processing the storage unit score values of the received first and second write response messages to produce a first client device score and a second client device score;
 when the first client device score compares favorably to the second client device score, indicating that the first client device has the write priority over the second client device; and
 when the first client device score substantially equals the second client device score, applying a tie-breaker mechanism to determine which of the first and second client devices has the write priority.

16. The memory module of claim 10 further comprises:
the second storage device further stores operational instructions that, when executed by the storage unit, further causes the storage unit to:
 temporarily store, by the storage unit, one of the first set of encoded data slices when the one of the first set of write requests is received; and
 temporarily store, by the storage unit, one of the second set of encoded data slices when the one of the second set of write requests is received.

17. The memory module of claim 16 further comprises:
the second storage device further stores operational instructions that, when executed by the storage unit, further causes the storage unit to:
 in response to receiving one of the set of next-phase write requests, continue, by the storage unit, with a write process of permanently storing the one of the first set of encoded data slices; and in response to receiving one of a set of rollback requests, delete, by the storage unit, the one of the second set of encoded data slices that was temporarily stored.

18. The memory module of claim 16 further comprises:

the second storage device further stores operational instructions that, when executed by the storage unit, further causes the storage unit to:
  in response to receiving one of a second set of next-phase write requests from the second client device, continue, by the storage unit, with a write process of permanently storing the one of the second set of encoded data slices; and
  in response to receiving one of a set of rollback requests from the first client device, delete, by the storage unit, the one of the first set of encoded data slices that was temporarily stored.

* * * * *